United States Patent
Shalev et al.

(10) Patent No.: US 10,917,344 B2
(45) Date of Patent: Feb. 9, 2021

(54) CONNECTIONLESS RELIABLE TRANSPORT

(71) Applicant: Amazon Technologies, Inc., Seattle, WA (US)

(72) Inventors: Leah Shalev, Zichron Yaakov (IL); Brian William Barrett, Seattle, WA (US); Nafea Bshara, San Jose, CA (US); Georgy Machulsky, San Jose, CA (US)

(73) Assignee: Amazon Technologies, Inc., Seattle, WA (US)

(*) Notice: Subject to any disclaimer, the term of this patent is extended or adjusted under 35 U.S.C. 154(b) by 234 days.

(21) Appl. No.: 16/204,998

(22) Filed: Nov. 29, 2018

(65) Prior Publication Data
US 2019/0173789 A1 Jun. 6, 2019

Related U.S. Application Data

(63) Continuation of application No. 14/983,431, filed on Dec. 29, 2015, now Pat. No. 10,148,570.

(51) Int. Cl.
*H04L 12/741* (2013.01)
*H04L 12/801* (2013.01)
(Continued)

(52) U.S. Cl.
CPC ............ *H04L 45/745* (2013.01); *H04L 45/24* (2013.01); *H04L 69/326* (2013.01)

(58) Field of Classification Search
CPC . G06F 15/17331; H04L 1/1841; H04L 45/24; H04L 45/74; H04L 45/745;
(Continued)

(56) References Cited

U.S. PATENT DOCUMENTS

| | | |
|---|---|---|
| 5,699,500 A | 12/1997 | Dasgupta |
| 6,788,686 B1 | 9/2004 | Khotimsky et al. |

(Continued)

FOREIGN PATENT DOCUMENTS

| | | |
|---|---|---|
| CN | 1625179 | 6/2005 |
| CN | 101848203 | 9/2010 |

(Continued)

OTHER PUBLICATIONS

CN App. No. CN201680076964.1, "Notice of Decision to Grant," dated Aug. 5, 2019, 4 pages.
(Continued)

*Primary Examiner* — Ahmed Elallam
(74) *Attorney, Agent, or Firm* — Weaver Austin Villeneuve & Sampson LLP

(57) ABSTRACT

Provided are systems and methods for connection establishment over a network that does not require a user application to establish an explicit connection with a target application. In some implementations, provided is an apparatus configured to communicate with a network and a host device. The apparatus may receive a message and destination information associated with the message from the host device. The apparatus may further determine, using the destination information, a transport context from a plurality of transport contexts. The transport context may include a state of a connection with a destination on the network. The destination on the network may be associated with the destination information.

20 Claims, 22 Drawing Sheets

(51) Int. Cl.
  *H04L 12/861*   (2013.01)
  *G06F 15/173*   (2006.01)
  *H04L 29/08*    (2006.01)
  *H04L 12/707*   (2013.01)
(58) Field of Classification Search
  CPC ....... H04L 47/34; H04L 47/624; H04L 49/90;
       H04L 69/22; H04L 69/324; H04L 69/326;
       H04L 1/1835; H04L 1/188; H04L 1/1883;
       H04L 47/30; H04L 47/32; H04L 67/1097
  See application file for complete search history.

(56) References Cited

U.S. PATENT DOCUMENTS

| | | | |
|---|---|---|---|
| 6,990,528 | B1 | 1/2006 | Neal et al. |
| 7,171,484 | B1 | 1/2007 | Krause et al. |
| 7,912,064 | B2 | 3/2011 | Elzur |
| 7,913,077 | B2 | 3/2011 | Ko et al. |
| 8,031,729 | B2 | 10/2011 | Elzur |
| 8,190,960 | B1 | 5/2012 | Bahadur et al. |
| 9,667,723 | B2* | 5/2017 | Pandya ................. H04L 69/166 |
| 9,747,249 | B2* | 8/2017 | Cherian ................. H04L 69/22 |
| 10,375,167 | B2* | 8/2019 | Shamis ............ G06F 15/17331 |
| 10,430,373 | B2* | 10/2019 | Cherian ................. H04L 45/74 |
| 2002/0198927 | A1 | 12/2002 | Craddock et al. |
| 2003/0031183 | A1 | 2/2003 | Kashyap et al. |
| 2003/0035433 | A1 | 2/2003 | Craddock et al. |
| 2003/0053457 | A1 | 3/2003 | Fox et al. |
| 2004/0003126 | A1 | 1/2004 | Boucher et al. |
| 2004/0042483 | A1 | 3/2004 | Elzur et al. |
| 2004/0044796 | A1 | 3/2004 | Vangal et al. |
| 2004/0049612 | A1 | 3/2004 | Boyd et al. |
| 2004/0049774 | A1 | 3/2004 | Boyd et al. |
| 2005/0060442 | A1 | 3/2005 | Beverly et al. |
| 2005/0144310 | A1 | 6/2005 | Biran et al. |
| 2006/0007935 | A1 | 1/2006 | Bennett et al. |
| 2006/0075067 | A1 | 4/2006 | Blackmore et al. |
| 2006/0101090 | A1 | 5/2006 | Aloni et al. |
| 2006/0101225 | A1 | 5/2006 | Aloni et al. |
| 2006/0168274 | A1 | 7/2006 | Aloni et al. |
| 2007/0208820 | A1 | 9/2007 | Makhervaks et al. |
| 2008/0043750 | A1 | 2/2008 | Keels et al. |
| 2009/0106771 | A1 | 4/2009 | Benner et al. |
| 2009/0222564 | A1 | 9/2009 | Freimuth et al. |
| 2012/0023304 | A1 | 1/2012 | Chan et al. |
| 2012/0089694 | A1 | 4/2012 | Pandya |
| 2012/0265837 | A1 | 10/2012 | Grant et al. |
| 2012/0287944 | A1 | 11/2012 | Pandit et al. |
| 2013/0051222 | A1 | 2/2013 | Gavrilov et al. |
| 2013/0080561 | A1 | 3/2013 | Fox et al. |
| 2013/0268980 | A1 | 10/2013 | Russell |
| 2013/0304796 | A1 | 11/2013 | Jackowski et al. |
| 2014/0052808 | A1 | 2/2014 | Krishnan et al. |
| 2014/0310369 | A1 | 10/2014 | Makhervaks et al. |
| 2014/0358972 | A1 | 12/2014 | Guarrieri et al. |
| 2015/0010090 | A1 | 1/2015 | Sugimoto |
| 2015/0052280 | A1 | 2/2015 | Lawson |
| 2015/0172226 | A1 | 6/2015 | Borshteen et al. |
| 2015/0179227 | A1 | 6/2015 | Russell |
| 2016/0026604 | A1* | 1/2016 | Pandit ............... G06F 15/17331 709/212 |
| 2016/0094356 | A1 | 3/2016 | Xiang et al. |
| 2016/0212214 | A1 | 7/2016 | Rahman et al. |
| 2017/0346742 | A1 | 11/2017 | Shahar et al. |

FOREIGN PATENT DOCUMENTS

| | | |
|---|---|---|
| CN | 103986647 | 8/2014 |
| CN | 104541257 | 4/2015 |
| CN | 104620664 | 5/2015 |
| JP | 2002305535 | 10/2002 |
| JP | 2004531175 | 10/2004 |
| JP | 2005524264 | 8/2005 |
| JP | 2008507201 | 3/2008 |
| WO | 2013169073 | 11/2013 |

OTHER PUBLICATIONS

AU App. No. AU2018250412, "First Examination Report," dated May 20, 2019, 2 pages.
JP App. No. JP2019032253, "Notice of Allowance," dated Jul. 1, 2019, 3 pages.
KR App. No. KR10-2019-7001403, "Notice of Decision to Grant," dated Jun. 13, 2019, 5 pages.
KR App. No. KR10-2019-7026833, "Notice of Decision to Grant," dated Oct. 1, 2019, 4 pages.
EP20175292.0, "Extended European Search Report", dated Jul. 16, 2020, 12 pages.
EP20175295.3, "Extended European Search Report", dated Jul. 16, 2020, 14 pages.
CN201910999930.5, "Office Action", dated May 22, 2020, 16 pages.
CN Patent App. CN201680076964.1, "Office Action," dated Feb. 25, 2019, 11 pages.
JP Patent App. JP2019-032252, "Office Action," dated Mar. 25, 2019, 5 pages.
SG Application No. 11201805409S, "Notice of Decision to Grant," dated Jan. 17, 2020, 4 pages.
EP App. No. EP16826869.6, "Office Action," dated May 17, 2019, 9 pages.
JP App. No. JP2019032252, "Notice of Allowance," dated Jul. 8, 2019, 3 pages.
"LibFabrics: Open Fabrics", OpenFabrics Interfaces Working Group, 2017 [retrieved on Jan. 9, 2017]. Retrieved from the Internet: <URL: https://ofiwg.github.io/libfabric/>,, 3 pages.
"Open Fabrics Software", OFED Overview. [online]. Open Fabrics Alliance, Retrieved from the Internet: <URL: https://www.openfabrics.org/index.php/openfabrics-software.html, Sep. 7, 2015, 2 pages.
U.S. Appl. No. 14/983,431, "Non-Final Office Action", dated Feb. 1, 2018, 11 pages.
U.S. Appl. No. 14/983,431, "Notice of Allowance", dated Aug. 1, 2018, 11 pages.
U.S. Appl. No. 14/983,431, "Restriction Requirement", dated Aug. 25, 2017, 7 pages.
U.S. Appl. No. 14/983,434, U.S. Patent Application, "Reliable, Out-Of-Order Receipt of Packets," filed Dec. 29, 2015.
U.S. Appl. No. 14/983,436, U.S. Patent Application, "Reliable, Out-Of-Order Transmission of Packets," filed Dec. 29, 2015.
U.S. Appl. No. 15/990,062, U.S. Patent Application, "Relaxed Reliable Datagram," filed May 25, 2018.
U.S. Appl. No. 15/990,300, U.S. Patent Application, "Connectionless Transport Service," filed May 25, 2018.
AU2016382952, "Notice of Allowance", dated Jul. 19, 2018, 3 pages.
JP2018-533679, "Office Action", dated Nov. 12, 2018, 5 pages.
KR10-2018-7021687, "Office Action", dated Aug. 13, 2018, 3 pages.
PCT/US2016/068954, "International Search Report and Written Opinion", dated Mar. 28, 2017, 18 pages.
Russell, "Introduction to RDMA Programming", University of New Hampshire InterOperability Laboratory, Retrieved from the Internet: <URL: http://www.cs.unh.edu/~rdr/rdma-intro-module.ppt, 2012, 76 pages.
CA Application No. 3,010,186, "Office Action," dated Apr. 12, 2019, 5 pages.
AU 2019261814, "First Examination Report", dated Jun. 24, 2020, 3 pages.
CA 3,010,186, "Office Action", dated Apr. 22, 2020, 5 pages.
CN 201910999314.X, "Office Action", dated Jun. 12, 2020, 14 pages.
EP 16826869.6, "Notice of Decision to Grant", dated Apr. 23, 2020, 2 pages.
IN 201817027852, "First Examination Report", dated Jun. 29, 2020, 8 pages.

* cited by examiner

CONNECTIONLESS RELIABLE TRANSPORT

CROSS REFERENCE TO RELATED APPLICATIONS

This application is a continuation of U.S. Non-Provisional patent application Ser. No. 14/983,431, filed Dec. 29, 2015, and issued as U.S. Pat. No. 10,148,570 on Dec. 4, 2018, entitled "CONNECTIONLESS RELIABLE TRANSPORT," the content of which is herein incorporated by reference in its entirety.

BACKGROUND

High performance computing may be provided by computer clusters, that is, a network of relatively low cost computers functioning as one, high-power computing system. High performance computing typically requires high bandwidth and low latency across the network connecting systems in the cluster. Transaction latency may be reduced by reducing the involvement of processors at both a system transmitting packets and a system receiving packets. Server messaging protocols that reduce processor involvement in packet transmission may be referred to as Remote Direct Memory Access (RDMA) protocols or, more generally, as protocols with a kernel bypass framework. Protocols with a kernel bypass framework typically use a transport stack to communicate between a transmitting and a receiving system. The transport stack may include queue pairs for transmitting packets out to the network and receiving packets coming in from the network. The transport stack may also include one or more transport services that manage the connection between the transmitting and receiving system, as well as managing the transmission and receipt of packets.

BRIEF DESCRIPTION OF THE DRAWINGS

Various embodiments in accordance with the present disclosure will be described with reference to the drawings, in which.

DETAILED DESCRIPTION

Figure 1:
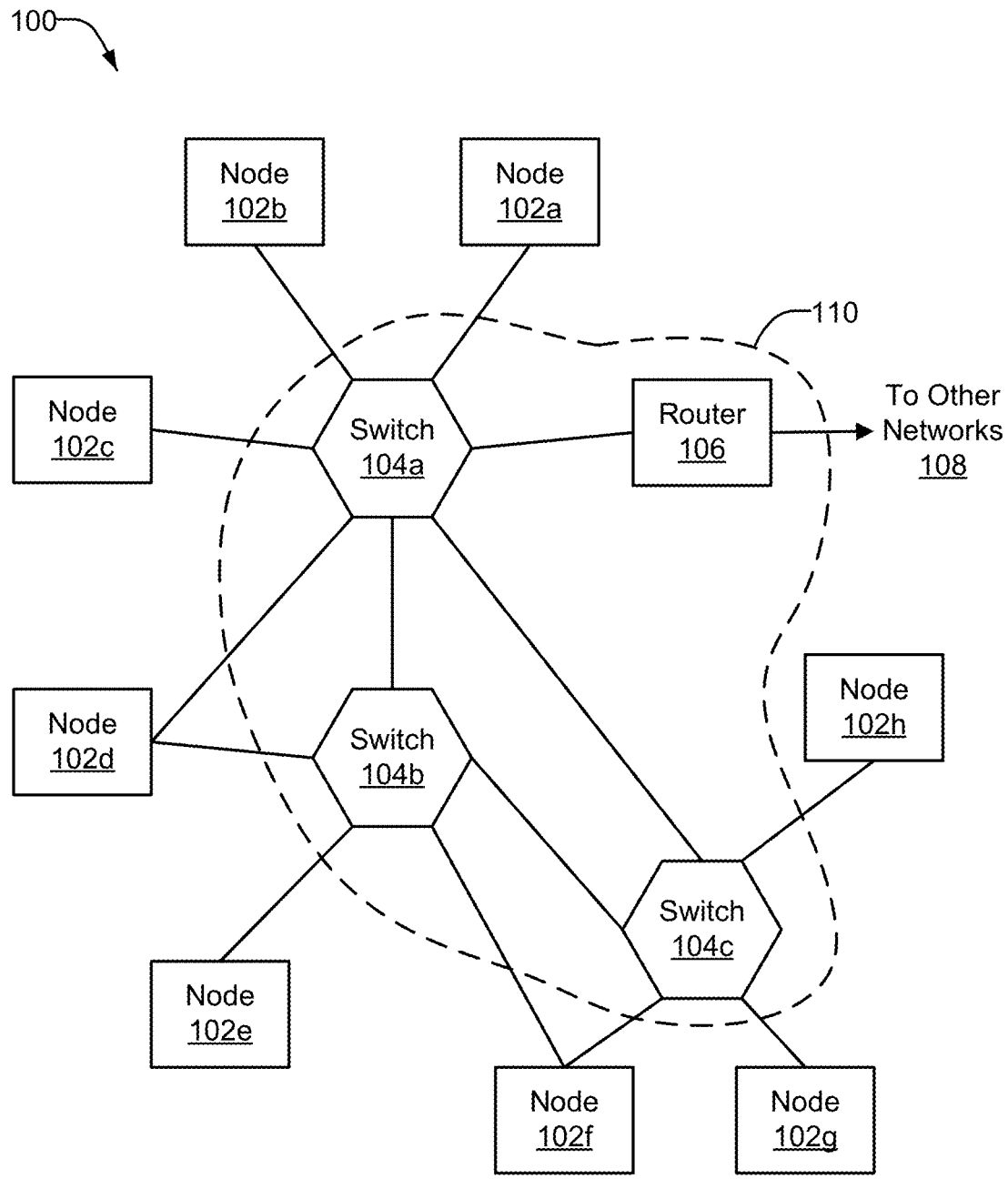
FIG. 1 illustrates an example of a cluster of computing resources.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

High performance computing may be provided by compute clusters, that is, a network of relatively low cost computers functioning as one, high-power computing system. To provide high performance, the network connecting systems in the cluster should support high bandwidth, and messages transmitted between systems in the computer cluster should have the lowest possible latency. Common networking protocols, such as the Transmission Control Protocol/Internet Protocol (TCP/IP), are generally oriented towards interoperability across many different types of networks, rather than maximizing bandwidth and minimizing latency. High performance compute clusters thus generally use server message protocols that provide a kernel bypass framework. Bypassing operating system kernel operations may greatly improve network bandwidth and reduce transmission latency. Network protocols that provide a kernel bypass framework are generally called Remote Direct Memory Access (RDMA) protocols, though in most cases RDMA is only one feature provided by these protocols.

Network protocols that provide a kernel bypass framework generally use a transport stack for transmitting and receiving network packets. The transport stack typically provides one or more transport services. These transport services are generally classified as connected or connectionless, and reliable or unreliable. Connected transport service types generally have a negative effect on the scalability of a computing cluster. For connected transport services, as the number of systems connected to the cluster increases, the number of connections may increase dramatically. Reliable unconnected transport service types may be more scalable, but generally have a low tolerance for packets being dropped in the network. A high performance computing system may thus be improved by a transport service type that is both scalable and reliable over a network that may have a more than negligible rate of packet drops.

Reliability—that is, guaranteed delivery of packets—may be best handled at a network adapter device. The network adapter may be able to quickly determine when packets have been dropped, and can just as quickly generate requests for those packets to be retransmitted. Having software running on the host device handle reliability may have a negative impact on latency. For software to ensure reliable packet delivery, packets would have to be delivered up to the transport stack to the operating system kernel or to a user application, and may be delayed on the way for various reasons, such as the operating system being busy. Packet reliability operations may thus be more efficiently handled by avoiding potential delays caused by having to traverse the transport stack.

Packet drops and packet retransmission, however, may cause packets to arrive at the destination system out of order. In systems where packet drops can occur, re-ordering packets that arrive out of order has typically been handled together with guaranteeing packet delivery, for example, at the network adapter device. But packet reordering is potentially compute-intensive, and network adapter devices typically have low power, inexpensive processors. A host device, on the other hand, typically has a high performance processor, and can easily manage packet reordering. But, as already noted, to have host device software handle both packet reordering and reliable packet delivery may be inefficient.

Systems and methods are disclosed herein for providing reliable packet delivery and packet reordering, with reliability handled at a network adapter device and packet reordering handled by software on a host device. Also provided is a Relaxed Reliable Datagram transport service. The Relaxed Reliable Datagram transport provides mechanisms to guarantee packet delivery across networks that may occasionally drop packets. A network adapter device configured to use the Relaxed Reliable Datagram transport may avoid buffering packets, instead delivering them to the host device as quickly as possible. The host device may then reorder the packets as needed. These systems and methods described herein may enable high performance computing on a low cost computing cluster by providing high bandwidth and low latency transfers across the cluster.

Clustering computing resources may provide better performance and scalability at lower costs. FIG. 1 illustrates an example of a cluster 100 of computing resources. A cluster is a group of computing resources connected with switches, and configured to run in parallel. In many implementations, the various computing resources form a single logical computing resource. The example cluster 100 illustrated in FIG. 1 includes multiple nodes 102a-h and switches 104a-c. In some implementations, the cluster 100 may also include a router 106.

The nodes 102a-h illustrated in FIG. 1 may represent various computing resources. For example, one or more nodes 102a-h may be a computer, such as a server computer. Computers used in cluster applications may include one or more processors, and these processors may include one or more processing cores. These computers may also include memory and peripheral devices. In some implementations, these computers may use an adapter device to connect to a switch 104a-c in the cluster 100. Other examples of computing resources include storage devices (e.g., hard drives), storage subsystems (e.g., an array of storage devices), Input/Output (I/O) modules, and consoles for administration access to the cluster 100.

The switches 104a-c may provide connectivity between the various nodes 102a-h. Each node 102a-h may be connected to the cluster 100 through a connection with a switch 104a-c. In some cases, anode 102a-h may be connected to more than one switch 104a-c. Switches may also be connected to other switches. In most cases, any port on a switch 104a-c may be used to connect to either a node 102a-h or another switch. In most implementations, size of the cluster 100 can quickly and easily be expanded by connecting more switches and nodes.

The network of switches 104a-c may provide multiple paths from any node 102a-h to any another node 102a-h. A switch 104a-c may have multiple connections with another switch 104a-c, which provides additional paths between the switches 104a-c. In some cases, the nodes 102a-h may be connected to more than one switch 104a-c, also creating more paths. Packets from one node 102a-h may use multiple paths at the same time to reach another node 102a-h. Alternatively or additionally, packets from one node 102a-h to another node 102a-h may follow only one path. In some cases, at each switch 104a-c a decision may be made as to which path a packet will follow. In other cases, a packet's path may be determined in advance, typically at the source node. A stream of packets from one node 102a-h to another node 102a-h may be referred to as a packet flow, or simply as a "flow." In some cases, the packets in a flow are related, such as for example when the packets together form one message.

In some implementations, one or more of the switches 104a-c may include load balancing functionality. In these implementations, the switches 104a-c may be configured to attempt to efficiently distribute network traffic. The objective is typically to ensure that links between nodes and switches do not become congested and that packet traffic flows across the cluster 100 as quickly as possible. In many cases, however, the switches 104a-c are only aware of their own traffic load, and lack visibility into the load at other switches 104a-c.

In some implementations, the cluster 100 may be connected to a router 106. The router 106 may provide a connection to other networks 108, such as other clusters or sub-networks (subnets), Local Area Networks (LANs), Wide Area Networks (WANs), or the Internet.

The interconnected switches 104a-c (and the router 106, if present) may be referred to as a switch fabric 110, fabric, or more simply "network." Herein, the terms "fabric" and "network" may be used interchangeably.

A computing cluster, such as the illustrated cluster 100, may provide more computing power and better reliability. The individual computing resources may work cooperatively to solve a large problem that one computer may not be able to solve alone, or may take a very long time to solve alone. In some cases, a computing cluster may provide performance similar to a super computer but for less cost and with less complexity. The switched fabric 110 architecture used by a computing cluster may also have the advantage of being fault tolerant and scalable. In a switched fabric 110 architecture, typically every link has one device attached at each end of a link. Hence, each link is only depending on the behavior of, at most, two devices. A switched fabric 110 may also be easily scaled by adding more switches, which provides more ports to attach more nodes. In some cases, adding more switches may increase the aggregate bandwidth of the cluster. Multiple paths between the nodes may also keep aggregate bandwidth high, and provide redundant connections in case of link failures.

Computing clusters may be used for various applications. For example, a computing cluster may be used for high performance computing. High performance computing involves using parallel processing to run compute-intensive applications. Scientific researches, engineers, and academic institutions may use high performance computing for complex modeling or simulations, such as for example car crash simulations, weather modeling, atomic simulations, and so on. Other example uses for computing clusters include machine learning, financial applications, distributed storage, and databases. Machine learning involves examining vast amounts of data, and executing algorithms that can learn from and make predictions from the data. Financial applications, such as high-frequency trading, may also examine large amounts of data, and are generally relied upon to react quickly (e.g., much faster than a human being) to changes in the data. Distributed storage allows very large amounts of data to be accessed from multiple locations. Storage area networks are one form of distributed storage. Databases also store a large amount of data, and must provide very quick ways to locate specific information stored within the database.

To achieve the most benefit from clustering computing resources, the protocol used for communication between the nodes should provide high bandwidth and low latency. High bandwidth means that a large volume of traffic should be able to traverse the cluster, and low latency means that the traffic should be able to travel from source to destination as quickly as possible. Several operations may be major contributors to latency. These include overhead caused by executing network protocol code within the operating system, context switches required to move in and out of kernel mode and to send out data, and/or excessive copying of data between user-level buffers and memory at a network adapter. For example, a typical network protocol stack may cause a round-trip latency of approximate 100 microseconds, assuming a non-congested, near-zero-delay network. This delay, however, may more typically be compounded with millisecond long spikes due to scheduling delays, tens of millisecond long spikes when an application is not designed to avoid network stack issues, and/or seconds-long delays when packets are dropped on a congested link. Computing clusters may be designed with high-bandwidth hardware, and high-bandwidth hardware is typically more sensitive to processor and memory copying overhead.

Networking protocols such as (TCP/IP) have tended to focus on good performance across many different types of networks, and/or being cost-effective. As a result, protocols such as TCP/IP tend to have high latency and tend to be complex. While network protocols such as TCP may be suitable for general-purpose communication over varying types of networks, high-bandwidth, low-latency environments may benefit from more specialized protocols.

Virtual Interface (VI) Architecture (VIA) server messaging protocols were developed to provide high bandwidth, low latency links between nodes in a computing cluster. Examples of protocols similar to VIA include InfiniBand, Internet Wide Area RDMA Protocol (iWARP), and RDMA over Converged Ethernet (RoCE). Each of these protocols include a kernel bypass framework, often referred to as RDMA, which is described in further detail below. iWARP provides a kernel bypass framework over the TCP/IP protocol. RoCE provides a kernel bypass framework over Ethernet-type networks. InfiniBand provides a kernel bypass framework over an InfiniBand-specific network. Sometimes the terms "InfiniBand" and "RDMA" are used interchangeably, though other protocols (such as iWARP and RoCE) also provide an RDMA-style, kernel bypass framework.

VIA-type protocols generally provide low latency, high bandwidth, and kernel-bypass networking. VIA-type protocols aim to provide at least the following: reducing overhead caused by resource sharing between multiple user applications, removing the work of transport protocol handling from a processor, faster bulk transfers of data, and reducing time spent waiting for a remote application.

VIA-type protocols aim to reduce overhead caused by resource sharing between multiple user applications. Typical network protocol stacks operate at the kernel level, and facilitate sharing of a network interface between multiple applications. This resource sharing, however, may cause network delay for at least the following reasons: coordination between multiple processor cores may add latency; inter-processor interrupts used to wake an application may add latency; intermediate queuing or buffering may be needed to protect applications from each other, and copying between queues or buffers may add latency; and internal kernel buffers may need to be copied to or from application buffers because Direct Memory Access (DMA) may not be configured for these applications.

One method for avoiding delays caused by multiple user applications trying to share a single network interface is to have the network interface be used by only one application at a time. The Data Plane Development Kit (DPDK) provides one example of a framework that makes this possible. A DPDK framework may provide a simple network interface, in the form of a user-space polling mode device driver. The DPDK framework may also replace other operating system services, thereby providing an Application Programming Interface (API) for the user applications and an executing model designed for single-user cooperative multi-tasking. This framework may be efficient for network infrastructure (e.g., gateway devices) but may not be practical for conventional user applications and middleware, which may need to be rewritten to accommodate a DPDK-specific API. A DPDK framework may also require root privileges to run, which may place a burden on the kernel and may pose a security risk. Furthermore, a DPDK framework may not be practical in a multi-user environment, since the DPDK environment may require that applications use physical memory addresses, which limits the use of virtual machines. Even for a single user, a DPDK framework may also be impractical. DPDK and similar models may be extended to take on the responsibility of a transport stack, and thereby be able to service multiple applications. Communication, however, between these applications and the DPDK process may incur significant latency.

Another method for efficiently sharing hardware resources is a kernel bypass framework, commonly called, as noted above, an RDMA framework. RDMA-based devices may be used by non-privileged user applications. RDMA-based devices may also allow multiple applications to directly access the hardware without interfering with each other. RDMA devices may rely on a kernel only for control operations, to perform initialization, and for some coordination that may be required for interrupt handling, but otherwise, an RDMA device may operate independently of the kernel. This means that a processor need not be involved in RDMA operations. RDMA frameworks may also provide optimizations such as polling-mode completion handling, which may be beneficial for providing ultra-low latency.

As noted above, VIA-type protocols aim to reduce processor involvement in managing the transport protocol. As discussed previously, processor involvement in managing a network protocol is a potential source of latency. When an application sends a long message to a remote destination, processors at both the local and remote computers are likely to be involved. For example, the processors may be required to divide the message into packets, submit the packets individually to a hardware queue for transmission, receive the packets, generate acknowledgment packets, and determine where in host memory to place the data. In particular, when a packet arrives, a simple network interface card may pass the packet to a host device's main memory over a peripheral bus, then issue an interrupt to the processor, and an interrupt may take some time to actually alert to processor. Once interrupted, the processor may then run protocol processing operations, such as generating acknowledgements, usually after additional delay caused by the operating system.

A network adapter that is configured to handle protocol operations, removing these operations for the processor, may allow faster handling of each packet. The network adapter device may be able to process incoming message and remote read and write commands. The network adapter may also be able to perform DMA transactions to host memory and generate acknowledgement packets. The network adapter may be able to perform these operations without interrupting the processor.

As noted previously, another aim of VIA-type protocols is to provide faster bulk transfers for data. Bulk transfers of data, that is, transfers of large blocks of data, may be executed faster by simply increasing the bandwidth of network links. High-speed network interconnects, however, may place a burden on the memory subsystem of the source and/or destination computers. Memory subsystems are typically not overprovisioned, and can become a bottleneck when accessed multiple times in the course of high-bandwidth network transfers that cause an intermediate copy to be placed in memory. When a bulk transfer requires multiple copies to be made, this copying may limit the throughput of the transfer, which may increase transaction latency. One possible method for alleviating this delay is provided by processors that include large level 3 (L3) caches. These processors may have network interface cards write data directly to the L3 cache. These processors, however, may perform inconsistently, due to the nature of caches (data that is not in the cache needs to be fetched, thus incurring latency). Furthermore, when data is not copied quickly, the L3 cache may not be helpful, since the data may take up space in the L3 cache that could be used for more useful data.

Kernel bypass frameworks provide a better solution, through a process often called "zero copy" data transfer. Zero copy is one of the operations that are provided by RDMA. RDMA describes an extension of Direct Memory Access (DMA). DMA typically allows certain hardware subsystems to access main system memory without using a processor. Similarly, RDMA allows one computer to access memory on another computer over a network, without involving a processor in either computer. Hence, a local computer may be able to perform reads, writes, or atomic operations on a remote computer's memory without intermediate copies being made by a processor at either the local or the remote computer. In many implementations, RDMA is made possible by the local computer and the remote computer each having an RDMA adapter.

As noted previously, VIA-type protocols also seek to reduce time spent waiting for a remote application. Applications themselves may contribute to network latency. Network transactions may involve an application both at a local computer and at a remote computer. The remote application may take some time to respond to transactions, for example because of scheduling delays. "One-sided" RDMA communication, where only the local application is involved, may decrease the latency caused by waiting on the remote application. By allowing access to its memory, the remote application may not need to be involved in a data transfer. Instead, an RDMA adapter at the remote computer may be able to access to remote memory directly, without involving the remote application. RDMA may further provide remote atomic operations, in addition to read and write operations, which may decrease the latency caused by locking operations.

In summary, VIA-type protocols may reduce overhead caused by resource sharing between multiple user applications. VIA protocols may also remove the work of transport protocol handling from a processor. These protocols may also provide faster bulk transfer of data, and reduce time spent waiting for a remote application to respond. These operations are often described as RDMA operations, though they may more generally be described as kernel bypass operations. These features may also be referred to as remote memory access (RMA) or one-sided communication.

Figure 2:
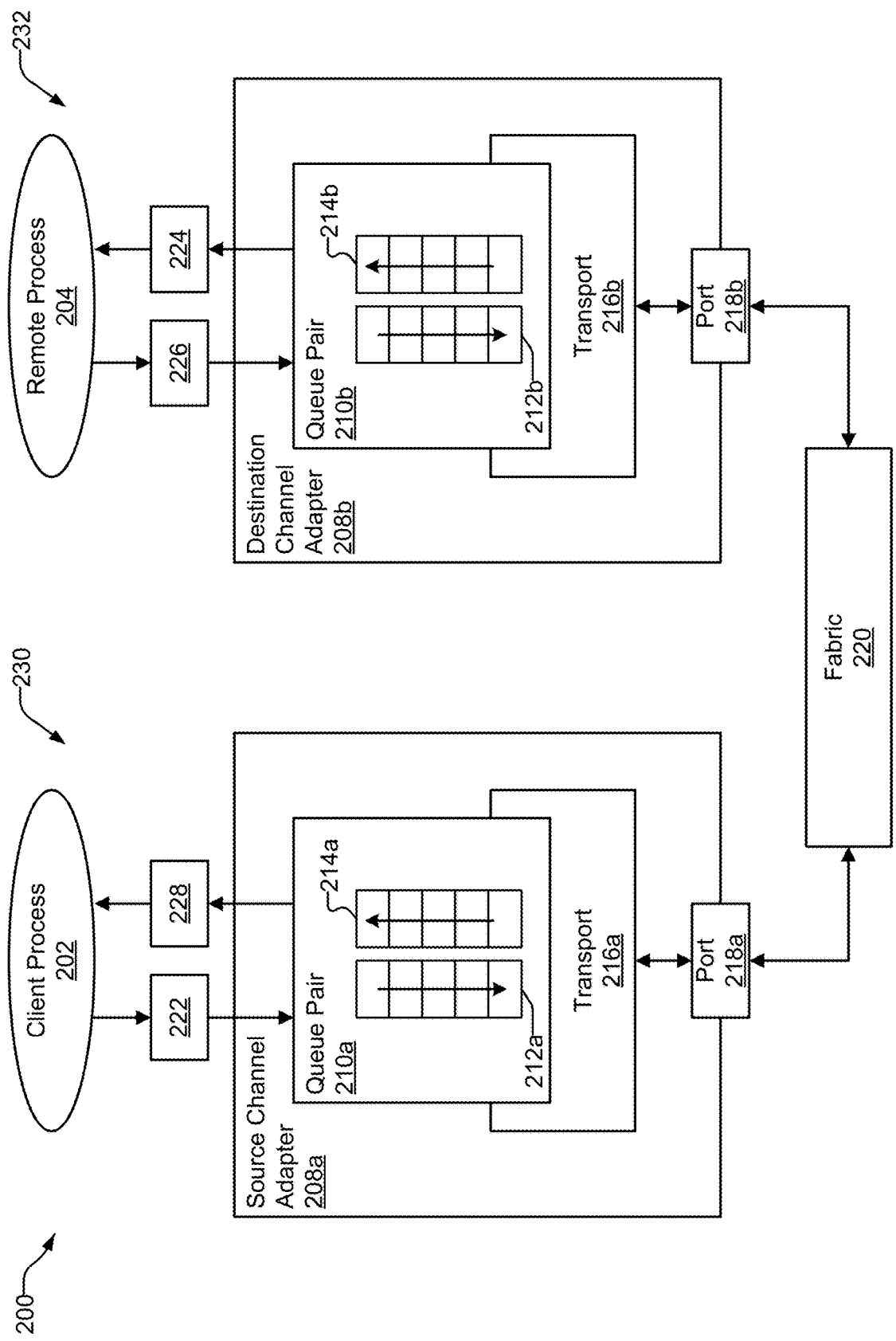
FIG. 2 illustrates an example of a communication stack that may be used to implement a kernel bypass framework.

FIG. 2 illustrates an example of a communication stack 200 that may be used to implement a kernel bypass framework. Using the communication stack 200, such as is illustrated in FIG. 2, a client process 202 may be able to communicate directly with a remote process 204 on a remote system 232 without help from a processor at either the local system 230 or the remote system 232. The example of FIG. 2 illustrates, as an example, a communication stack 200 between two processes executing on two different systems. As will be explained below, a similar communication stack can be configured between any two processes communicating across a network fabric 220. Also, while one system 230 is called "local" and the other system 232 is called "remote," it is understood that in some implementations the communication stack 200 can also operate in the reverse direction, such that the remote system 232 can originate messages directed at the local system 230.

In some implementations, the communication stack 200 illustrated in FIG. 2 operates with minimal use of a processor at either the local 230 or the remote 232 system. Removing or reducing network traffic control duties from processors may be accomplished through "work queues," also called "work queue pairs" or simply "queue pairs" 210*a-b*. For each communication channel between the local system 230 and the remote system 232, a queue pair 210*a-b* may be assigned at both systems 230, 232. A queue pair 210*a-b* includes a send queue 212*a-b* for traffic headed for the network fabric 220, and a receive queue 214*a-b* for traffic coming in from the network fabric 220. In some implementations, the client process 202 initiates a queue pair 210*a-b* when establishing a communication channel with the remote process 204. In these implementations, the client process 202 can initiate additional work queues for communicating with the same remote process 204, with different processes running on the same remote system 232, or with processes running on other remote systems. Client processes and remote processes include non-kernel or operating system processes, such as user applications and/or driver programs.

In some implementations, the queue pair 210*a* at the local system 230 resides on a source channel adapter 208*a*. The source channel adapter 208*a* may be configured to communicate with the network fabric 220. The source channel adapter 208*a* may include additional queue pairs that are assigned to other processes, to the same client process 202, or that may currently be unused. In some implementations, the use and structure of the queue pair 210a may be clearly understood, and thus the queue pair 210a may be implemented in hardware. In other implementations, the queue pair 210a may be implemented in software (for example in a driver) or in a combination of hardware and software. In addition to the queue pair 210a, the source channel adapter may also include a transport layer 216a, which manages communication with the network fabric 220 and the remote process 204. The source channel adapter 208a may also include a physical port 218a, connecting the source channel adapter 208a to the fabric 220. The source channel adapter 208a may also be referred to as a host channel adapter, or more generally as a network adapter.

The client process 202 may initiate a transaction to the remote process 204 by placing a "work queue element" 222 (often abbreviated as WQE) into the local send queue 212a. The work queue element 222 may include a transaction, such as a read, write, or atomic transaction. In some implementations, the work queue element 222 may also include information identifying the remote process 204 as the target of the transaction. The source channel adapter 208a may process the work queue element 222 directly from the send queue 212a. The source channel adapter 208a may generate one or more packets using the information in the work queue element 222. The transport layer 216a may transmit these one or more packets through the port 218a to the network fabric 220.

The remote system 232 may receive the packet or packets from the network fabric 220 at its own destination channel adapter 208b (also called a target channel adapter or more generally a network adapter). Like the source channel adapter 208a, the destination channel adapter 208b includes a port 218b connecting the destination channel adapter to the network fabric 220. The destination channel adapter 208a-b may also include a transport layer 216b, which manages communication with the network fabric 220 and the client process 202. The destination channel adapter 208b may also include a queue pair 210b that is assigned to the remote process 204.

The packet or packets received at the remote system 232 from the network fabric 220 may be directed by the transport layer 216b to a receive queue 214b. In some implementations, the destination channel adapter 208b may reassemble the message generated by the client process 202, and place the reassembled message into the receive queue 214b. The remote process 204 may be automatically informed when an element arrives in its receive queue 214b. The remote process 204 may pop the element 224 from the receive queue 214b, may operate on the element 224, and then, in some cases, may generate a response that is to be returned to the client process 202. The remote process 204 may place a work queue element 226, containing the response, in its own send queue 210b. The response may then traverse the fabric 220 back to the local system 230, where it is delivered to the client process 202 as a "completion queue entry" 228 (often abbreviated as CQE).

In this exchange of information, the operating system kernel at both the local system 230 and the remote system 232 are not likely to be needed. For example, neither the client process 202 nor the remote process 204 may be required to arbitrate for use of their respective network adapter cards, as may be the case for systems that do not implement kernel bypass. Instead, each process 202, 204 may assume that it has an exclusive communication channel with the other process 202, 204. In reality, multiple processes may be using the network adapter cards 208a-b to communicate over the network fabric 220, but the network adapter cards 208a-b manage arbitration between the multiple processes and their respective queue pairs. Additionally, the transport layer 216a-b may manage the connection between a client process 202 and a remote process 204, such as for example keeping track of packets sent and received and possibly dropped by the network fabric 220.

In many implementations, the transport layer 216a-b may support several operations for the send queues 212a-b. For example, the transport layer 216a-b may support typical send and receive operations, where one process submits a message and another process, on another system on the network, receives that message. As another example, the transport layer 216a-b may also support RDMA-write, where one process writes directly into the memory buffer of a remote system. In this example, the remote process would give the sending system appropriate access privileges ahead of time, and would have memory buffers registered for remote access. As another example, the transport layer 216a-b may support RDMA-read, where one process reads directly from the memory buffer of a remote system. In this example, the remote system would also give the sending system appropriate access privileges in advance. As another example, the transport layer 216a-b may also support RDMA-type atomic operations. One such atomic operation is "compare and swap," in which a process reads a remote memory location and, if the data read is a specified value, writes a new value at the same remote memory location. Another atomic operation is "fetch add," in which a process reads from a remote memory location, returns the data read to the caller, and then adds a specified value to the data and writes modified value back to same remote memory location.

In some implementations, the transport layer 216a-b may also support operations for the receive queues 214a-b. For example, the transport layer 216a-b may support an operation called "post receive buffer," in which a buffer is identified that may be used as the target for send, RDMA-write, and RDMA-read initiated by another system.

Figure 3:
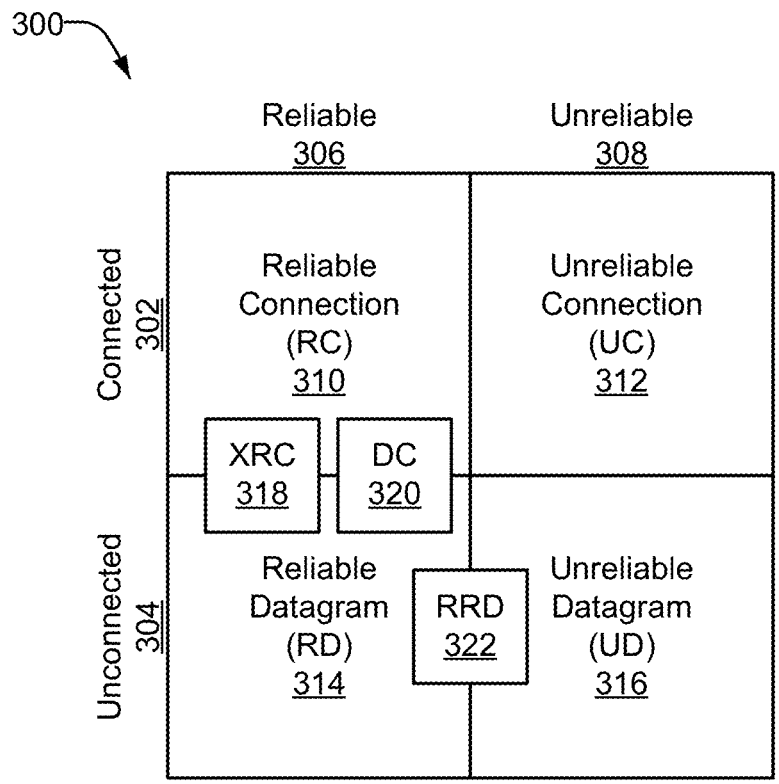
FIG. 3 illustrates examples of transport service types.

In some implementations, when a queue pair is initiated, the initiating process may associate the queue pair with a transport service type. The transport service type may then determine how packets are transmitted from a source system to a destination system. FIG. 3 illustrates examples of transport service types 300. Transport service types 300 used by VIA-type protocols can be categorized as connected 302 or unconnected 304, and reliable 306 or unreliable 308. Connected 302 and unconnected 304 describes whether an explicit connection is established between a sending process and a receiving process. With connected 302 transport service types 300, the connection is, in most implementations, exclusive to the sending and receiving processes. With unconnected 304 transport service types 300, packets or "datagrams" are sent into a network, and typically follow whatever paths are available to their destination. Reliable 306 and unreliable 308 describe whether the transport service types 300 guarantee delivery of packets. Reliable 306 transport service types 300 typically guarantee delivery, while unreliable 308 transport service types 300 typically do not.

An example of a connected 302, reliable 306 transport service type 300 is called Reliable Connection 310 (RC). Reliable Connection 310 guarantees in-order delivery of packets. In order means that messages are delivered to a destination application in the same order that they were sent by the source application. Reliable Connection 310 further requires explicit establishment of a connection between each pair of communicating processes. An example of steps for establishing an explicit connection are as follows: a client process may first use the communication stack (e.g., the communication stack 200 of FIG. 2) to look up the network address of a destination system. The client process next may request the transport layer to create a connection context. The client process may then request that the transport layer (or transport management) associate the connection context with the remote destination address. Finally, the transport layer (or transport management) may perform an exchange of messages with the destination system (e.g., a "handshake") to establish the connection.

Returning to FIG. 3, explicit connection establishment may make a Reliable Connection 310 type transport service difficult to scale. As noted above, for two processes to communicate across a network, an explicit connection must be established. Thus, as processes are added to a node connected to the network, the number of connections increases drastically. For example, if 100 processes at a local system are to communicate with all 100 processes running on a remote system, 100×100 or 10,000 connections would have to be established. Furthermore, a computing cluster may have hundreds of nodes, and each network node may be executing hundreds of processors or more, resulting in the cluster requiring potentially requiring thousands upon thousands of connections.

A transport service type 300 that may potentially be more scalable is Unreliable Datagram 316 (UD). Unreliable Datagram 316 does not require explicit connection establishment, and does not guarantee delivery. Not guaranteeing delivery means that a sender transmits packets into the network fabric and makes no effort to ascertain whether the packets arrived at their destination. Unreliable Datagram 316 may be used for transferring messages for management purposes, such as for example messages exchanged to establish a Reliable Connection 310. Because Unreliable Datagram 316 does not guarantee packet delivery, it may be effective in networks where packet drops are infrequent (such as for example InfiniBand networks). In networks where packet drops are likely, however, Unreliable Datagram 316 is not widely used.

Unreliable Connection 312 may also be used in networks where packet drops are likely. Like Reliable Connection 310, Unreliable Connection 312 requires explicit connection establishment, but does guarantee delivery. Unreliable Connection 312 may be used with applications where packet drops can be tolerated (such as for example for video streaming), but is problematic for less drop-tolerant applications.

Reliable Datagram 314 (RD) does not require explicit connection establishment and guarantees delivery of all packets. Reliable Datagram 314 was originally developed to alleviate the scalability problem of Reliable Connection 310, but at the cost of single-connection performance. As a result, Reliable Datagram 314 is not widely used.

Several transport service types 300 have been developed that attempt to combine desirable aspects of the major transport service types 300. Extended Reliable Connection 318 (XRC) was developed to address Reliable Connection's 310 scalability problem. Extended Reliable Connection 318 allows a process to use only one connection per destination system for all the processes at the destination system with which the process is communicating. Extended Reliable Connection 318, however, has been known to have a complicated application interface. Dynamic Connected 320 (DC) attempts to combine the packet delivery guarantee of Reliable Connection 310 with the lack of explicit connection requirement of Unreliable Datagram 316. With Dynamic Connected 320, connections are not fixed as is the case with Reliable Connection 310, but instead are set up as needed, and removed when no longer needed. Dynamic Connected 320, however, was developed for InfiniBand-type networks, where packet drops are very rare. Dynamic Connected 320 may thus suffer from lack of efficiency in networks where packet drops occur more frequently.

Relaxed Reliable Datagram 322 (RRD), which is described in further detail in the following sections, may provide scalability and guaranteed packet delivery in networks where packet drops are not rare events. Relaxed Reliable Datagram 322 may provide user applications with a simple, connectionless interface that is similar to Unreliable Datagram 316. Relaxed Reliable Datagram 322 also guarantees packet delivery, similar to Reliable Connection 310. Relaxed Reliable Datagram 322 does not deliver packets in order, thereby simplifying the transport design and potentially increasing the efficiency of packet delivery.

Figure 4:
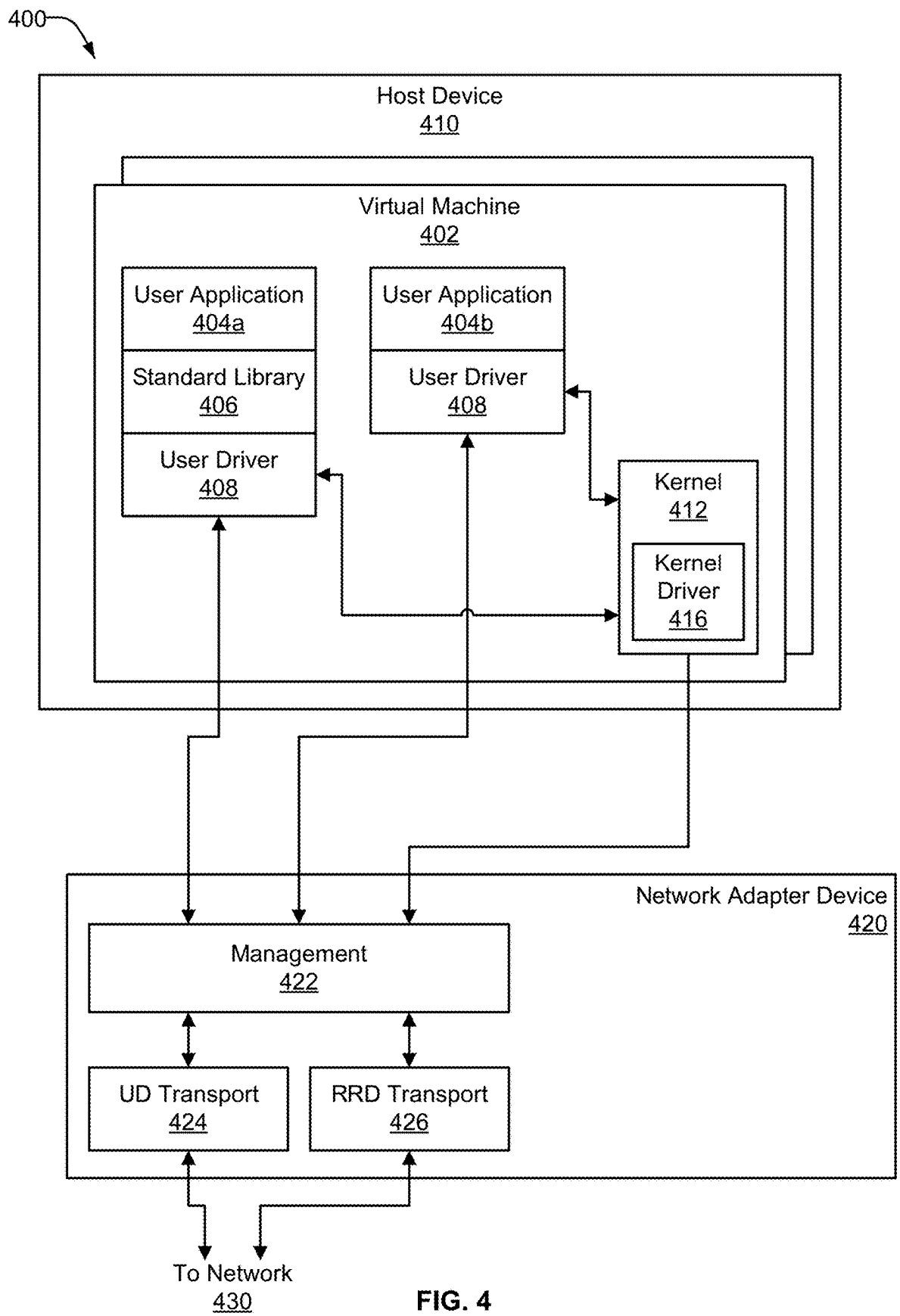
FIG. 4 illustrates an example of a system that may be configured to supply a Relaxed Reliable Datagram transport.

FIG. 4 illustrates an example of a system 400 that may be configured to supply a Relaxed Reliable Datagram transport, in addition to one or more of the transport services described above. Though described in terms of hardware and software components, the example system 400 is primarily a functional description, and the various components illustrated may be implemented in hardware, software, a combination of hardware and software, and in logical and/or physical configurations other than those described by this specific example.

The example system 400 includes a host device 410 and a network adapter device 420. The host device 410 and the network adapter device 420 may be in communication over a physical connection, such as a cable, plug, socket, slot, printed circuit board, or combination of these physical components. The host device 410 may be a general purpose computing system, including components such as one or more processors, memory subsystems, peripheral devices, and so on, not illustrated here. In some implementations, the operations of the network adapter device 420, described below, may be implemented in an integrated circuit device, and/or a collection of integrated circuit device. For example, in various implementations, the operation of the network adapter device may be implemented in a system-on-a-chip (SoC), a field-programmable gate array (FPGA), or an application-specific integrated circuit (ASIC), or a combination of these devices.

The host device 410 may be configured to execute one or more virtual machines 402. A virtual machine is an emulated computing environment representing a real or hypothetical computing system. A virtual machine may execute programs, including an operating system, similar to a physical computer. Virtual machines generally operate isolated from each other, with a process in a virtual machine unable to affect processes running in a different virtual machine. Virtual machines may involve specialized hardware, software, a combination of hardware and software.

The virtual machine 402 of the example system 400 may be executing one or more user applications 404a-b. User applications 404a-b include, for example, high performance computing applications, other compute-intensive programs, and ordinary user applications, such as for example document editing tools and web browsers. In most implementations, user applications 404a-b run in "user space," that is, in an environment where they are isolated from each other, from the operating system (which typically runs in "kernel space"), and from the underlying hardware. The operating system kernel 412 may have more access privileges, including access to each of the user applications 404*a-b* and the underlying hardware.

The user applications 404*a-b* may communicate with the system 400 hardware through a standard library 406 and/or user-space driver program 408. A standard library 406 provides a well-understood and agreed upon Application Programming Interface (API) for executing common operations. These common operations may include, for example, frequently executed software operations and accesses to the system's 400 hardware. One category of standard libraries are ones that have been defined for kernel-bypass frameworks. These libraries include, for example, OpenFabrics Alliance (OFA) Open Fabrics Distribution (OFED) verbs library and LibFabric OpenFabrics Interfaces (OFI), an open source Linux library that implements OpenFabrics interfaces. OFED was originally developed to provide an API to InfiniBand Verbs. InfiniBand Verbs are an abstract description of the functionality of an InfiniBand adapter, independent of any hardware or operating system. OFED later evolved to support non-InfiniBand adapters. The semantics of the OFED API, however, generally are incompatible with the requirements of many applications, and have been known to be difficult to use, especially at larger scales. OFI, in contrast, provides multiple types of semantics, and is known to focus on application needs, in addition to exposing underlying hardware capabilities.

In some implementations, a standard library 406 may be in communication with a user-space driver program 408, where the user-space driver program 408 is configured to provide access to a specific hardware device. In some cases, a user application 404*b* may be able to communicate directly with the user-space driver program 408. In this example, the user-space driver program 408 may provide access to the network adapter device 420. The user-space driver program 408 may provide an interface between the abstraction provided by the standard library 406 and the specific hardware of the network adapter device 420. For example, the user-space driver program 408 may provide access to a communication stack, including send and receive queues, which in some implementations may be located at the network adapter device 420.

In some implementations, the user applications 404*a-b* may communicate with the operating system kernel 412 for configuration operations. For example, the user applications 404*a-b* may register virtual addresses and memory regions with the kernel 412. In some implementations, the kernel 412 may include a kernel-space transport driver 416. The kernel-space transport driver 416 may be configured to execute control operations, including mapping of queue pairs to the user applications 404*a-b*, memory registration, and network address management.

The network adapter device 420 may be configured to communicate with a network 430. The network adapter device 420 may have a management module 422 that may be configured to execute send and receive operations. The management module 422 may be, for example, firmware or an integrated circuit, such as an FPGA or ASIC. For sending messages over the network 430, the management module 422 may be configured to generate packets using a user application's message and to build packet headers. For receiving messages from the network 430, the management module 422 may be configured to remove packet headers and transmit the received message towards the receiving user application 404*a-b*. The received message may, in some cases, include the address of the sender, or some other information identifying the sender.

The network adapter device 420 may provide one or more transport services, such as for example Unreliable Datagram transport 424 and Relaxed Reliable Datagram transport 426. The network adapter device 420 may provide other transport services not illustrated here. In some implementations, the Relaxed Reliable Datagram transport 426 may be configured to provide Reliable Connection-type behavior. In these implementations, a Relaxed Reliable Datagram context may be assigned to a single queue pair, making the transport context exclusive to one communication channel between one local user application and one remote user application.

As noted above, message transfer using the Relaxed Reliable Datagram transport 426 may be "connectionless," that is, may not require that user applications establish an explicit connection with a target application. Instead, connection management may be handled by the Relaxed Reliable Datagram transport 426.

Additionally, the Relaxed Reliable Datagram transport 426 may guarantee delivery of packets, which may arrive at their destination out-of-order. This may mean that the packets may need to be re-ordered to place them in the same sequence as when they originated at the source system. Traditionally, packet ordering and reliability operations have been handled together, either at the network adapter or in host device software. For example, most reliable transport service types that guarantee packet delivery typically rely on the network to not drop packets. Dropped packets may result in packets arriving out of order (because one or more packets have not arrived), in which case the network adapter device may reject the out of order packets, or may require that the entire stream of packets be resent.

Another alternative would be for the network adapter device to re-order packets that have arrived out of order. Packet re-ordering, however, is generally a processing intensive operation. Network adapter devices typically have inexpensive and less powerful processors. Hence, implementations that attempt to deal with out-of-order packets generally re-order packets in host device software, to take advantage of the more powerful processors usually provided by a host device. In these implementations, the software has also attempted to ensure reliable packet delivery, including operations such as tracking and re-requesting missing packets. As discussed above, however, processor involvement may negatively impact latency. Thus implementations that seek reliable packet delivery have implemented the reliability aspects in the network adapter device and, consequently, have required in-order delivery of packets.

Systems, such as the example system 400 of FIG. 4, using Relaxed Reliable Datagram transport may separate packet re-ordering and reliability operations, executing them at points in the system where they may be handled most efficiently. For example, the system 400 may be configured such that reliable delivery of packets is handled by the network adapter device 420, which may be better suited for minimizing the latency inherent in transferring packets across the network 430. Furthermore, packet re-ordering may be handled by the user application 404*a-b* and/or a driver program 408, 416, each of which may be executing on the host device's 410 processor.

Prior to describing how reliable, out-of-order packet delivery may be accomplished, connection establishment is first described. In systems using Relaxed Reliable Datagram transport, the transport service may facilitate "connectionless" message transfer for user applications communicating with each other across the network provided by a computing cluster.

I. "Connectionless" Message Transfer

Figure 5A:
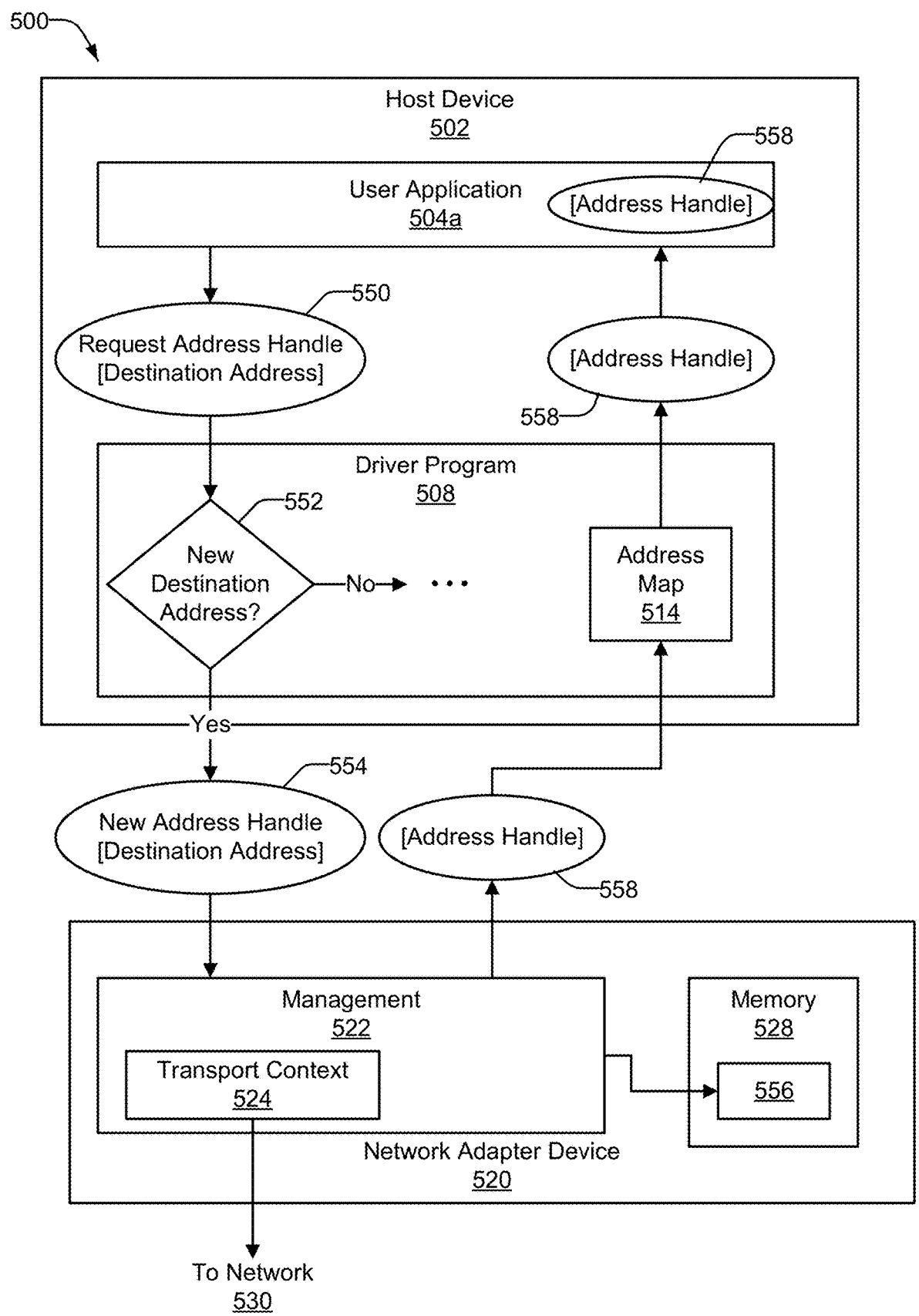
FIGS. 5A-5B illustrate an example of a process by which a user application may obtain an address handle that the user application can subsequently use to transmit messages to another application.
Figure 5B:
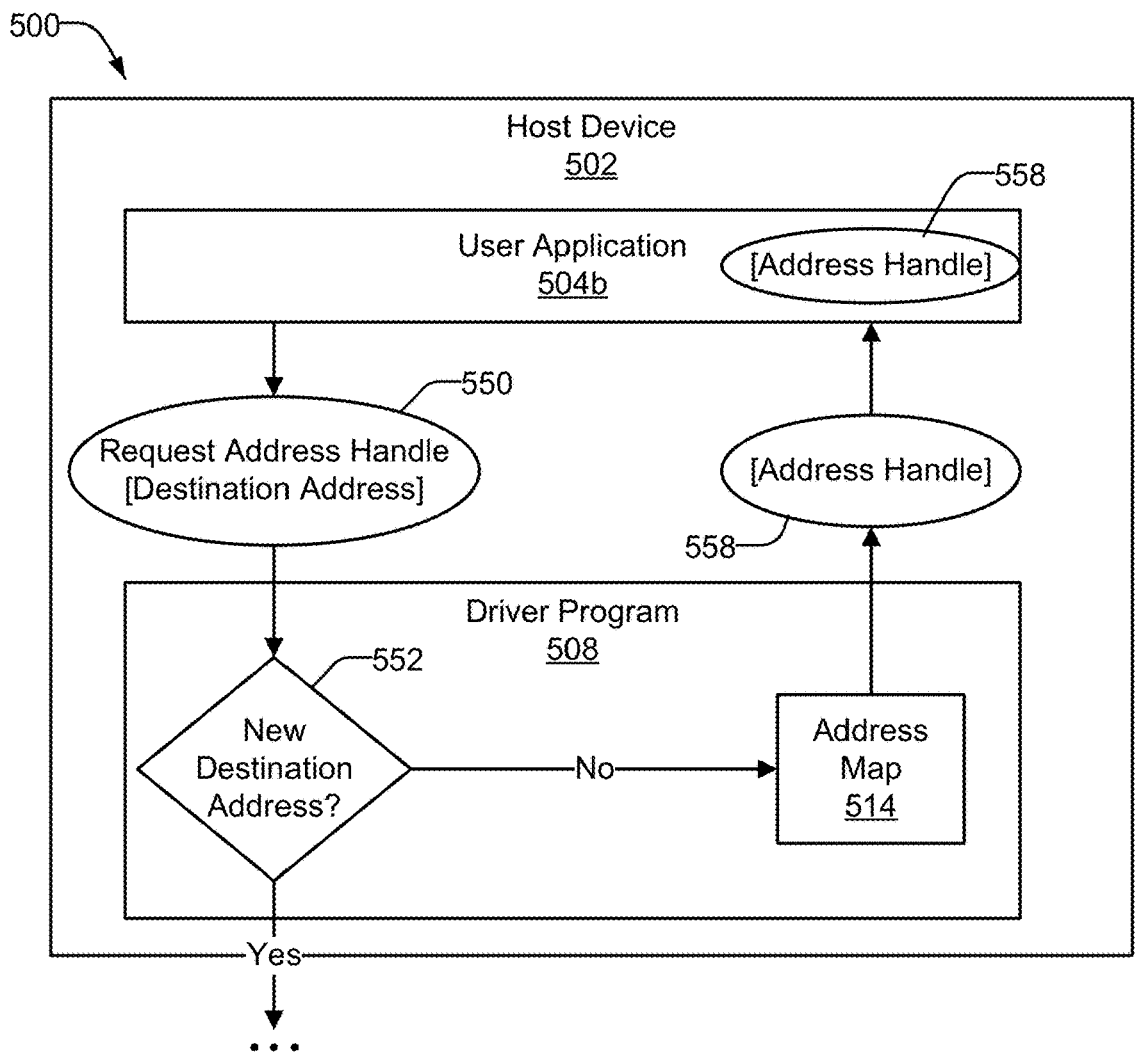

FIGS. 5A-5B illustrate an example of a process 500 by which a user application 504a may obtain an address handle that the user application 504a can subsequently use to transmit messages to another application. The process 500 may be similar to processes used by the Reliable Datagram and Unreliable Datagram transports, in that no explicit connection is established by the user application 504a. The process 500 may be different from those used by Reliable Datagram and Unreliable Datagram, in that the transport service (here, a Relaxed Reliable Datagram transport) may be responsible for establishing and maintaining connection to other systems. Furthermore, this connection maintenance is hidden from user applications, which are provided with address handles instead of explicit connections. The user application 504a may use the same process 500 to obtain an address handle for each destination with which the user application is to communicate. FIG. 5A illustrates the part of the process 500 when the destination has not been previously registered by any process executing on the host device 502. FIG. 5B illustrates the case where the destination has been registered previously.

In some implementations, a user application 504a may not use address handles to send messages over the network 530. For example, the user application 504a may use a destination address, or some other destination information, to transmit messages. In these cases, the user application 504a may provide the network adapter device with the destination information directly, instead of providing an address handle. In these implementations, the process 500 illustrated in FIGS. 5A-5B may not be used by the user application 504a, at least for some destinations. Instances where a user application uses destination information other than an address handle to transmit messages are described further with respect to FIGS. 6A-6B.

As illustrated in FIG. 5A, the process 500 may involve a host device 502 in communication with a network adapter device 520. The host device 502 may be a general purpose computing system, including components such as one or more processors, memory subsystems, peripheral devices, and so on, not illustrated here. The host device 502 may be executing one or more user applications, including the illustrated user application 504a. These user applications may be running in one or more virtual machines, not illustrated here. The host device 502 may also be executing one or more driver programs, including the illustrated driver program 508. The driver program 508 may be executing within an operating system kernel. Operating within a kernel may provide the driver program with more access privileges, including access to physical memory and the host device's hardware. Alternatively or additionally, the driver program 508 may be executing in user space, where it may have fewer access privileges, and may be less secure.

The network adapter device 520 may be a general purpose network interface card for communicating with a network. Alternatively or additionally, the network adapter device 520 may be a special purpose card for communicating with a specific type of network (e.g., an InfiniBand network). The network adapter device 520 may include a management module 522. The management module 522 may be, for example, firmware or an integrated circuit, such as an FPGA or ASIC. The network adapter device 520 may also include memory for storing data related to the operation of the network adapter device 520. Alternatively or additionally, memory may be integrated into the management module 522. In some implementations, the network adapter device 520 may include RDMA-type functionality (that is, kernel bypass functionality). In some implementations, the network adapter device 520 is a Peripheral Component Interconnect (PCI) type device, and communicates with the host device 502 over a PCI bus. In some implementations, the operations of the network adapter device 420, described below, may be implemented in an integrated circuit device, or a collection of integrated circuit device. For example, in various implementations, the operation of the network adapter device may be implemented in a SoC, an FPGA, or an ASIC, or a combination of these devices.

To obtain an address handle to communicate with a destination node, the user application 504a first determines the address of a destination. The destination is, in most cases, an application executing on another system connected to the network 530. The address of the destination may be a general address, such as the Internet Protocol (IP) or Media Access Control (MAC) address of a system on the network 530. Alternatively or additionally, the destination address may be specific, such as an address that identifies a specific target application. Alternatively or additionally, the destination address may fall between general and specific.

The user application 504a may obtain the destination address using standard mechanisms, For example, in some implementations, the user application 504a may obtain the destination address from user-provided input, and/or by a standard address resolution mechanisms, such as is provided by a domain name system (DNS) server. In some implementations, the user application 504a may obtain the destination address by exchanging messages with the target application. For example, the user application 504a may use a standard socket system, running on the network 530, and exchange its own address with the target application's address. As another example, the user application 504a may use a designated or purpose-built sideband network to exchange this information. In some implementations, the manner in which the user application 504a resolves the destination address is specific to the particular application.

Having determined a destination address, the user application 504a may submit a request 550 to a driver program 508 for an address handle. This request 550 may include at least the destination address. In some implementations, the driver program 508 is a kernel driver program, which may be configured to centrally manage address handles for all processes executing on the host device 502. In other implementations, the driver program 508 is a user-space device driver, with standard access privileges usually available to device drivers. In some implementations, the request 550 may first go to a device driver and then to a kernel driver. In other implementations, the request 550 may go directly from the user application 504a to a kernel driver.

The driver program 508 may determine, at step 552, whether the destination address in the address handle request 550 is "new;" that is, whether the driver program 508 has previously registered this destination address. The driver program 508 may maintain a list or directory, commonly called an "address map" 514, of destination addresses currently in use by a processes executing on the host device 502. In some implementations, the address map 514 may be maintained by the network adapter device 520. Upon receiving the address handle request 550, the driver program 508 may examine the address map 514 to see if it contains the destination address. In the example of FIG. 5A, the driver program 508 does not find the destination address in the address map 514, and thus determines that the destination address is new.

Having determined that the destination address is new, the driver program 508 may place a request 554 to the management module 522 executing on the network adapter device 520 for a new address handle. This new address handle request 554 may include the destination address. The management module 522 may run checks on the destination address, such as for example verifying that the user application 504*a* (or a virtual machine that the user application 504*a* is executing in) is allowed to communicate with the system where the target application may be found. The management module 522 may then store the destination address in memory 528 on the network adapter device 520.

In some implementations, the management module 522 may store a network address map object 556 in the memory 528. A network address map object is an instance of a data structure that may store information related to the destination address. For example, the network address map object 556 may include the destination address. In some implementations, the network address map object 556 may include a pre-generated packet header, generated by the management module 522. The pre-generated packet header may include source and destination addresses, and/or other routing information that may be needed for a packet to traverse the network to the destination system, and/or other header information. The pre-generated packet header may be stored to use later to quickly form packets. In some implementations, the network address map object may include pre-generated inner and outer headers. Inner and outer headers may be used when a packet generated according to one protocol is encapsulated in headers meant for another protocol. Encapsulation may occur in network tunneling, that is, transmitting packets configured according to one protocol over a network configured for a different network protocol. By encapsulating the packet and providing an outer header, the inner header need not be modified to accommodate the outer network protocol. Pre-generated inner and outer headers may be stored with the network address map object.

Because the destination address is new, the management module may, additionally or alternatively, configure a transport context 524. The transport context 524 establishes and maintains a connection with the system associated with the destination address. A transport context may be configured for each possible destination system connected to the network 530, though generally a transport context is not configured until it is needed. Transport contexts, in most implementations, describe a connection between two systems, rather than between two applications or between an application and a system. Configuring the transport context 524 may include establishing a connection with the destination system. This connection may be established, for example, by an exchange of messages between the network adapter device 520 and the destination system. Once configured, the transport context 524 may monitor and maintain the state of the connection. Maintenance of the connection may include, among other things, storing or otherwise keeping track of network address map objects associated with the destination system. As noted above, a destination address may be more specific than the address of the destination system, and so more than one network address map object may exist for a given transport context. The transport context 524 may be assigned a transport service type, such as Unreliable Datagram or Relaxed Reliable Datagram. Transport contexts are described in further detail below.

Having stored the destination address or a network address map object 556, and/or having configured the transport context 524, the management module 522 may next return an address handle 558 to the driver program 508. The address handle 558 may be a reference, pointer, and/or index referring to the destination address or network address map object 556 stored in the network adapter device's 520 memory 528. The driver program 508 may store the address handle 558 in its address map 514, where it may be found by the destination address. In some implementations, the network adapter device 520 may manage the address map 514, in which case the management module 522 may store the address handle in the address map 514. The destination address may now be considered "registered" because the driver program 508 has been made aware of it. The driver program 508 may next send the address handle 558 to the user application 504*a*. The user application 504*a* may, in most cases, store or otherwise maintain the address handle 558 for later use.

As noted previously, FIG. 5A illustrates the case where the user application 504*a* has requested an address handle for a destination that has not yet been registered with the driver program 508. FIG. 5B illustrates an example where a user application 504*b* requests an address handle for a destination address that has already been registered with the driver program 508. As in FIG. 5A, in FIG. 5B the user application 504*b* may first determine a destination address for a destination that the user application 504*b* is to communicate with. The user application 504*b* may be the same user application 504*a* as illustrated in FIG. 5A, or may be a different user application executing on the same host device 502.

Returning to FIG. 5B, having determined the destination address, the user application 504*b* may submit a request 550 to the driver program 508 for an address handle. In this example, the driver program 508, at step 552, may examine the destination address sent with the request 550, and may determine that the destination address can be found in the address map 514. This means that the destination address has already been registered with the driver program 508. This may also mean that the network adapter device 520 need not be accessed to provide an address handle, as was the case in FIG. 5A. In some implementations, the address map 514 is maintained by the network adapter device 520, in which case the driver program 508 may ask the network address map 514 to look up the destination address. In these implementations, the network adapter device 520 may determine that the destination address was previously registered, and provide an address handle 558 to the driver program 508.

In FIG. 5B, upon determining that the destination address was previously registered, the driver program 508 may then provide an address handle 558, using the information stored in the address map 514. For example, the address map 514 may store a reference, pointer, and/or index, and the driver program 508 may generate a new address handle 558 that refers to the stored reference, pointer, or index. The address handle 558 may be returned to the user application 504*b*, which may store the address handle 558 for later use.

Figure 6A:
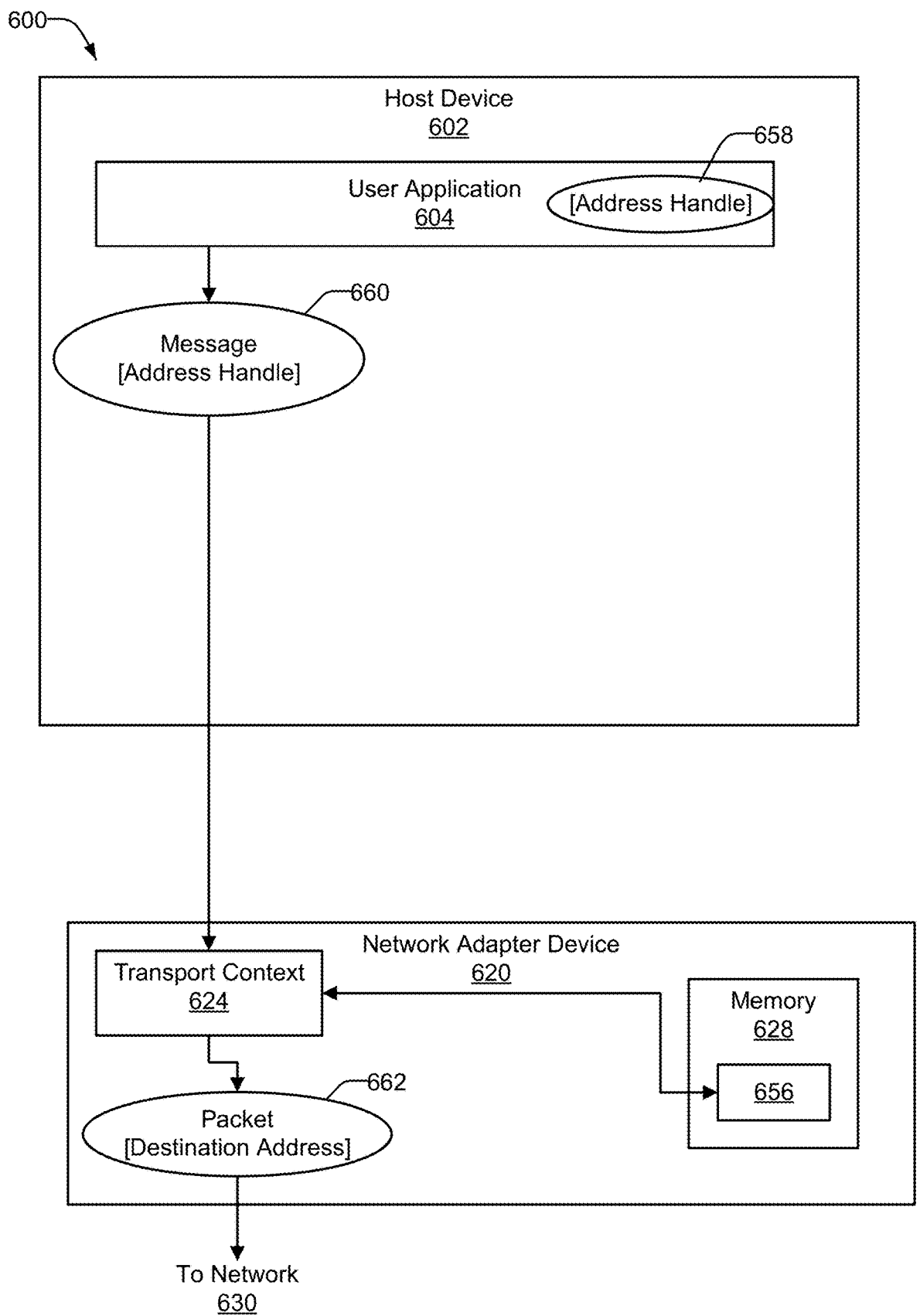
FIGS. 6A-6B illustrate an example of a process by which a user application may use an address handle to transmit a message.
Figure 6B:
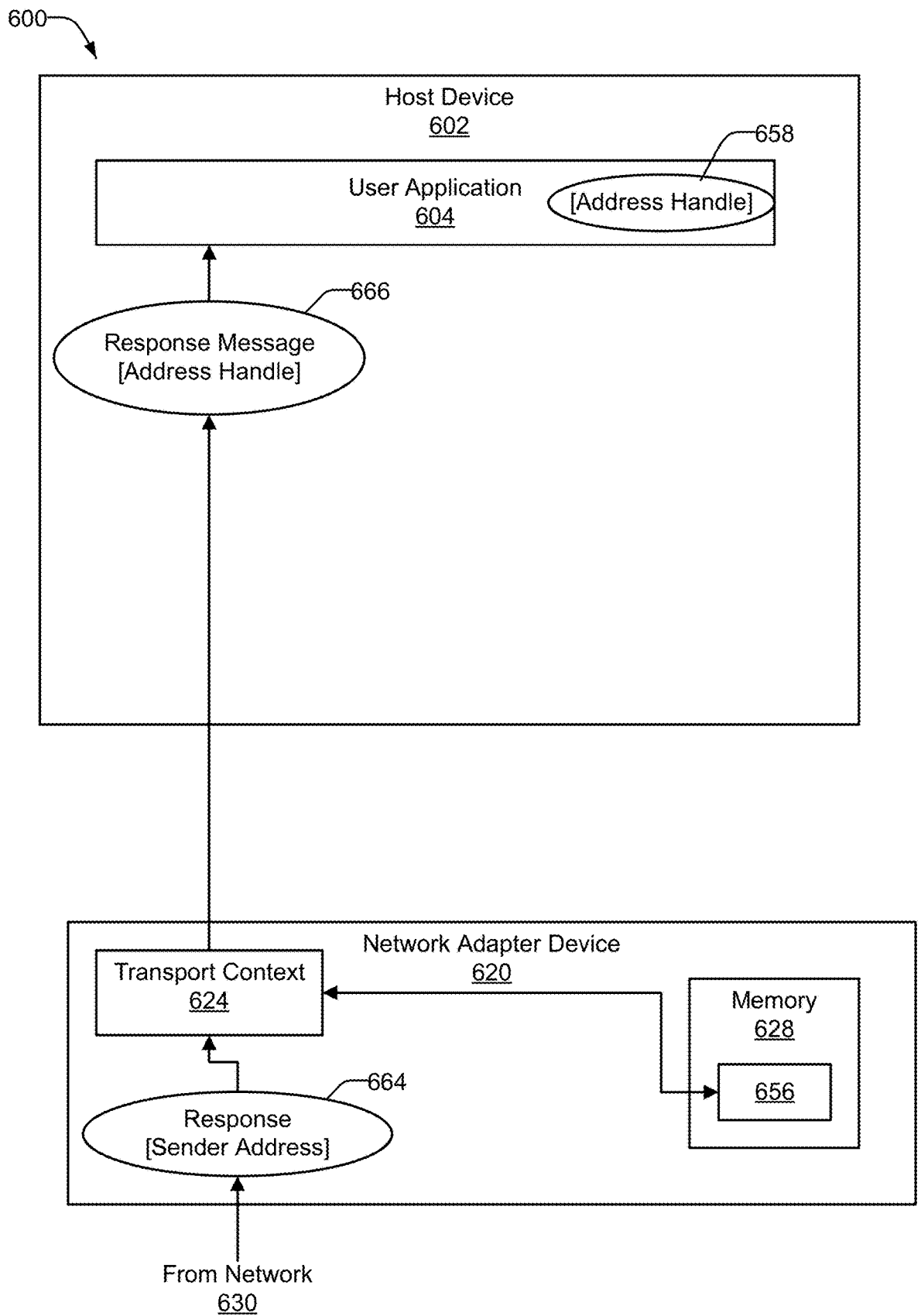

FIGS. 6A-6B illustrate an example of a process 600 by which a user application 604 may use an address handle 658, obtained according to FIGS. 5A-5B, to transmit a message. In some implementations, the user application 604 may not use an address handle 658, and may instead use other destination information to transmit a message. These implementations will be discussed in further detail below.

In FIGS. 6A-6B, the process 600 may involve a host device 602 and a network adapter device 620. The host device 602 may be a general purpose computing system, including components such as one or more processors, memory subsystems, peripheral devices, and so on, not illustrated here. The host device 602 may be executing one or more user applications, including the illustrated user application 604. The network adapter device 620 may be a general purpose network interface card for communicating with a network 630, and/or a special purpose card for communicating with a specific type of network. In some implementations, the operations of the network adapter device may be implemented in an integrated circuit device, and/or a combination of integrated circuit devices. The network adapter device 620 may also include memory 628, though in some implementations the memory 628 is incorporated into firmware (not illustrated) installed on the network adapter device 620. In some implementations, the network adapter device 620 does not have memory, or has only a small amount of memory, and may use memory on the host device 602 to store information.

In FIG. 6A, a user application 604 may have a message 660 that it intends to send to another application running on a different system on the network. In this example, the user application 604 has previously acquired an address handle 658 that is associated with the target application. To transmit the message 660 to the target application, the user application 604 may send the message 660, along with the address handle 658, to the network adapter device 620. In some implementations, the message 660 may first be transmitted to a device driver before being transmitted to the network adapter device 620.

Upon receiving the message 660, the network adapter device 620 may use an address handle to determine a transport context 624 for the message 660. The transport context 624 generally maintains the connection with the system that is to receive the message 660. Maintaining the connection may include, for example, transmitting packets, tracking status for outstanding packets, and—as will be explained in further detail below—setting up and taking down paths across the network to the target system.

The transport context 624 may also keep track of destination-related information stored in the memory 628, such as the network address map object 656 that is associated with the current address handle. The network address map object 656 may provide information for generating packets for the message 660. For example, the network address map object 656 may include a destination address (e.g., an IP address or MAC address of the target system, or an address of a target application). Alternatively or additionally, the network address map object 656 may include a pre-generated header that includes the addressing and/or routing information necessary for a packet to reach the target system. In some implementations, the network adapter device 620 may not have memory, or may use memory on the host device 602 for storing data such as destination-related information. In these implementations, when the transport context 624 looks up the network address map object 656, it may place a request with the host device 602 to read the network address map object 656 from host device 602 memory.

Using the destination-related information stored in the memory 656, such as the network address map object, 656, the network adapter device may generate one or more packets 662, containing all or part of the message 660. In implementations where the network address map object 656 provides a pre-generated packet header, packets 662 may be generated by prepending the pre-generated packet header to a payload, where the payload includes the message's 660 data. Having generated one or more packets 662, network adapter device 620 may then transmit the packet or packets over the network 630.

In some cases, the target application is expected to respond to the message 660. For example, when the message 660 is a read transaction, requesting some information that the target application has, the target application may be expected to respond with read data. As another example, the message 660 may have been a command to the target application to execute one or more operations, and return the result of those operations.

FIG. 6B illustrates an example of receipt of a response 664 sent in reply to the message 660 transmitted according to FIG. 6A. In FIG. 6B, the response 664 may be received over the network 630 by the network adapter device 620 in the form of a packet. The network adapter device 620 may receive many responses that have been sent in reply to messages transmitted by user applications executing on the host device 602. The network adapter device 620 and/or the host device 602 may thus identify which user application should receive the given response 664. The packet header may include information identifying the source of the response 664 (e.g., the address of the remote server and/or the remote application) and the destination for the response (e.g., the local server and/or user application 604). The packet payload may include the response 664 data.

The response 664 may be received by the transport context 624 that may be configured for the system that sent the response 664. Using the transport context 624, the network adapter device may unpack a response's 664 data from a packet received over the network 630. In some cases, the network adapter device 620 may assemble the response message from multiple response packets received over the network 630. The network adapter device 620 may also extract, from the response 664, the source address, that is, the address of the system and/or process that sent the response 664. In this example, the source address is the same as the destination address used to transmit the message 660 in FIG. 6A. In some implementations, the response 664 may include some other information that identifies either the source of the response, and/or the message 660 to which the response 664 corresponds.

Returning to FIG. 6B, the network adapter device 620 may use the source address (or other information identifying the response 664) to locate, in memory 628, a network address map object 656 that corresponds to the sender address. The network address map object 656 may provide the address handle that was used to send the message 660. This address handle may identify the user application 604 that sent the message 660. The address handle may be provided to the host device, along with the response 664, and the host device 602 may direct (e.g., using a driver program) the response message 666 to the user application 604. Alternatively, in some implementations, the response message 666 may be provided to the host device 602 with the source address that came with the response 664 from the network, rather than an address handle. The host device can then instead use the source address to direct the response message 666 to the user application 604.

The user application 604 may use the address handle to determine where the response message 666 came from, and/or which message the response message 666 is responding to. As previously noted, the address handle may be the same as the address handle used when the original message 660 was transmitted, in which case the user application 604 may be able to use simple look up mechanisms to determine which message the response message 666 is for. In some cases, the user application 604 may react to the response message, 666, such as for example retransmitting all or part of the message 660, or initiating a new communication with the destination.

As noted above, in some implementations, the user application 604 may transmit messages using address information other than an address handle. In these implementations, the user application 604 may use a process similar to the process 600 illustrated in FIGS. 6A-6B. For example, in FIG. 6A, the user application 604 may have a message for sending to another application running on a different system on the network. In this example, the user application 604 does not have an address handle for the destination application, but may have the destination information that it would use to obtain an address handle. For example, the user application 604 may have a network address for the destination system, in the form of (for example) an IP address and/or a MAC address. As another example, the user application may have a flow identifier. A flow describes a stream of packets, typically related to one another, traveling between on system and another. A flow identifier may identify the packets that belong to the same flow. A flow identifier may take the form of a value that may be included in the packets' header. Alternatively or additionally, a flow may be identified by network addresses, such as the address of the source system, the address of the destination system, a port at the source system from which the packets are sent, and/or a port at the destination system at which the packets are received. In some cases, the flow identifier is the result of a mathematical operation that uses the source and destination and/or ports as inputs.

The user application 604 may thus use the destination information to send the message 660. The user application 604 may send the message 660, along with the destination information, to the network adapter device 620. The network adapter device 620 may use the destination information to determine the appropriate transport context 624. For example, the network adapter device 620 may be configured to look up the transport context 624 using a network address or a flow identifier. Once the network adapter device 620 has determined the transport context 624, the network adapter device 620 may, using the transport context 624, generate and transmit packets to the network 630.

Compute clusters configured to use the connectionless message transfer processes 500, 600 as illustrated in FIGS. 5A-5B and 6A-6B may more efficiently manage network addresses, may have lower memory demands, and may be more scalable.

The address handles provided with connectionless message transfer may simplify address management in a host device. In implementations that do not use connectionless message transfer methods, more of the burden of address management may be placed on software executing on the host device. For example, the user application or a driver program may be required to generate packet headers, necessitating tracking of source and destination information. As another example, when a response is received, the driver program or user application may be required to read the entire packet header to identify the source and destination for the response. In contrast, in implementations that use connectionless message transfer methods, once a destination address has been registered, user applications and driver programs need only use the address handle to refer to a destination. Furthermore, when a response is received by the host device 602, it can be quickly identified by its address handle.

Address handles may also reduce the amount of memory required when many processes executing on one system are communicating with many processes executing on a different system. For each destination with which a user application intends to communicate, the user application may obtain and maintain a separate address handle. For each destination, however, only one network address map object need be created and stored, for all user applications may be communicating with the destination. Memory usage at the network adapter may thus be minimized. Memory needs for the driver program may also be minimized, since the driver program may, in some implementations, be maintaining an address map that may be used by all processes executing on a host device to obtain address handles. Additionally, once a destination address is registered with the driver program, providing address handles to other user applications for communicating with the same destination may be done quickly and without needing to communicate with the network adapter device.

Connectionless message transfer may also provide a computing cluster with greater scalability. As noted above, one of the problems that may arise with connected transport service types is that, as the number of processes attempting to communicate across the network increases, so do the number of connections. In contrast, in implementations that use connectionless message transfer methods, user applications need not establish connections, and instead obtain address handles. While the network adapter device does establish connections with other systems, in most cases only one connection is established between any two systems on the network. All traffic from one system may then use the single connection to reach the other system. Thus, the number of connections is not likely to increase as the number of processes increases, increasing only as a result of more nodes being added to the cluster.

II. Reliable Out-of-Order Packet Delivery

As discussed above, "connectionless" message transfer may be facilitated by the Relaxed Reliable Datagram transport service. This section discusses in greater detail management of message transfer using the Relaxed Reliable Datagram transport, including how messages may be addressed, how communication with the network is managed, and mechanisms for providing reliable delivery. Also provided is a discussion about how and why packets may arrive out of order.

Figure 7A:
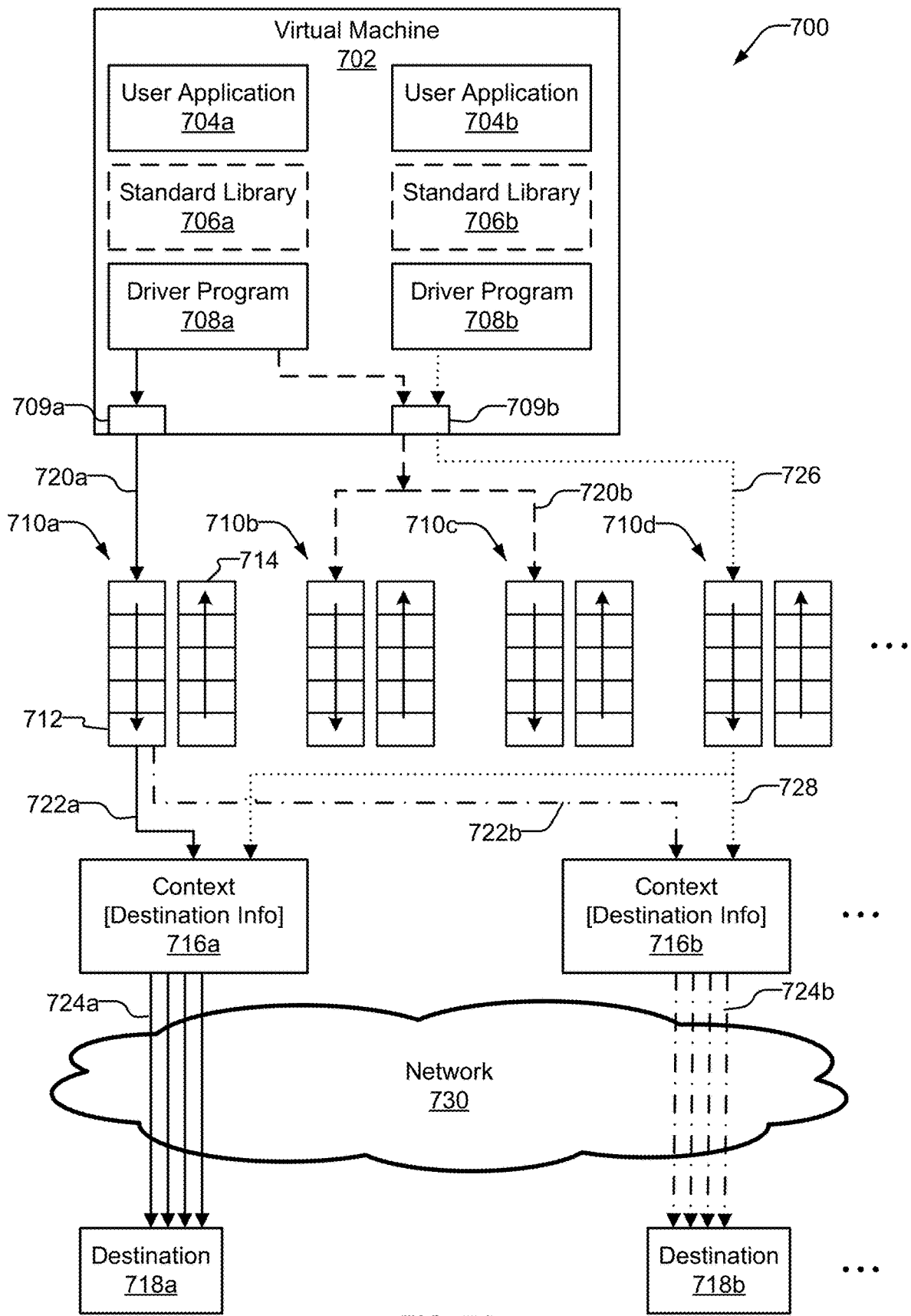
FIGS. 7A-7B illustrate an example of a communication stack that may be implemented for systems that include the Relaxed Reliable Datagram transport service.
Figure 7B:
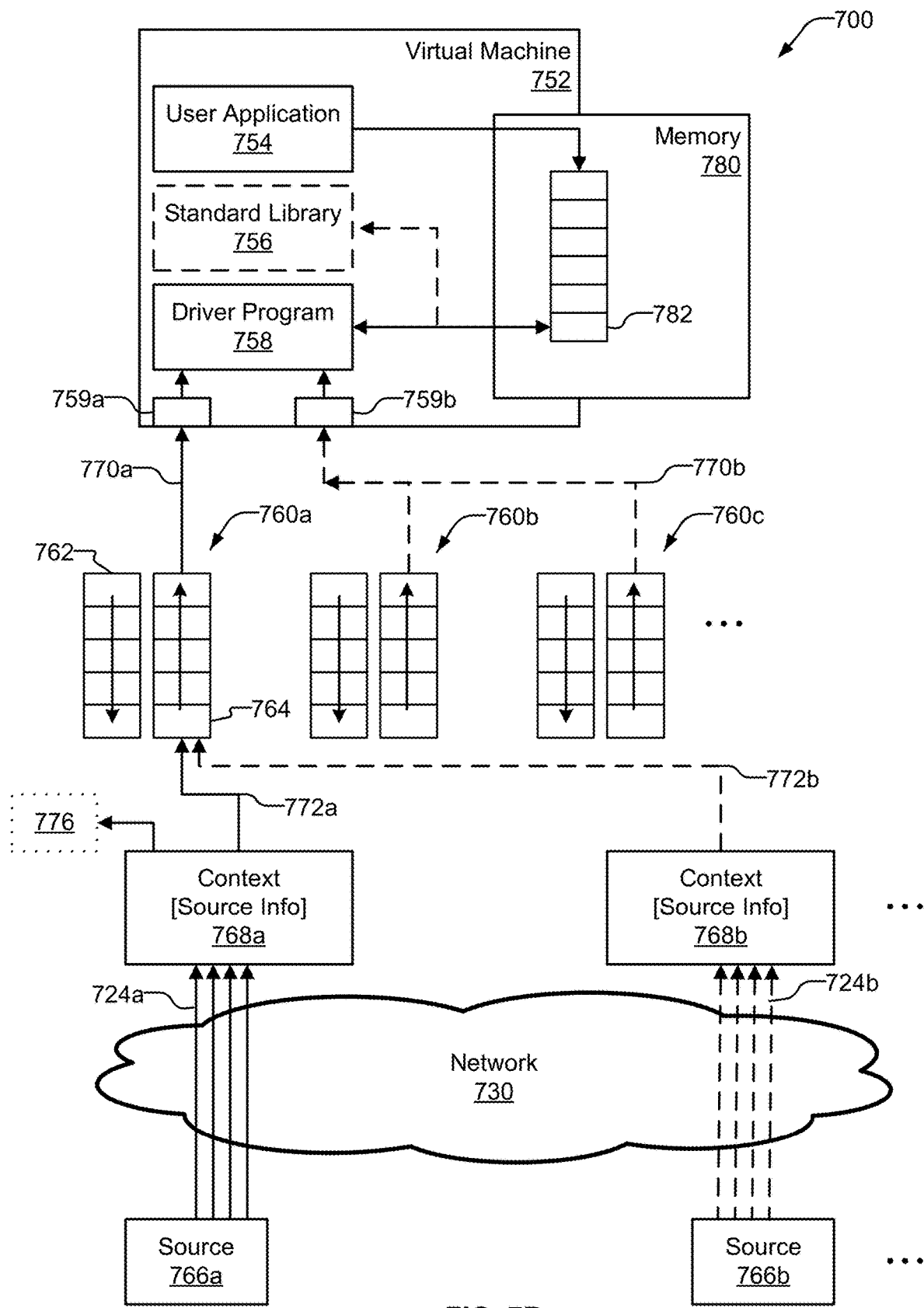

FIGS. 7A-7B illustrate an example of a communication stack 700 that may be implemented for systems that include the Relaxed Reliable Datagram transport service. FIG. 7A illustrates an example of the transmit side of the communication stack, and FIG. 7B illustrates an example of the receive side of the communication stack. In these examples, connections may have been previously established using, for example, the process 500 described with respect to FIGS. 5A-5B. For example, in FIGS. 7A-7B one or more transmit-side transport contexts 716*a-b* and received-side transport contexts 768*a-b* may have been configured, with (according to this example) each transmit-side transport context 716*a-b* managing a connection with a corresponding receive-side transport context 768*a-b*. While the example of FIGS. 7A-7B illustrates one system as the transmitting system and another system as the receiving system, the labels "transmit" and "receive" are assigned only for the sake of convenience. It is further understood that the system here called the receive-side system can also function as a transmitting system, with the system here called the transmitting system acting as the receiving system.

In the example of FIG. 7A, the transmit side of the example communication stack 700 is illustrated. In this example, the transmit side of the communication stack includes two user applications 704*a-b*, a number of queue pairs 710*a-d*, and one or more transmit-side transport contexts 716*a-b* in communication over a network 730 with one or more destination systems 718*a-b*. The example illustrated in FIG. 7A describes two user applications 704*a-b* for simplicity, and with the understanding that the illustrated virtual machine 702 and/or the system that is hosting the virtual machine 702 may more or fewer of user applications, each configured to use a similar communication stack.

In this example, the user applications 704*a-b* may be executing within a virtual machine 702 configured for a host device. Each user application 704*a-b* may use a standard library 706*a-b*, such as an OFED-type verbs library, to communicate the network 730. In some implementations, each user application 704*a-b* may be using a different standard library 706*a-b* The standard libraries 706*a-b* may provide a common set of network commands, such as "post send" to send messages, "post receive" to receive messages, and "poll" to check the contents of a completion queue. The standard libraries 706*a-b* may also provide an interface to a driver program 708*a-b*. The driver program 708*a-b* may provide commands for interacting with the virtual machine 702 operating system kernel and/or the system's hardware, including a network adapter device. The driver program 708*a-b* may be a kernel driver, in which case the driver program 708*a-b* may have higher access privileges. Alternatively, the driver program 708*a* may be a user space driver, and have lower access privileges. In some implementations, each user application 704*a-b* may be using a different driver program 708*a-b*. In other implementations, both user applications 704*a-b* may be using the same driver program 708*a-b*. In some implementations, the user applications 704*a-b* may communicate directly with the driver program 708*a-b*, rather than through the standard library 706*a-b*.

To communicate with the network 730, each user application 704*a-b* may be assigned one or more "communication endpoints." A communication endpoint describes a logical association with the user applications 704*a-b*, and may be used to identify the user applications 704*a-b* in messages sent by the user applications 704*a-b*. That is, a communication endpoint's identifier may be used, at least in part, as a sender address for a message. Communication endpoints may be implemented in different ways. For example, in some implementations, in the example communication stack 700, communication endpoints are each mapped to a queue pair 710*a-d*. In these implementations, a communication endpoint may be identified by a queue pair identifier, which is typically a number. Furthermore, in these implementations, the queue pair identifier may be used, at least in part, as the sender address for messages sent by the user applications 704*a-b*. Communication endpoints assigned to the user applications 704*a-b* may be maintained by the driver program 708*a-b*. Communication endpoints are, in most cases, not shared between user applications.

The virtual machine 702 may itself be assigned one or more virtual interfaces 709*a-b* for communicating with the network 730. These virtual interfaces 709*a-b* may, for example, have been assigned to the virtual machine 702 by the virtual machine's 702 operating system or by the host device's operating system. Each virtual interface 709*a-b* may be assigned an IP address. To communicate with the network 730, the user applications 704*a-b* may use one or more of the virtual interfaces 709*a-b*. Hence, a message sent by the user applications 704*a-b* using, for example, one of two available virtual interfaces 709*a*, may have that virtual interface's IP address as the sender address for the message.

In some implementations, the user applications 704*a-b* may thus be identified by the IP address of this virtual interface 709*a*.

The virtual interfaces 709*a-b* may have been assigned to the user applications 704*a-b* when the user applications 704*a-b* had registered themselves with the virtual machine 702 operating system kernel, and/or when the user applications 704*a-b* requested assignment to a queue pair 710*a-d*, and/or when the user applications 704*a-b* first registered to communicate with a destination system 718*a-b*. In some implementations, more than one user application 704*a-b* may use a given virtual interface 709*a-b*. For example, in the example of FIG. 7A, the first user application 704*a* and the second user application 704*b* have both been assigned to the second virtual interface 709*b*.

In these and other implementations, the user applications 704*a-b* may be using both a communication endpoint and one or more virtual interfaces 709*a-b* to communicate with the network 730. In these implementations, the user applications 704*a-b* may be identified by a combination of the communication endpoint's identifier (e.g., a queue pair number) and the virtual interface's 709*a-b* IP address. Furthermore, a combination of the virtual interfaces' 709*a-b* IP address and the communication endpoint identifier may be used as the sender address for messages sent by the user applications 704*a-b*.

As noted above, in some implementations (including those using Relaxed Reliable Datagram transport), each communication endpoint may be mapped to an individual queue pair 710*a-d*. Queue pairs generally include a send queue 712, for messages being transmitted to the network, and a received queue 714, for receiving messages coming in from the network 730. In some implementations, each communication endpoint assigned to the user applications 704*a-b* may be assigned to a different queue pair 710*a-d*. In other implementations, queue pairs may be shared between communication endpoints, though in these implementations limitations and/or additional parameters may need to be added to the configuration to ensure that each communication endpoint can be uniquely addressed and identified.

In many cases, queue pairs 710*a-d* may be implemented in hardware on a network adapter device, though in some cases the queue pairs 710*a-d* may be implemented in software on the network adapter device, and/or may be implemented in software on the host device, and/or may exist in the host device's operating system and/or in a hypervisor, a hardware and/or software layer that creates and manages virtual machines. In some implementations, the network adapter device (or the operating system or the hypervisor) may assign a queue pair 710*a-d* when a queue pair 710*a-d* is requested by a user application 704*a-b*, a driver program 708*a-b*, or a user application 704*a-b* making a request through a driver program 708*a-b*. In some implementations, one queue pair (e.g., queue pair number zero or one) may be reserved for communication management messages, such as messages for setting up or taking down connections and messages passed between user applications to exchange their respective addresses.

As noted above, in some implementations, a queue pair 710*a-d* (e.g. the first queue pair 710*a*) may be assigned to a communication endpoint that is associated with the specific user application 704*a-b* (e.g., the first user application 704*a*). The queue pair 710*a*, however, need not be associated with a specific destination, and so may receive messages from the user application 704*a* that are targeted to different destinations on the network.

In some implementations, queue pair 710*a-d* assignment may be tracked for each virtual interface 709*a-b*. Doing some may, for example, facilitate migration of the virtual machine 702. Migration is the process of moving the virtual machine 702 to a different physical system, either with or without first shutting down the virtual machine 702. After migration of the virtual machine 702, communication endpoints may be assigned to new queue pairs, but packets still in flight can still reach these communication endpoints because the old queue pair identifiers have been maintained.

As discussed above, the user applications 704*a-b* may be identified by either the identity of a communication endpoint that is assigned to the user applications 704*a-b*, by the IP of a virtual interface 709*a-b* being used by the user applications 704*a-b*, or by both the identity of a communication endpoint and the IP address of a virtual interface 709*a-b*. A target user application (e.g., the user application 754 illustrated in FIG. 7B) may be identified in a similar fashion.

Turning now to a specific example illustrated in FIG. 7A, in this example, the first user application 704*a* has been configured with at least three communication endpoints, as indicated by the three illustrated queue pairs 710*a-c*. Furthermore, the first user application 704*a* has associated one communication endpoint with one available virtual interface 709*a* (as indicated by the solid arrow 720*a* indicating communication with first queue pair 710*a*) and has further associated two communication endpoints with a second available virtual interface 709*b* (as indicated by the broken arrow 720*b* indicating communication with a second 710*b* and third 710*c* queue pair). As a further example, the second user application 704*b* has been configured with one communication endpoint, as indicated by the dotted arrow 726 to the fourth queue pair 710*d*. Furthermore, the second user application 704*b* has associated this communication endpoint with the second virtual interface 709*b*.

In this example, the first user application 704*a* may have a message to transmit to a destination system 718*a* on the network 730. Using its first communication endpoint, the first user application 704*a* may place the message, along with information (e.g., an address handle) identifying the destination system 718*a* for the message, in the send queue 712 of the first queue pair 710*a* associated with the communication endpoint. Placing the message in the send queue 712 typically does not require the assistance of a host device processor. Additionally, placing the message in the send queue 712 typically also does not require arbitration by the user application 704*a* for access to the queue pair 710*a*, since in most cases, the user application 704*a* has exclusive use of the queue pair 710*a*.

In some implementations, a network adapter device manages the queue pairs 710*a-d*. The network adapter device may ensure that the queue pairs 710*a-d* are serviced in a timely fashion. Alternatively or additionally, the network adapter device may service the queue pairs 710*a-d* according to a priority, traffic type, and/or service level agreements assigned to each queue pair 710*a-d*.

Continuing with the example of FIG. 7A, when the first send queue 712 is serviced, a network adapter device may remove and process (for example, using firmware or an integrated circuit) the message placed in the send queue 712 by the user application 704*a*. The network adapter may examine destination information pushed into the send queue 712 with the message, and identify an appropriate transport context 716*a-b*. As discussed earlier, the transport contexts 716*a-b* each manage a connection with a destination system 718*a-b* on the network. In most implementations, a transport context 716*a* describes a connection between one source system and one destination system, and is not associated with a specific user application or queue pair. Hence, messages from different user applications, and/or sent through different communication endpoints, may map to the same transport context 716*a*. Conversely, messages from one user application 704*a* may be directed to different transport contexts 716*a-b*. For example, in the illustrated example, messages from the first queue pair 710*a*, which is mapped to the first user application 704*a*, may be directed to both the first transport context 716*a* (as indicated by the solid arrow 722*a*) and the second transport context 716*b* (as indicated by the dashed arrow 722*b*). Similarly, messages from the fourth queue pair 710*d*, which is mapped to the second user application 704*b*, may also be directed to both transport contexts 716*a-b* (as indicated by the dotted arrow 728). Each of the queue pairs 710*a-d* may further direct messages to additional transport contexts that are not illustrated here. The transport context 716*a-b* for a specific message may be identified by destination information that is provided with the message.

In some implementations, a transport contexts 716*a-b* (e.g., the second transport context 716*b*) may be configured to provide a transport service similar to Reliable Connection transport. In these implementations, the transport context 716*b* may be assigned to a single queue pair (e.g., the second queue pair 710*b*). On the receive side, the corresponding receive-side transport context 768*b* would also be assigned to a single queue pair (e.g. the second queue pair 760*b*). Assigning the transport contexts 716*b*, 768*b* each to a single queue pair may result in the sending user application 704*a* and the receiving user application 754 having an exclusive communication channel with each other, as would be the case when the transport contexts 716*b*, 768*b* are providing Reliable Connection transport. The transport contexts 716*b*, 768*b* may, in fact, be providing Relaxed Reliable Datagram transport, which may guarantee packet delivery just as would Reliable Connection.

Continuing with the example of FIG. 7A, in this example, a first transport context 716*a* has been identified as the transport context for a message popped from the first send queue 712. In some implementations, the transport context 716*a* may provide a pre-generated packet header. The pre-generated packet header may include pre-determined source and destination addresses, and/or other information necessary for routing a packet from the transmit side to the receive side. In some implementations, the transport context 716*a* may provide pre-generated inner and outer headers, for situations where the packets will be tunneled.

As noted previously, the transport contexts 716*a-b* may manage the connection with a corresponding destination system 718*a-b* on the network 730. Typically, such as in a computing cluster, there may be multiple paths 724*a-b* available from the transmit side system to the receive side system. In such situations, the transport contexts 716*a-b* may manage the multiple available paths 724*a-b* across the network 730. Management of the paths 724*a-b* may include setting up and taking down paths 724*a-b*, where the paths 724*a-b* may be taken down when they become too congested or if there was a link failure along that path. Additionally, the transport contexts 716*a-b* will also attempt to transmit packets across all available paths 724*a-b*. Doing so may improve load balancing across the network and/or assisting in maintaining up-to-date information about congested or faulty paths. Congested and faulty paths may be detected, for example, when packets do not reach a destination system 718*a*, or take a long time to arrive at the destination system 718a. Management of the multiple paths 724a-b across the network is described in further detail with respect to FIG. 8.

Continuing with the example illustrated in FIG. 7A, in this example, the first transport context 716a may transmit the message from the first user application 704a over multiple paths 724a over the network 730 to the destination system 718a. In some implementations, a network adapter device may use the transport context 716a to generate and send one packet that includes the message. In some implementations, the network adapter device may generate multiple packets, each containing a portion of the message. These multiple packets may each take a same path or different paths to reach the destination system 718a. In some implementations, and as is discussed in greater detail below, the transport context 716a may monitor status for each packet, to ensure that each packet is delivered to the destination system 718a.

FIG. 7B illustrates the receive side of the communication stack 700. As on the transmit side, the receive side includes a user application 754, one or more queue pairs 760a-b, and one or more receive-side transport contexts 768a-b in communication with corresponding source systems 766a-b on the network 730. In the example illustrated by FIG. 7B, the illustrated user application 754 has been configured to communicate with at least (and not necessarily exclusively with) the first user application 704a illustrated in the example transmit side of FIG. 7A. Hence, in the example illustrated in FIG. 7B, a first source system 766a corresponds to the transmit-side system illustrated in FIG. 7A. Furthermore, in FIG. 7B, a transport context 766a has been configured to communicate with the source system 766a, and may manage the connection with a transport context 716a at the source system 766a. Similarly, second source system 766b also corresponds to the transmit-side system illustrated in FIG. 7A, but is configured to connect to a different transmit-side transport context 716b.

FIG. 7B also illustrates how the user application 754 may configure buffers 782 for sending and receiving messages. Though not illustrated, the transmit side user application 704a of FIG. 7A may also configure buffers, should they be required. In FIG. 7B, the user application 754 may typically, though not always, be executing within a virtual machine 752. In some implementations, the virtual machine 752 may provide virtual memory 780, in which the user application 754 may allocate space for buffers 782. In these implementations, the addresses of the buffers 782 may be virtual, and reside in the virtual address space of the virtual machine 752. In many cases, the virtual addresses may be registered with the operating system kernel (either the virtual machine operating system or the host device operating system), and with a network adapter that is providing access to the network 730. Registration with the kernel may fix the mapping of the virtual addresses to guest physical addresses, which may prevent virtual pages that include the buffers 782 from being swapped out and creating some inefficiency. Registration with the kernel may be accomplished through a kernel driver, executing either within the virtual machine 752 or on the host system. The kernel driver may pass the registration information to the network adapter device, which may return memory registration keys. The memory registration keys may subsequently be passed by the user application 754, along with buffer 782 addresses, to the network adapter device with messages being sent by the user application. This process of obtaining registration keys may provide the network adapter device with privileged access to read from and write to the buffers 782 directly and without requiring assistance from a host device processor.

In some implementations, the user application 754 may allocate buffers 782 in the physical memory of the host device, instead of or in addition to in virtual memory. In these implementations, the user application 754 may have special trusted status, since giving a user application access to physical memory is less secure than limiting the user application 754 to only virtual memory.

In some implementations, the user application 754 may use a standard library 756 such as an OFED-type verbs library, to communicate with the network 730. The standard library 756 may provide an interface to a driver program 708a. The driver program 708a may provide commands for interacting with the virtual machine 752 operating system kernel and/or the system's hardware, including a network adapter device. In some implementations, the user application 754 may communicate directly with the driver program 758, rather than through the standard library 756.

To communicate with the network 730, user application 754 in this example may be assigned one or more communication endpoints. In some implementations, each communication endpoint may be mapped to a queue pair 760a-c, which each include a send queue 762 and a receive queue 764. In these implementations, a communication endpoint may be identified by a queue pair number. In these implementations, the queue pair number may be used, at least in part, as the address of the user application 754.

The virtual machine 752 may further be assigned one or more virtual interfaces 759a-b for communicating with the network 730. Each virtual interface 759a-b may be assigned an IP address. In some implementations, the user application 754 may use one or more of the virtual interfaces 759a-b for communicating with the network 730. In these implementations, the user application 754 may use the IP address of a virtual interface 759a to identify itself to other systems and processes on the network 730. In some implementations, the user application 754 may use both an IP address assigned to a virtual interface 759a and a communication endpoint identifier (e.g., a queue pair number) to identify itself.

Continuing the example discussed with respect to FIG. 7A, in that example, the transmit-side user application 704a transmitted a message by placing the message, along with information identifying the destination system 718a for the message, in a send queue 712 of a queue pair 710a. A network adapter device may subsequently have serviced the send queue 712, and determined, using the destination information, a transport context 716a to use to send the message. The network adapter device may then, using transport context 716a, have generated one or more packets for transmitting the message. With the assistance of the transport context 716a, the network adapter device may then have transmitted the packet or packets over multiple paths 724a over the network and to the destination system 718a.

This example continues in FIG. 7B, where the transmitting system is represented as a first source system 766a on the network. The packet or packets from the source system 766a are received by the receive-side system over the multiple paths 724a over network 730. In some implementations, the packets are received by a network adapter device. In these implementations, the network adapter device may determine which transport context 768a-b corresponds to the source system 766a for the packets. The network adapter device may use a source address provided with the packets, and/or a destination address, to locate the proper transport context (which in this example is the first transport context 768a). In some implementations, the network adapter device may have a network address map containing source addresses, and the network adapter device may index the network address map using the source address to find the transport context 768a.

In some implementations, the transport context 768a may be configured to provide transport services similar to Reliable Connection transport. In these implementations, the network adapter device may have a table of transport contexts 768a-b configured as Reliable Connection transports. The network adapter device may further use a destination queue pair number to index the table, and the table may indicate the proper transport context 768a. In some cases, the network adapter may also use a context identifier included with the incoming packets to locate the correct transport context 768a.

As will be discussed on greater detail below, the transport context 768a may monitor the status for each packet, to ensure that each packet transmitted by the source system 766a system is received. The transport context 768a (particularly the Relaxed Reliable Datagram transport service) may not track whether packets are received at the receiving system in order, and is generally only concerned with ensuring that all packets arrive. The transport context 768a may, in some implementations, process incoming packets, and, for example, remove network headers. The transport context 768a may also detect when duplicate packets 776 are received. Duplicate packets 776 may be received when a packet is, or appears to be, dropped within the network 730. When a packet appears to have been dropped in the network 730, the transport context 768a may request that the source system 766a resend the packet. In some cases, the requested packet may be received more than once by the receiving system, such as when the packet was not actually dropped, but only took an exceptionally long time to arrive, and so only appeared to have been dropped. When this occurs, the transport context 768a may drop any additional copies (e.g., the duplicate packets 776) received after the first copy is received.

The network adapter device may receive (e.g., using firmware or an integrated circuit) packets from the transport context 768a and determine a queue pair 760a-c that is to receive the packets. The network adapter may use destination information, such as a destination address included with the incoming packets, to determine the appropriate queue pair 760a. For example, the destination address may include, at least in part, a queue pair number. The network adapter device may place the packet or packets into the receive queue 764 of the determined queue pair 760a, as indicated by the solid arrow 772a. Queue pairs 760a-c may be associated with specific communication endpoints, and not necessarily with specific transport contexts 768a-c. Hence, the particular queue pair 760a may be receiving packets from different transport contexts, as indicated by the broken arrow 772b.

From the receive queue 764, the network adapter may transfer packets to the buffers 782 in the host memory 780 (as indicated by the solid arrow 770a). For example, the network adapter may execute a DMA operation, which typically does not require a host device processor, to write to the host memory 780. In some implementations, an IP address of a virtual interface 759a and/or an identity of a communication endpoint (either or both of which may be provided as the destination address for a packet) may assist transferring the packets to the correct virtual machine 752. In some implementations, the driver program 758 may assist in transferring packets to the buffers 782. In some implementations, the standard library may provide this assistance.

The user application 754 may be configured to use multiple communication endpoints, and so may be receiving packets at multiple queue pairs 760a-c. The network adapter device may ensure that the queue pairs 760a-c are serviced fairly, and/or may service the queue pairs 760a-c according to priorities and/or service level agreements assigned to each queue pair 760a-c.

In some implementations, the individual buffers 782 are filled in whatever order, and at whatever time, they may be available. Packets may also be placed in the buffers 782 in any order. In most cases, the network adapter may be configured to move packets from the queue pairs 760a-c to the host memory 780 as quickly as possible, to attempt to achieve the lowest possible latency. For this and other reasons, the network adapter typically also does not buffer packets outside of the queue pairs 760a-c. Sometimes, not enough buffers 782 may be available. This may occur because the user application 754 has not allocated enough buffers, or is not freeing buffers quickly enough. As will be explained further below, when this occurs, the network adapter may begin to drop packets that are directed to the user application 754, and inform the user application 754 that packets are being dropped. Response messages may also be sent back to the source system to inform the source system that packets are being dropped. In some cases, the source system may respond by reducing the rate at which it delivers packets to this particular user application 754. In some implementations, it is left to the user application 754 to determine what, if anything, should be done about the insufficient buffer space and/or dropped packets.

As noted previously, packets may be placed into the buffers 782 in any order. In some implementations, the driver program 758 may be responsible for re-ordering the packets to place them in their intended sequence. In these implementations, the driver program 758 may present the packets in order to the user application 754, and the user application 754 may be unaware that the packets had arrived out of order. In some implementations, the user application 754 may re-order the packets itself. In either case, the user application 754 and/or the driver program 758 may take advantage of the higher processing power available at the host device.

Compared to transport services—such as Reliable Connection and Reliable Datagram—that guarantee packet ordering, a system using Relaxed Reliable Datagram transport may provide better scalability and better latency, and thus possibly better performance for high performance computing applications. For example, transport services that guarantee packet order may require that a network adapter device buffer a certain amount of packets and then re-order them before providing them to the host device. In some cases, when packets arrive out of order, the network adapter device may need to drop all the packets in a flow and request that a flow be resent from the beginning. While having the network adapter device re-order packets may simplify the host device software, the requirements for the network adapter may become more complex, and may increase packet transfer latency and bandwidth consumption.

In contrast, with Relaxed Reliable Datagram transport, a network adapter device may buffer packets for only a minimal amount of time, thus possibly improving overall latency. Re-ordering operations may then be conducted by software on the host device, where the software may make use of powerful host device processors at a minimal cost to latency. The Relaxed Reliable Datagram transport can be made to guarantee ordering, but doing so would require either tracking packet order state for all flows from the transmit-side queue pairs to the receive-side queue pairs, or serializing packets that belong to different logical flows into a single sequence of packets. Tracking packet order state between all combinations of transmit-side queue pairs and receive-side queue pairs may make the system difficult to scale. Serializing packets from different logical flows may create a false dependency between unrelated flows, and may increase the average and maximum packet transfer latency. In most cases, as it is, user applications will keep track of their own message flows, and can be quickly re-configured to manage packets that arrive out of order. The Relaxed Reliable Datagram transport thus may leave packet ordering to host device software, and focuses on guaranteeing that all packets are delivered.

As discussed previously, in a typical computing cluster system there may be multiple paths that packets can take to travel across the network from a source system to a destination system. A stream of packets from one source to one destination may be called a flow of packets or, more simply, a flow. The packets in a flow may be related to each other (e.g., they belong to one continuous stream of data, such as a video or a conversation), and a flow may end and restart (e.g., the video or conversation may end, and a new one may begin). As also noted previously, greater efficiency across the cluster may be achieved when packets from a given source to specific destination are spread across all available paths. Existing transport services, however, are typically designed for in-order packet delivery, and may be configured to send one flow over only one path to ensure the probability of in-order packet arrival and to reduce performance degradation. Furthermore, these transport services typically are able to change paths only when one flow ends and another begins.

Figure 8:
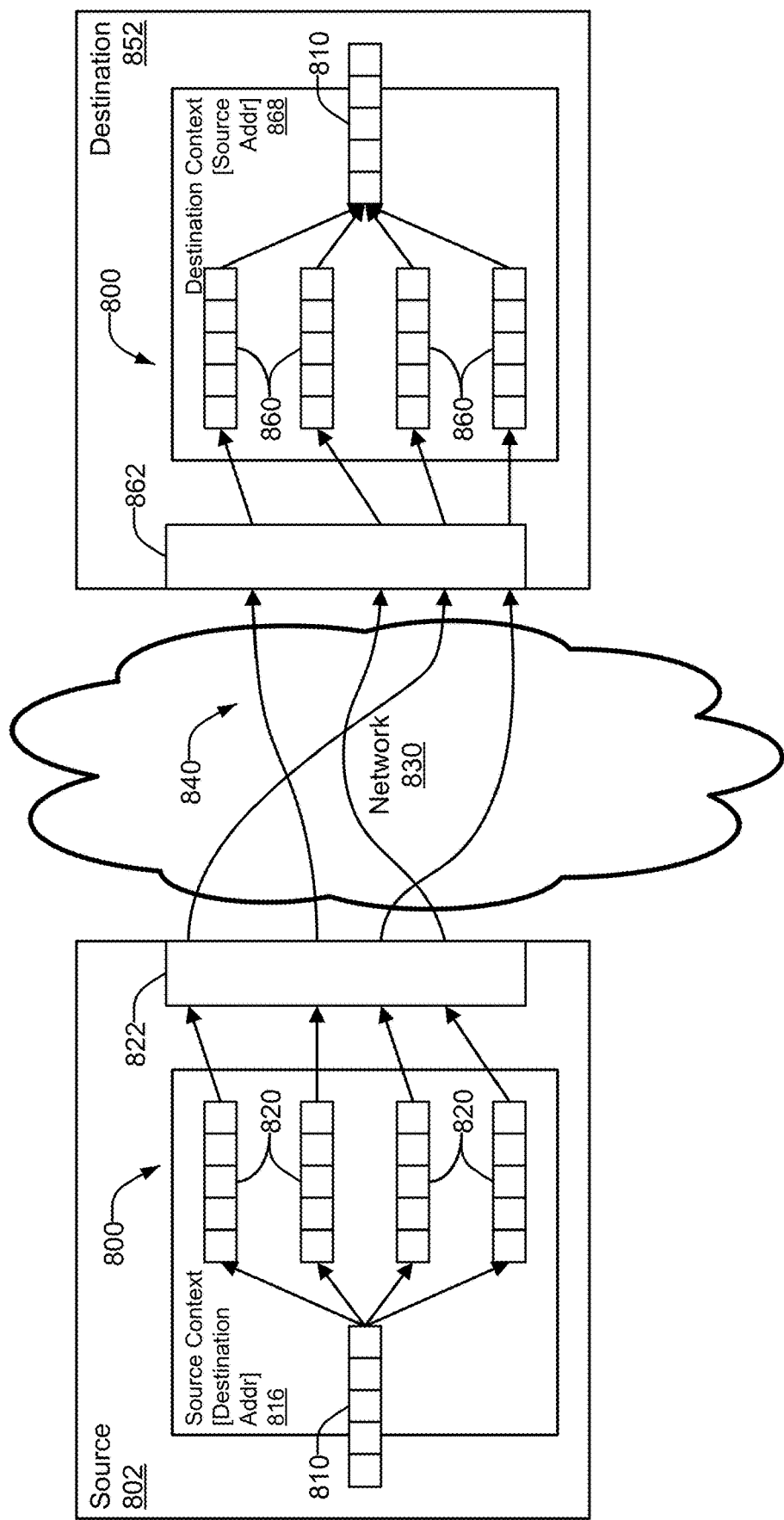
FIG. 8 illustrates an example of how the Relaxed Reliable Datagram transport may manage multiple paths across a network to achieve greater utilization across available paths.

FIG. 8 illustrates an example of how the Relaxed Reliable Datagram transport may manage multiple paths 840 across a network 830 to achieve greater utilization across available paths 840. In the example of FIG. 8, a flow 810 of packets from a source system 802 to a destination system 852 may be divided into groups of packets, which may be referred to as "flowlets" 800. A source transport context 816 and a corresponding destination transport context 868 may manage transmit and receipt of the flowlets 800, including setting up and taking down the paths across the network 830. The source and destination contexts 816, 868 may also monitor the status of packets on a per-flowlet 800 basis. Each flowlet 800 may be transmitting over a different path 840, with all packets in one flowlet 800 using the same path. In some implementations, the all packets are transmitted from the source system 802 over one port 822, and are received at the destination system 852 at one port 862. In other implementations, the source system 802 and/or the destination system 852 may have multiple ports connected to the network 830.

As discussed previously, in a Relaxed Reliable Datagram transport implementation, a source context 816 is typically associated with one, specific destination context 868. The source context 816 in most cases is identified by an address associated with the destination system 852. This destination address would be assigned to the destination context 868. Similarly, the destination context 868 may be identified by an address at the source system 802 that has been assigned to the source context 816. The source context 816 may manage transmit of a flow 810 of packets, which may include packets from multiple user applications running at the source system 802. The packets in the flow 810 would all be destined for user applications running on the destination system 852. The destination context 868 may manage receipt of the packets in the flow 810 at the destination system 852.

In some implementations, the source system 802 may initialize a new flowlet 800 when the address associated with the destination context 868 is mapped (e.g., according to the example of FIGS. 5A-5B) for the first time. Once the first flowlet 800 in the example of FIG. 8 has been initialized, additional flowlets 800 may be established. Connection establishment messages may be attached to normal network traffic, and typically involve the source system 802 sending a connection request to the destination system 852, and the destination system 852 responding by sending an acknowledgement message back to the source system 802. In some implementations, flowlets 800 are unidirectional, as in this example, where the flowlets 800 originate at the source system 802 and terminate at the destination system 852. The same source context 816 and destination context 868 may be used to establish flowlets originating at the destination system 852 and terminating at the source system 802, though in some implementations these would be a different set of flowlets than are illustrated in the example of FIG. 8, and would be managed separately.

The example of FIG. 8 illustrates four flowlets 800 by way of example. In various implementations, more or fewer flowlets 800 may be used by the transport contexts 816, 868. In some implementations, and the number of flowlets 800 between the source system 802 and the destination system 852 may be configurable, and/or may be limited only by the number of available paths 840 between the two systems 802, 852.

Typically, flowlets 800 are only known to the transport contexts 816, 868, and are independent of queue pairs, virtual machines, or user applications. Stated another way, user applications running on the source system 802 and the destination system 852 are unaware of the flowlets 800, interacting, in most implementations, only with standard libraries and/or driver programs. Packets from various sources may be placed into the same flow 810 when the packets are addressed to the same destination system 852. Packets from the flow 810 may be assigned to flowlets 800 such that the packets are distributed evenly across the flowlets 800. Alternatively or additionally, packets may be assigned so that flowlets 800 that are running low on packets are assigned to first. Flowlets 800 that run low quickly may be using faster paths, and so assigning packets to these flowlets 800 may improve overall utilization and throughput.

The source context 816 may track packets on a per-flowlet 800 basis. Each flowlet 800 may maintain a packet sequence number, and as packets from the flow 810 are assigned to a flowlet 800 each packet may also be assigned the next packet sequence number for that flowlet 800. Packets may also be assigned a flowlet identifier, which may be used by the destination context 868 to identify each packet's flowlet 800.

For each flowlet 800, the source system 802 may maintain status information 820 for each packet assigned to the flowlet 800. The status information 820 may include each packet's packet sequence number and any information that may be needed to retransmit a packet. In most cases, the status information 820 may be maintained for a packet from the time the packet is transmitted until the source system 802 receives an acknowledgment that the packet was received. The source context 816 may maintain status information 820 for only a limited number of outstanding packets per flowlet 800. For example, the source context 802 may be configured to only allow 32 outstanding packets per flowlet 800. The number of outstanding packets per flowlet 800 may be fixed or may be configurable. When a flowlet 800 is very slow— that is, acknowledgements are slow to arrive, or never arrive at all—the source context 802 may move the flowlet 800 to another path 840.

The destination context 868 may also track packets on a per flowlet 800 basis, with its own status information 860. The status information 860 maintained by the destination context 868 may also include packet sequence numbers for each flowlet 800. As will be explained in further detail below, the destination context 868 may use the status information 860 to generate acknowledgements that are transmitted to the source system 802. Acknowledgements may inform the source context 802 that packets for a particular flow have arrived at the destination system 852, and typically indicate which packets have arrived.

Flowlets 800 may be active or idle. Active flowlets 800 have outstanding packets, that is, packets that have been sent but that have not yet been acknowledged. Idle flowlets 800 have no packets outstanding, and also have no packets waiting to be sent. When a flowlet 800 is idle, the source context 816 may decide to move the flowlet 800 to a different path 840. Generally, the source context's 816 decision to move an idle flowlet 800 to another path is made on a random basis, rather than systematically (e.g., at fixed times or every time the flowlet 800 becomes idle). Moving idle flowlets 800 to other paths may allow the source context 816 to attempt to find less busy paths 840 across the network 830.

Packets from each flowlet 800 may be transmitted by the source system 802 in the order of their packet sequence numbers. The first packet sent from a flowlet 800 may also include a "start-of-sequence" indicator to inform the destination context 868 that the particular flowlet 800 is starting. The destination context 868 may then use the packet sequence number in the packet with the start-of-sequence indicator to establish the status for that flowlet 800. The destination context 868 subsequently expects packets for that flowlet 800 to arrive in the order of their packet sequence numbers. Hence, for example, packets from one flowlet 800 may be transmitted by the source system 802 with the sequence numbers "1, 2, 3, 4, 5 . . . " with the first packet including a start-of-sequence indicator. The destination system 852 may receive the first packet, take note of the start-of-sequence indicator, and subsequently expect packets with the sequence numbers "2, 3, 4, 5 . . . " to arrive for that flowlet 800, and in that order.

Packets, however, may be dropped in the network 830, and may never arrive at the destination system 852. For example, and continuing the example provided above, the destination system may receive packets with the packet sequence numbers "1, 3," which indicates that the packet with the packet sequence number "2" may have been dropped. As will be explained in greater detail below, the packet status maintained by both the source context 816 and the destination context 868 may enable the contexts 816, 868 to identify when packets have been dropped in the network 830, and to retransmit any packets that were lost.

Drops in the network 830 and slowness caused by excessive use of links in the network 830 may affect performance, and thus it is typically desirable to avoid or minimize both. The source context 816 may detect excessive drops or congestion along one path 840 in a number of ways. For example, the status information 820 for a flowlet 800 may include a timer that the source context 816 can use to determine the time between when a packet was transmitted and when an acknowledgment for that packet was received. A long time period may indicate congestion along the path being used by the flowlet 800. Alternatively or additionally, the source context 816 may track how quickly it can add packets to each flowlet 800. A flowlet 800 that cannot accept packets as quickly as other flowlets 800 may be suffering congestion along its path 840 across the network, and/or may be suffering excessive drops. Alternatively or additionally, the source context 816 may be receiving a large number of retransmission requests for a particular flowlet 800, which may indicate excessive drops along the path the flowlet 800 is using.

When the source context 816 determines that a flowlet 800 may be suffering from congestion or excessive drops, the source context 816 may move the flowlet 800 to another path 840. In some implementations, once the flowlet 800 has been moved, the destination context 852 will continue to receive and accept the packets from the flowlet 800, even though a path identifier may have now changed. In some implementations, the source context 816 may cause the relocated flowlet 800 to send a new start-of-sequence indicator along with the packet with the oldest unacknowledged packet sequence number. In these implementations, upon receiving the new start-of-sequence indicator, the destination context 868 may assume that the source system 802 has given up on any packets it sent before the packet with the new start-of-sequence indicator, and discard any information (for example, packet sequence numbers) it had about the restarted flowlet 800.

In some cases, the destination context 868 may receive a start-of-sequence indicator in a packet that has arrived out of order. For example, the destination context 868 may receive packets with the sequence numbers "1, 2, 3, 1" where both packets with the sequence number "1" are copies of the same packet, and have the start-of-sequence indicator. This may occur, for example, when the flowlet's 800 path 840 is particularly slow, and an acknowledgment for the first packet with the sequence number "1" was very slow to arrive at the source system 802. Due to this slowness, the source system 802 may have switched paths and restarted the flowlet 800 prior to receiving the acknowledgement. In this situation, the destination context 868 may recognize that it need not reset the flowlet 800 state upon receiving the second packet with the packet sequence number "1". Instead, the destination context 868 may recognize the first packet with the packet sequence number "1" as the start of the sequence, and may ignore any additional packets that arrive with both the packet sequence number "1" and the start-of-sequence indicator set. In some implementations, the destination context 868 may send acknowledgments indicating that the additional packets were not accepted, which may assist the source context 816 in understanding the situation.

Flowlets 800 may also need to be restarted when either the source system 802 or the destination system 852 is disconnected. The destination system 852 may be fully or only partially disconnected. A full disconnect may occur when the destination system 852 is reset. Once the destination system 852 is operational after a reset, the destination context 868 can receive packets, but because its status information 860 has been reset, the destination context 868 may not have state information for any of the flowlets 800 (e.g., sequence numbers for packets that have arrived). The destination context 868 may thus, for all received packets, send responses indicating that the packets were not accepted. In some cases, the responses may include an indicator that tells the source context 816 that the destination context 868 has received packet sequence numbers that it does not expect. Upon receiving these responses, the source context 816 may notify the user application that attempted to send these packets that the destination context 852 has lost track of the state of the connection. This may cause the user application to initiate recovery actions.

A partial disconnect at the destination system 852 may also occur. A partial disconnect may occur, for example, when the virtual machine at the destination system 852 that is receiving the flow 810 has gone offline, either because it died or because it was shut down. In some implementations, the source context 816 may be explicitly informed that its target virtual machine is offline, for example through a command received over a control plane. In other implementations, the source context 816 may determine that the target virtual machine is offline when outstanding packets have gone unacknowledged for a pre-determined period of time (e.g., upon expiration of a timer). Upon determining, or being informed, that the target virtual machine is offline, the source context 816 may drop any outstanding packets and close its connection with the destination system 852. In some implementations, the source context 816 may also report to the source-side user applications that the packets it dropped were not sent. Since the target virtual machine is offline, the source context 816 may also reject any subsequent requests to transmit packets from the flow 810. The target virtual machine may eventually be brought back up, and at that time the source context 816 may be informed that the target virtual machine is alive again. The source context 816 may then reinitialize its connection with the destination system 852, and begin accepting packets from the flow 810 again.

A partial disconnect may also occur, for example, when a user application at the destination system 852 that is receiving packets from the flow 810 goes offline. The destination-side user application may have crashed or been closed. In this situation, the destination context 868 may acknowledge incoming packets as usual, and deliver them to the receive queue assigned to the now offline destination-side user application. The packets may then be dropped at the receive queue. The destination context 868 would not, in most cases, cause any flowlets 800 to be reset because, in many cases, the flowlets may include packets directed to multiple destination-side user applications, including the offline user application. Instead, in some implementations, the destination context 868 will treat packets directed to the offline user application as received, and leave it to the user applications at the source 802 and destination 852 systems to figure out what to do. In other implementations, the packets will be dropped, and the sending user application will be informed of the dropped packets.

The source system 802 may also be fully disconnected (e.g., by being reset) or partially disconnected. A partial disconnect caused when a source-side user application is restarted may have no effect on the source context 816. A partial disconnect caused by a source-side virtual machine restarting, or a reset of the whole source system 802, may result in the source context 816 being restarted. In these cases, the source context 816 may re-initialize its flowlets 800 in the same manner as when the source system 802 was first booted. At the source system 802, a newly started flowlet 800 typically does not have a history (e.g., no packet sequence numbers that have been acknowledged). Thus, in some implementations, the source context 816 may delay sending packets after sending a packet with a start-of-sequence indicator until the packet with the start-of-sequence indicator has been acknowledged by the destination system 852. Doing so may establish the "most recently acknowledged" packet sequence number for a flowlet 800. In some cases, the source context 816 may receive an acknowledgment indicating that an initial packet with a start-of-sequence indicator was not accepted by the destination system 852. This may occur, for example, when the destination context 868 rejected the packet sequence number included with the initial packet. When this occurs, the source context 816 may send the packet with the start-of-sequence indicator again, and, in some implementations, may provide the packet with a different starting packet sequence number.

Packet drops in the network 830, path 840 switching, disconnects, and flowlet restarts may each lead to packets needing to be resent. When received at the destination system 852, these resent packets will be out of sequence from packets received before. For example, the destination context 868 may have received packets with the sequence numbers "1, 3" and thus may have indicated that the packet with sequence number "2" needed to be resent. Once the packet with the sequence number "2" has been resent, the destination context 868 will have the sequence numbers "1, 3, 2" for this particular flowlet 800.

As will be explained in further detail below, the destination context 868 may be configured to expect packets to arrive out of order in this manner. The destination context 868, in cooperation with the source context 816, in most implementations ensures that all packets are received, and is typically not concerned with the order in which those packets are received. The destination context 868 typically forwards packets to a destination-side host device as soon as the packets are received, or as soon as practically possible, and any required re-ordering of the packets is left to the host device. It should be noted that packets may be in a different order at the destination end of the flow 810 from the order they were in at the source end of the flow 810. Once the packets are delivered to their target queue pairs, however, the packets destined for a specific destination-side user application may, in fact be in order. Ordering at the queue pair, however, is not guaranteed by the destination context 868.

As discussed above, the source context 816 and the destination context 868 may each maintain status information 820, 860 for each individual flowlet 800. Using the status information 820, 860, the source and destination contexts 816, 868 may ensure that every packet in the flow 810 reaches the destination system 852.

Figure 9A:
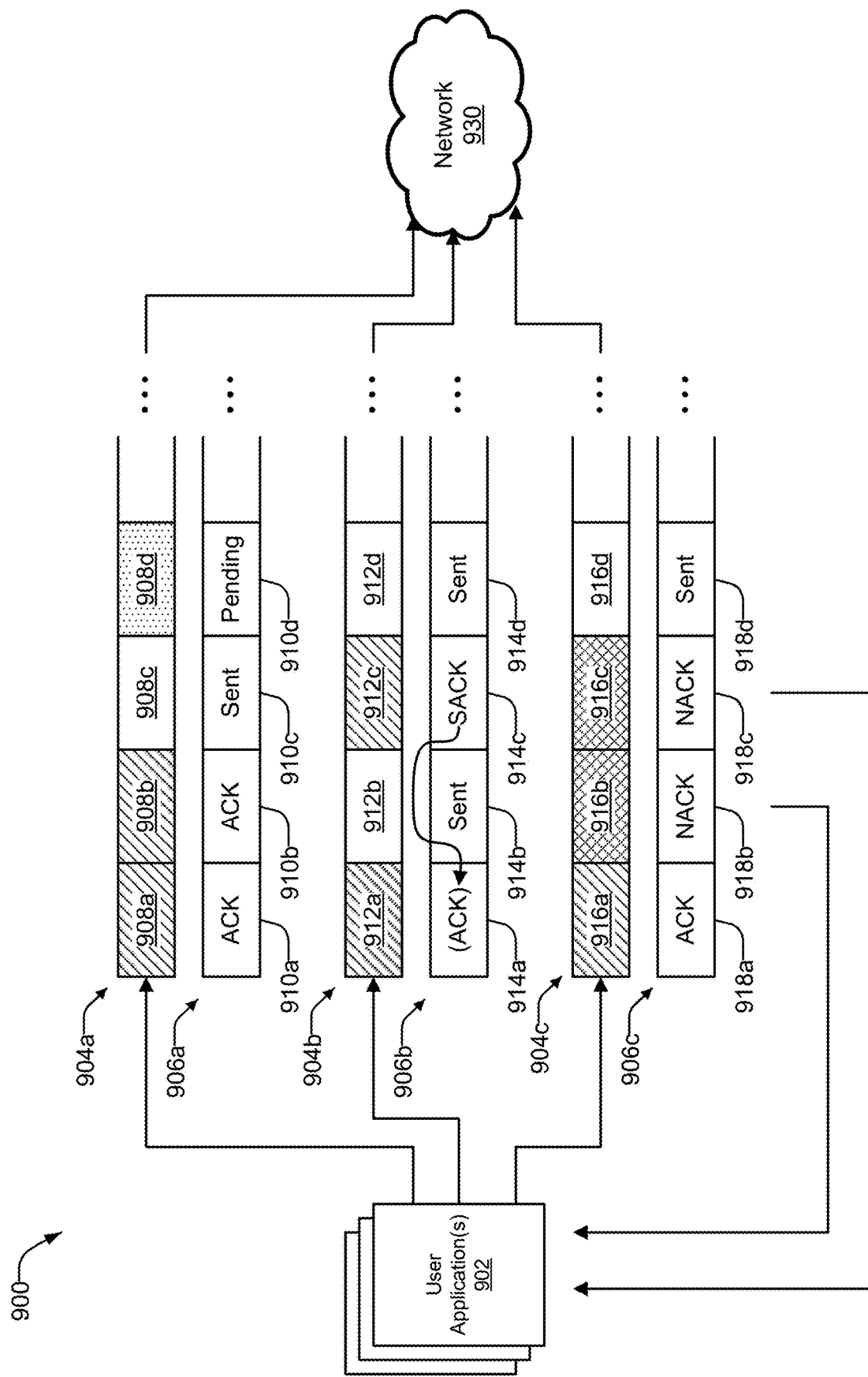
FIGS. 9A-9B illustrate an example of how the Relaxed Reliable Datagram transport may guarantee reliable delivery of packets.
Figure 9B:
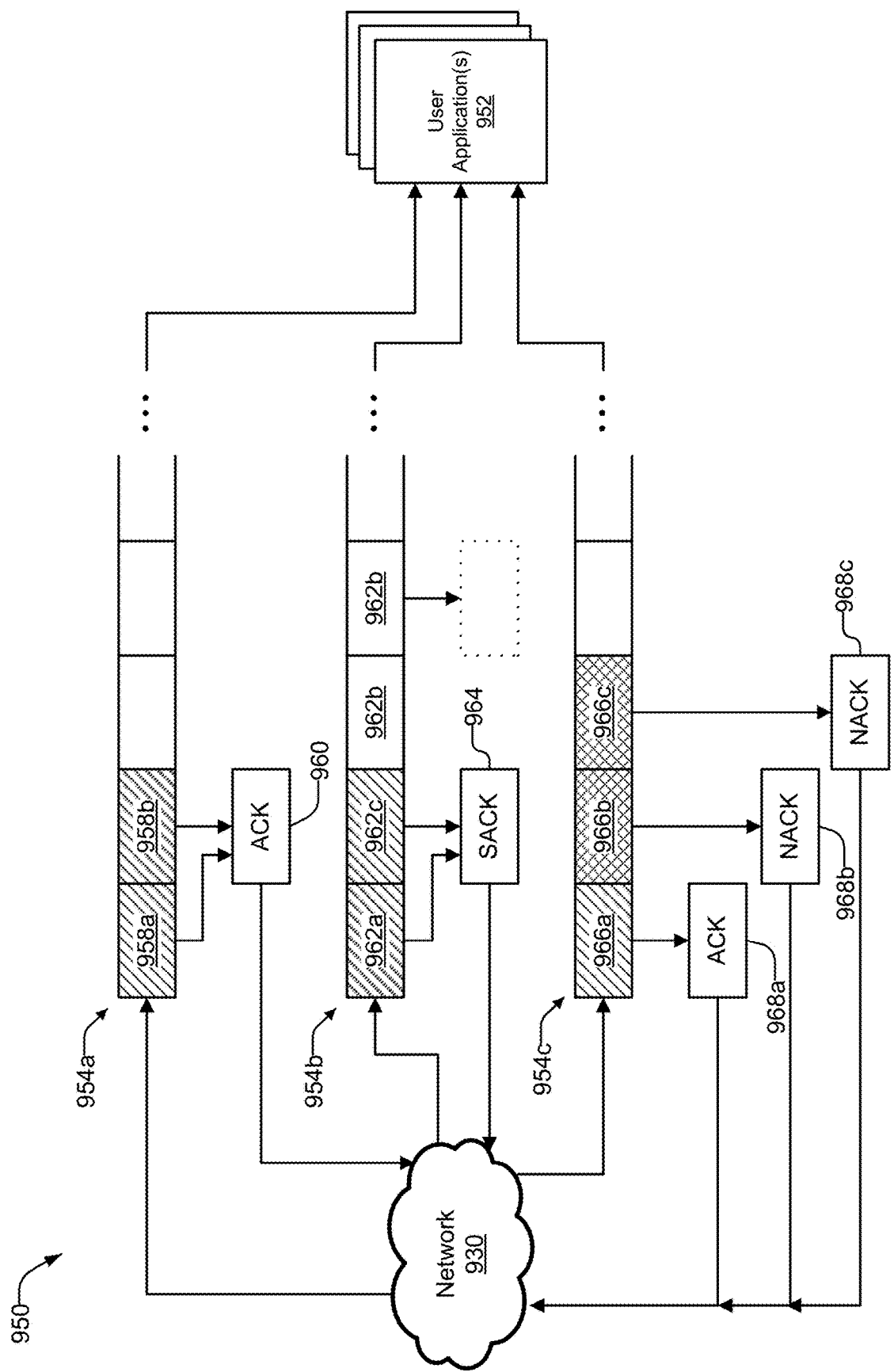

FIGS. 9A-9B illustrate an example of how the Relaxed Reliable Datagram transport may guarantee reliable delivery of packets. The Relaxed Reliable Datagram transport service may provide guaranteed delivery of packets by having the transmit-side 900 context maintain status information for each transmitted packet, and by having the receive-side 950 context return responses to the transmit side 900 for every packet that the receive-side has received. FIG. 9A illustrates an example of how the transmit-side 900 context may maintain status information for each transmitted packet. FIG. 9B illustrates an example of the how the receive-side 950 context may maintain status information, and use the status information to generate responses.

Generally, user applications are usually not involved in ensuring that packets reach their destination. For a receive-side user application to determine that one or more packets have been dropped in a network, packets that are received would have to travel all the way up the receive-side transport stack to the user application. Along the way, the packets may be delayed, for example, if the user application is too busy to receive them. The user application would then have to retransmit requests all the way down the transport stack, across the network, then up the transmit-side transport stack to the transmitting user application. In contrast, the receive-side transport context may be the earliest point of contact on the receive side for packets, and thus may be able to more quickly determine when packets have not arrived. Similarly, the transmit-side transport context may be the first to receive re-transmit requests, and thus may respond to retransmit request much more quickly than the user application.

In some implementations, the Relaxed Reliable Datagram transport service may provide guaranteed and reliable delivery of packets using packet sequence numbers. The transmit-side 900 transport context may keep track of packet sequence numbers, on a per-flowlet basis, for each packet that it has transmitted. The receive-side 950 transport context may keep track of packet sequence numbers for packets it has received, and send responses back to the transmit-side 900 transport context. The responses may inform the transmit-side 900 transport context of which packets have been received. Specifically, when the receive-side 950 transport context receives packets with packet sequence numbers that are in order with respect to their packet sequence numbers, the receive-side 950 transport context may send an "ACK" response. When the receive-side 950 transport context receives packets that are out of sequence with response to their packet sequence numbers, the receive-side 950 transport context may send a "selective-ACK' or "SACK" response. Occasionally, a packet may reach the receive-side 950 transport context, but the receive-side 950 transport context may not be able to accept the packet. In this situation, the receive-side 950 transport context may send a "NACK" to indicate to the transmit-side 900 transport context that the packet was not accepted.

FIG. 9A illustrates an example of transmit-side 900 management of outstanding packets, and receipt of responses. The example of FIG. 9A illustrates, by way of example, three flowlets 904*a-c*. As discussed previously, a set of flowlets generally include packets from one packet flow, but the flow may include packets from multiple user applications 902 that are transmitting to the same destination system. The packet flow may be divided into groups (in most implementations, without concern for the packets' relationship with each other), and these groups of packets may be referred to as sub-flows or flowlets. The packets in a particular flowlet generally use the same path over the network 930, unless or until the path is changed by the transmit-side 900 transport context. The simplified example of FIG. 9A illustrates only four packets per flowlet 904*a-c*, and it is understood that each flowlet 904*a-c* may maintain status information for more than four outstanding packets. In some implementations, the number of packets that a flowlet can maintain status for is limited (e.g., to 8, 16, 13 or more packets). In these implementations, once the number of outstanding packets is equal to the limit, no more packets can be sent using that flowlet until at least one of the outstanding packet is acknowledged as received.

For the first example flowlet 904*a*, the first three packets 908*a*, 908*b*, 908*c* have been sent to the network 930, and a fourth packet 908*d* is waiting to be transmitted. The status information 906*a* for the first flowlet 904*a* indicates an ACK status 910*a* for the first packet 908*a* and an ACK status 910*b* for the second packet 908*b*. These two ACKS statuses 910*a*, 910*b* indicate both that the first 908*a* and second 908*b* packets were received at the receive-side 950 transport context, and that they were received in order (e.g., the first packet 908*a* was received, followed by the second packet 908*b*). In some implementations, the transmit-side 900 transport context only needs to remember the oldest unacknowledged packet, because requests to retransmit any older packets are not likely to arrive. In these implementations, the transmit-side 900 transport context can thus forget the status information 906*a* for the first 908*a*, and possibly also the second 908*b*, packet. In implementations where the number of packets in a flowlet is limited, deleting the status information 906*a* for one or two packets also frees slots for more packets to be sent.

Concluding the first example flowlet 904*a*, the third packet 908*c* has a sent status 910*c*, which means no response has been received yet for this packet 908*c*. The fourth packet 908*d* has a pending status 910*d*, which means the packet has been added to the flowlet 904*a*, but has not yet been sent into the network 930.

For the second example flowlet 904*b*, all four packets 912*a-d* have been sent into the network 930. The status information 906*b* for the second flowlet 904*b* indicates a SACK status 914*c* for the third packet 912*c*. The SACK status 914*c* indicates that the third packet 912*c* was received by the receive-side 950 transport context. The SACK status 914*c* may also indicate that the first packet 912*a* was also received, which implies an ACK status 914*a* status for the first packet 912*a*. Meanwhile, the second 912*b* and fourth 912*d* packets have sent statuses 914*b*, 914*d*, indicating that no responses have yet been received for these packets. 912*b*, 912*c*.

SACK messages may be used by the transmit-side 950 transport context when the transmit-side 950 transport context has received packets out of sequence. For the second example flowlet 904*b*, the first packet 912*a* was received, and then the third packet 912*c*. This implies that, though the second 912*b* packet has a sent status 914*b*, the second packet 912*b*, did not arrive at the receive-side 950 before the third packet 912*c*. In fact, the second packet 912*b* may have been dropped by the network 930. In some implementations, the SACK response may have included the packet sequence number of the last packet that was received at the receive-side 950 in sequence (here, the sequence number for the first packet 912*a*) and the packet sequence number for the first packet that was received out of sequence (here, the sequence number for the third packet 912*c*). Hence, assuming, for example, that numeric packet sequence numbers were used, the SACK response may have said "1, 3." In this way, the SACK response may efficiently indicate that the second packet 912*b* needs to be retransmitted by the transmit-side 900 transport context.

Response messages generally traverse the network 930 in the same manner as data packets. Hence, response messages can also be dropped in the network 930. This means that sometimes the receive-side 950 transport context may generate more than one SACK that indicates the one particular packet has not arrived. For example, for the second example flowlet 904*b*, the SACK that said "1, 3" may have been dropped in the network 930. Assuming that the fourth packet 912*d* arrived successfully at the receive-side 950, the transmit-side 900 transport context may generate a SACK that says "1, 3-4" because the receive-side 950 transport context still has not received the second 912*b* packet.

An extended example may better illustrate how the transmit-side 900 transport context may determine which packets need to be resent. Assume that a flowlet at the transmit side 900 has sent six packets with the packet sequence numbers 1, 2, 3, 4, 5, 6. Assume further that the flowlet on the receive-side 950 has received the packets with sequence numbers 1, 3, 5, and 6, and that the packets with sequence numbers 2 and 4 have been dropped in the network 930. Given this scenario, the receive-side 950 may generate the following responses:

Upon receiving the packet numbered 1: ACK(1)
Upon receiving the packet numbered 3: SACK(1, 3)
Upon receiving the packet numbered 5: SACK(1, 5)
Upon receiving the packet numbered 6: SACK(1, 5-6)

If all of these acknowledgement messages are received at the transmit-side 900 transport context, then the first SACK may trigger retransmission of the packet numbered 2. The second SACK may trigger the retransmission of just the packet numbered 4, because the transmit-side 900 transport context may determine that it has already retransmitted the packet numbered 2. The third SACK possibly will not trigger any retransmits.

Assuming, however, that the first SACK was lost in the network 930, receipt of the second SACK (SACK(1, 5)) may trigger the transmit-side 900 transport context to resend the packets numbered 2, 3, and 4. Assuming that the packet numbered 2 arrives after the packet numbered 6, the receive-side 950 transport context would generate SACK (3, 5-6) to notify the transmit-side 900 that the packet numbered 4 still has not yet arrived. Assuming that the packet numbered 3 next arrives, the receive-side 950 transport may recognize this packet as a duplicate, and would discard the duplicate packet without sending an additional response.

In some implementations, the transmit-side 900 transport context will retransmit, and continue to retransmit, any packets that have not been acknowledged. For example, for the third flowlet 904c, the fourth packet 916d has a sent status 918d, and so may be retransmitted periodically. When a flowlet has more than one unacknowledged packet, generally these unacknowledged packets will be retransmitted in sequence, from the packet with the lowest packet sequence number to the packet with the highest packet sequence number. For example, for the second flowlet 904b, the transmit-side 900 transport context may resend the second packet 912b, then the fourth packet 912d, and then again the second packet 912b and the fourth packet 912d until one or both packets 912b, 912c have been acknowledged. As additional SACK responses arrive, packets indicated by the SACK message as not received may be added, or re-added, to the list of packets to retransmit. The transmit-side 900 transport context may, in many cases, be configured to avoid flooding the network 930 with retransmit packets. For example, the transmit-side 900 transport context may be configured with a maximum burst size, which indicates the maximum number of packets that a flowlet can send at one time. When the number of packets sent by the flowlet—including packets sent for the first time and packets being retransmitted—reaches the bust size, additional packets that need to be retransmitted may be delayed.

In some implementations, a flowlet may also cease transmitting new packets until at least the oldest unacknowledged packets have been acknowledged. For example, in some implementations, a flowlet may only maintain status information for a limited number of packets. For example, in these implementations, a flowlet may maintain status information for up to six packets, and the flowlet may have sent packets numbered 1 through 6. The flowlet may further have received responses for packets numbered 2, 3, and 4, but not for the packet numbered 1. Until the flowlet receives an acknowledgement for the packet numbered 1, the flowlet may need to maintain the status information for the packet numbered 1 so that this packet can be resent. Furthermore, the flowlet may not be able to add any new packets until the packet numbered 1 is acknowledged and removed from the flowlet to make space for additional packets.

Returning to the example of FIG. 9A, for the third flowlet 904c, all four packets 916a-d have been sent into the network 930. The status information 906c for the third flowlet 904c indicates an ACK status 918a for the first packet 916a, indicating that the first packet 916a was received in sequence. "Received in sequence" may mean that all packets received for that flowlet had sequential packet sequence numbers that immediately preceding the packet sequence number of the first packet 916a (e.g., assuming the first packet 916a has the packet sequence number "1", and assuming packet sequence numbers were assigned from a counter that has a maximum value of 32 and is able to wrap around, the preceding packet sequence numbers could have been "29, 30, 31, 0"), or the first packet 916a had a "start of sequence" indicator and was thus the first packet sent by this flowlet 904c.

The second 916b and third 916c packets, however, have NACK statuses 918b, 918c. The NACK statuses 918b, 918c indicate that the second 916b and third 916c packets reached the receive side 950, but that, for one reason or another, these packets 916b, 916c were not accepted at the receive side 950. A NACK response is generally passed back to the user application 902 that generated the packet that received the message. The user application 902 may then determine what should be done; for example, the user application 902 may determine that a packet 916b that has a NACK status 918b should be resent, in which case the user application 902 may place a new copy of the packet 916b into the flow. Other than passing the NACK response back to the user application 902, however, the transmit-side 900 transport context may treat the NACK statuses 918b, 918c similar to ACK statuses, and consider the second 916b and third 916c packets as done. This means that the first 916a, second 916b, and third 916c packets and their corresponding status information 918a-c may be removed from the flowlet 904c, leaving new slots free for additional packets.

The transmit-side 900 transport context may maintain various timers for each flowlet 904a-c. For example, the transmit-side 900 transport context may start a timer for the first flowlet 904a when a response is received, and reset the timer each time another response is received for the first flowlet 904a. When no responses are received for a long period, the timer may expire. At this time, the transmit-side 900 transport context may take some actions. For example, if there are a large number of outstanding packets in the first flowlet 904a, the transmit-side 900 transport context may decide to switch the flowlet 904a to a different path. A high number of outstanding packets may indicate that the path being used by the flowlet 904a is very slow, or possibly has links that have failed. The transmit-side 900 transport context may also schedule any outstanding packets in the flowlet 904a for retransmission.

FIG. 9B illustrates an example of the receive-side 950 management of receipt of packets and generation of responses. The example of FIG. 9B illustrates receipt of the three example flowlets 904a-c illustrated in FIG. 9A. In FIG. 9B, for each of the three example flowlets, the receive-side 950 transport context maintains status information 954a-c, on a per-flowlet basis, for each received packet. Using the status information 954a-c, the receive-side 950 transport context may be able to determine when expected packets have not been received. The receive-side 950 transport context can then request that the transmit-side 900 resend the missing packets.

For the first example flowlet, the status information 954a may indicate that a first packet 958a and a second packet 958b have arrived. In this example, the second packet 958b has arrived before the receive-side 950 transport context was able to generate an ACK response acknowledging successful receipt of the first packet 958a. In general, the receive-side 950 transport context may possibly not automatically generate and queue responses for each packet received. Instead, the receive-side 950 transport context may, upon receiving a packet at a flowlet, mark the flowlet as needing to generate a response. The receive-side 950 transport context may then periodically poll each flowlet to see if the flowlet needs to generate a response, and only then generate and send a response.

For the first flowlet, this may mean that the first flowlet will generate an response only after the second packet 958b has arrived. At this point, the receive-side 950 transport context can examine the flowlet's status information 954a, and use this information to generate a cumulative response that indicates that the first 958a and second 958b packets have arrived. The response can also indicate that these packets arrived in their sequential order, which means that no packets so far have failed to arrive. Because the packets 958a, 958b arrived in sequence, the acknowledgment will be an ACK 960, and the ACK 960 will include the packet sequence number of the most recently received packet (that is, the second packet 958b).

In other situations, the first flowlet may have generated an ACK for each of the first 958a and second 958b packets. For example, the first flowlet may have been scheduled to generate responses both after the first packet 958a arrived and after the second packet 958b arrived. In both cases, the responses would have been ACK's, each with the packet sequence number of the preceding packet.

After generating and transmitting the ACK 960, the first flowlet may be able to clear the status information for at least the first packet 958a. The flowlet may maintain the packet sequence number of the second packet 958b to track the most recently received sequence number. The flowlet, however, may cause the packets themselves to be sent on to the receiving user application 952. Generally, the receive-side 950 transport context may avoid buffering packets, and may send them to their intended user application 952 as soon as possible.

For the second example flowlet, the status information 954b indicates that two packets have arrived, in this case a first packet 962a and a third packet 962c, with the second packet 962b missing at the time the third packet 962c is received. Here, the flowlet may have generated an ACK after the first packet 962a was received, but after the third packet 962c, the flowlet will generate a SACK 964 because the second packet 962b is, at this point, missing. The SACK 964 may inform the transmit-side 900 transport context that the second packet was not received. For example, the SACK response may include the packet sequence numbers of the first packet 962a and third packet 962c in the SACK 964 message. SACK responses may also be cumulative. For example, should a fourth packet arrive before the SACK 964 in this example is sent, then the flowlet may generate a SACK indicate receipt of the first 962a, third 962c, and fourth packets.

Continuing the example, after the second flowlet transmits the SACK 964 for the first 962a and third 962c packets, the missing second packet 962b may arrive. The second packet 962b may have only just arrived because of, for example, slowness in the network 930. The second packet 962b may also have arrived in response to the SACK 964, meaning that it was retransmitted. In this example, the second packet 962b arrives a second time. A second copy of the second packet 962b may arrive, for example, because the SACK 964 may have been dropped in the network 930. Additionally, a timer at the transmit-side 900 flowlet may have expired, and all unacknowledged packets may have been retransmitted. The status information 954b allows the receive-side 950 transport context to recognize that the second copy of the second packet 962b is a duplicate. The flowlet may subsequently drop the duplicate copy.

For the third example flowlet, the status information 954c indicates that three packets 966a-c have arrived. The flowlet accepted the first packet 966a, and generate an ACK 968a to inform the transmit-side 900 to transport context. The flowlet, however, may not have accepted the second 966b and third 966c packets. This may occur, for example, when the receiving user application 952 has run out of buffers in memory, and cannot accept any more packets. When this occurs, the flowlet may generate NAK 968b, 968c messages for the packets 966b, 966c that were not accepted.

In some implementations, the receive-side 950 transport context may stop generating response messages. This may occur when new packets are not added to a nearly empty flowlet at the transmit-side 900 and packets from that flowlet have been dropped in the network. For the receive-side 950 transport context to generate a response, which in this case would be SACK to indicate that packets are missing, the receive-side 950 flowlet would have to receive another packet, which, because the transmit-side 900 flowlet is not receiving new packets, may not occur. In some implementation, one method to prevent this situation is to ensure that flowlets are not allowed to become nearly empty, for example, by frequently assigning packets to flowlets that run low quickly. In some implementations, another method to prevent a flowlet that is stuck with outstanding packets is to dynamically adjust the number flowlets. In some implementations, another solution is to time out flowlets that have had outstanding packets for a long time, move those flowlets to another path, and resend any packets that were outstanding in those flowlets.

As illustrated in the examples of FIGS. 9A and 9B, the Relaxed Reliable Datagram transport service may use responses and retransmission of possibly lost packets to guarantee that all packets are eventually delivered. In this way, the Relaxed Reliable Datagram transport can be used for networks 930 that have a higher than negligible packet drop rate. As illustrated in these examples, packets may arrive at the receive-side 950 out of sequence not only with respect to their packet sequence numbers, but also relative to the order in which the packets relate to each other.

Figure 10A:
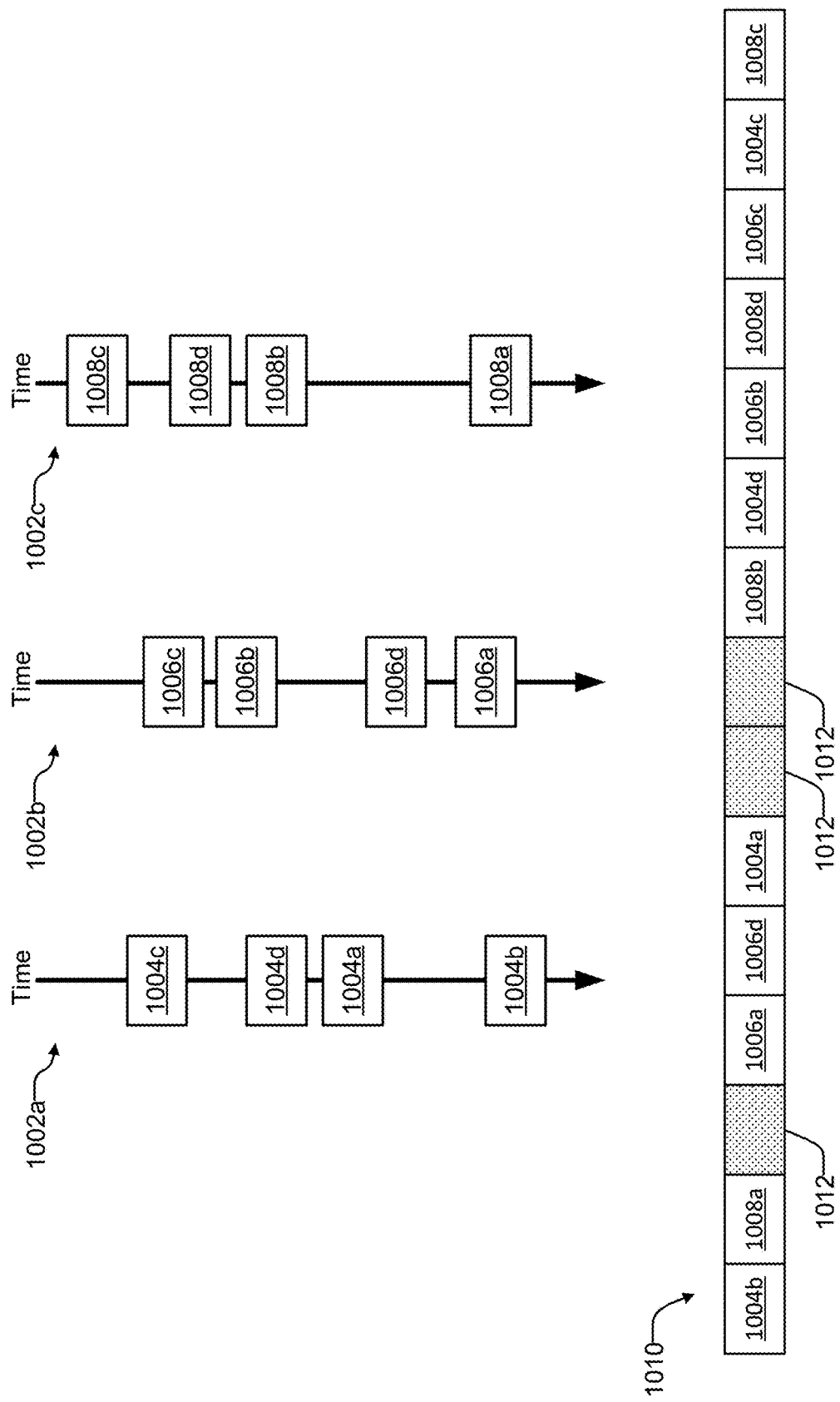
FIGS. 10A-10B illustrate an example of a single packet flow that has been divided into flowlets, and the order in which the packets are received by the receiving user application.
Figure 10B:
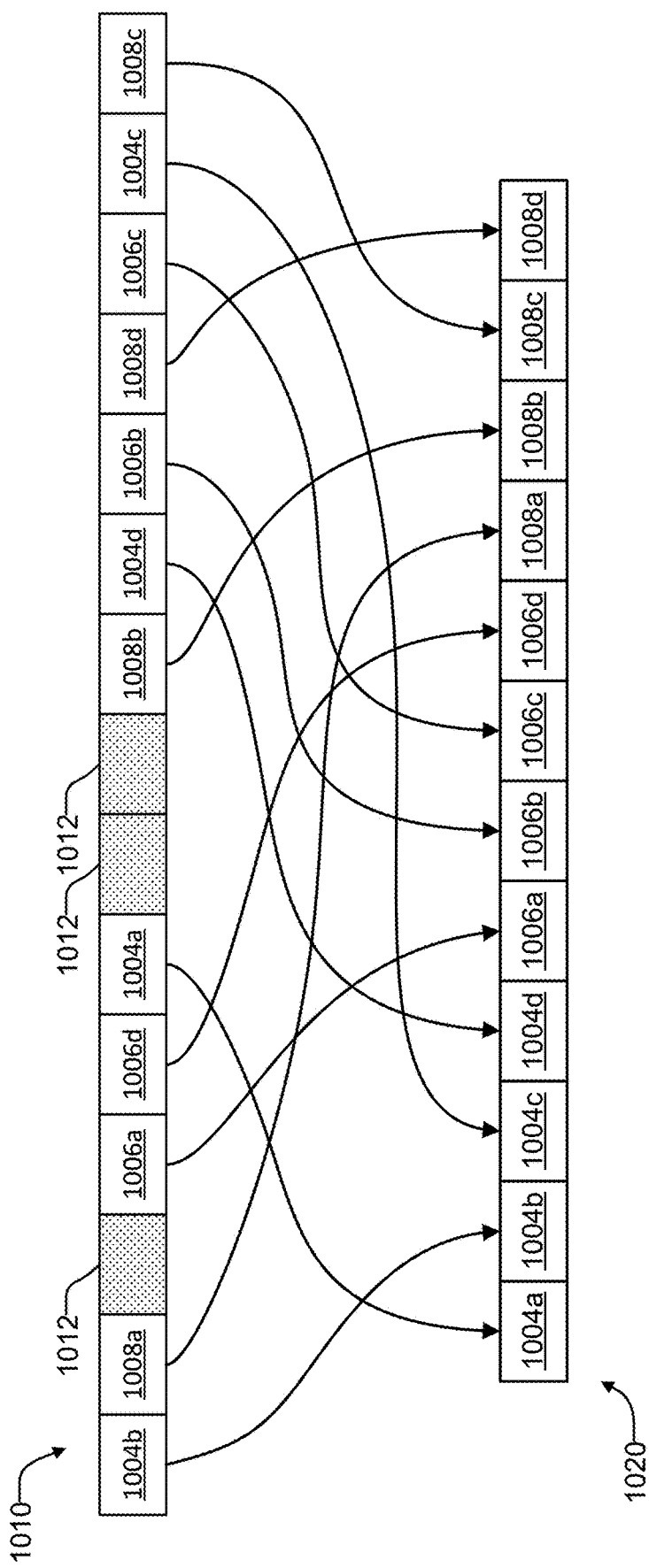

FIGS. 10A-10B illustrate an example of a single packet flow that has been divided into flowlets 1002a-c, and the order in which the packets 1004a-d, 1006a-d, 1008a-d are received by the receiving user application. In this simplified example, the illustrated packets 1004a-d, 1006a-d, 1008a-d have been sent by one sending user application and are being received by one receiving user application. When the illustrated packets 1004a-d, 1006a-d, 1008a-d are transmitted by the sending user application, for this example, the packets 1004a-d, 1006a-d, 1008a-d have a specific sequence. For example, the packets 1004a-d, 1006a-d, 1008a-d may be part of a video stream, and carry sequential frames of the video stream. The packets 1004a-d, 1006a-d, 1008a-d may be assigned a sequence identifier by the sending user application, to inform the receiving application of the correct order of the packets.

As discussed above, the packets 1004a-d, 1006a-d, 1008a-d may arrive at the receiving user application not in the order in which they were originally sent. This may be due to drops in the network, paths for flowlets being changed, and/or flowlets being restarted, among other reasons. The packets 1004a-d, 1006a-d, 1008a-d arriving out of order may also be caused by the differences in the paths over the network taken by each group of packets. The packets 1004a-d, 1006a-d, 1008a-d thus may need to be re-ordered upon reaching the destination system. FIG. 10A illustrates the arrival of packets 1004a-d, 1006a-d, 1008a-d over time, and how the packets 1004a-d, 1006a-d, 1008a-d may be stored in memory. FIG. 10B illustrates re-ordering of the packets 1004a-d, 1006a-d, 1008a-d to place them into their intended sequence.

In the example of FIG. 10A, a packet flow has been divided into three flowlets 1002a-c, and four packets are received over each flowlet 1002a-c. The example of FIG. 10A illustrates the arrival of each packet 1004a-d, 1006a-d, 1008a-d over time. FIG. 10A also illustrates an example of buffers 1010 configured in a memory for receiving the packets. In some implementations, the buffers 1010 are configured in advance by the receiving user application. In these implementations, the buffer 1010 may be configured in the memory of a host device.

As discussed above, the packets 1004a-d, 1006a-d, 1008a-d in each flowlet 1002a-c may be assigned a packet sequence number that may establish their order within their respective flowlets 1002a-c. In this example, the packet sequence numbers are represented by the letters a, b, c, and d. For the first flowlet 1002a, the second packet 1004b arrived first, followed by the first packet 1004a, the fourth packet 1004d, and the third packet 1004c. As noted previously, the order in which the packets 1004a-d arrive may be due to packet drops, packet retransmissions, and other issues that may occur in an imperfect network. For the second flowlet 1002b, the first packet 1006a arrives first, then the fourth packet 1006d, the second packet 1006b, and then the third packet 1006c, in that order. For the third flowlet 1002c, the first packet 1008a arrives first, then, some time later, the second packet 1008b, the fourth packet 1008d, and the third packet 1008c.

For purposes of explaining this example, the packets 1004a-d, 1006a-d, 1008a-d are placed in the buffers 1010 in the order in which they are received at the destination system. Also for purposes of explaining this example, the buffers 1010 are filled from left to right. It is understood that the buffers 1010 may otherwise be filled in any convenient order. In this example, some of the buffers 1010 are occupied 1012, or are otherwise not available, as may often be the case.

While the packets 1004a-d, 1006a-d, 1008a-d within a flowlet 1002a-c have an arrival order with respect to the other packets 1004a-d, 1006a-d, 1008a-d in the flowlet, 1002a-c, the packets 1004a-d, 1006a-d, 1008a-d also have an arrival order across the flowlets 1002a-c. In this example, the first flowlet 1002a is the first to deliver a packet 1004b, shortly followed by a packet 1008a from the third flowlet 1002c. These two packets 1004b, 1008a may be written into the buffers 1010 in that order. In some cases, these first two packets 1004b, 1008a may have been delivered by the flowlets 1002a-c at approximately the same time (e.g., in the same clock cycle). In such cases, the order in which the packets 1004b, 1008a are stored may be based on their flowlet 1002a, 1002c identity, or the storage order may be arbitrary.

Continuing the example, the packet 1008a may next be followed by two packets 1006a, 1006d from the second flowlet 1002b, followed by a packet 1004a from the first flowlet 1002a. The third flowlet 1002c may provide the next packet 1008b, followed by packets 1004d, 1006b, 1008d from the first 1002a, second 1002b, and third 1002c flowlets, respectively. The last three packets 1006c, 1004c, 1008c in this example are delivered by the second 1002b, first 1002a, and third 1002c flowlets, respectively.

Once stored in the buffers 1010, the packets 1004a-d, 1006a-d, 1008a-d are not only out of sequence with respect to their flowlets 1002a-c, but also with respect to each other. FIG. 10B illustrates the packets 1004a-d, 1006a-d, 1008a-d being reordered and put into their intended sequence. As noted above, the sending user application may have assigned a sequence identifier to each packet. In this example, the group of packets 1004a-d transmitted over the first flowlet 1002a are first in sequence, followed by the group of packets 1006a-d from the second flowlet 1002b and the group of packets 1008a-d from the third flowlet 1002c.

Packet reordering may be executed by a driver program and/or by the receiving user application. In implementations where the driver program manages the packet reordering, the driver program may reorder the packets 1004a-d, 1006a-d, 1008a-d before the receiving user application accesses them. Additional memory 1020 may be available for reordering the packets 1004a-d, 1006a-d, 1008a-d, and the packets 1004a-d, 1006a-d, 1008a-d may be copied into this additional memory 1020 in their proper order. Alternatively or additionally, the packets 1004a-d, 1006a-d, 1008a-d may be reordered by copying them between the buffers 1010.

III. Methods

FIGS. 11-14 illustrate examples of processes for transmitting packets over a network using a kernel bypass framework and, in some implementations, the Relaxed Reliable Datagram transport service. These processes may be implemented by the systems described above, such as for example the systems described with respect to FIGS. 4, 5A-5B, 6A-6B, and 7A-7B. The steps for each example process are illustrated for ease of understanding, and the individual steps may be executed in an order other than is given, may include additional steps, and/or may be combined into fewer steps.

Figure 11:
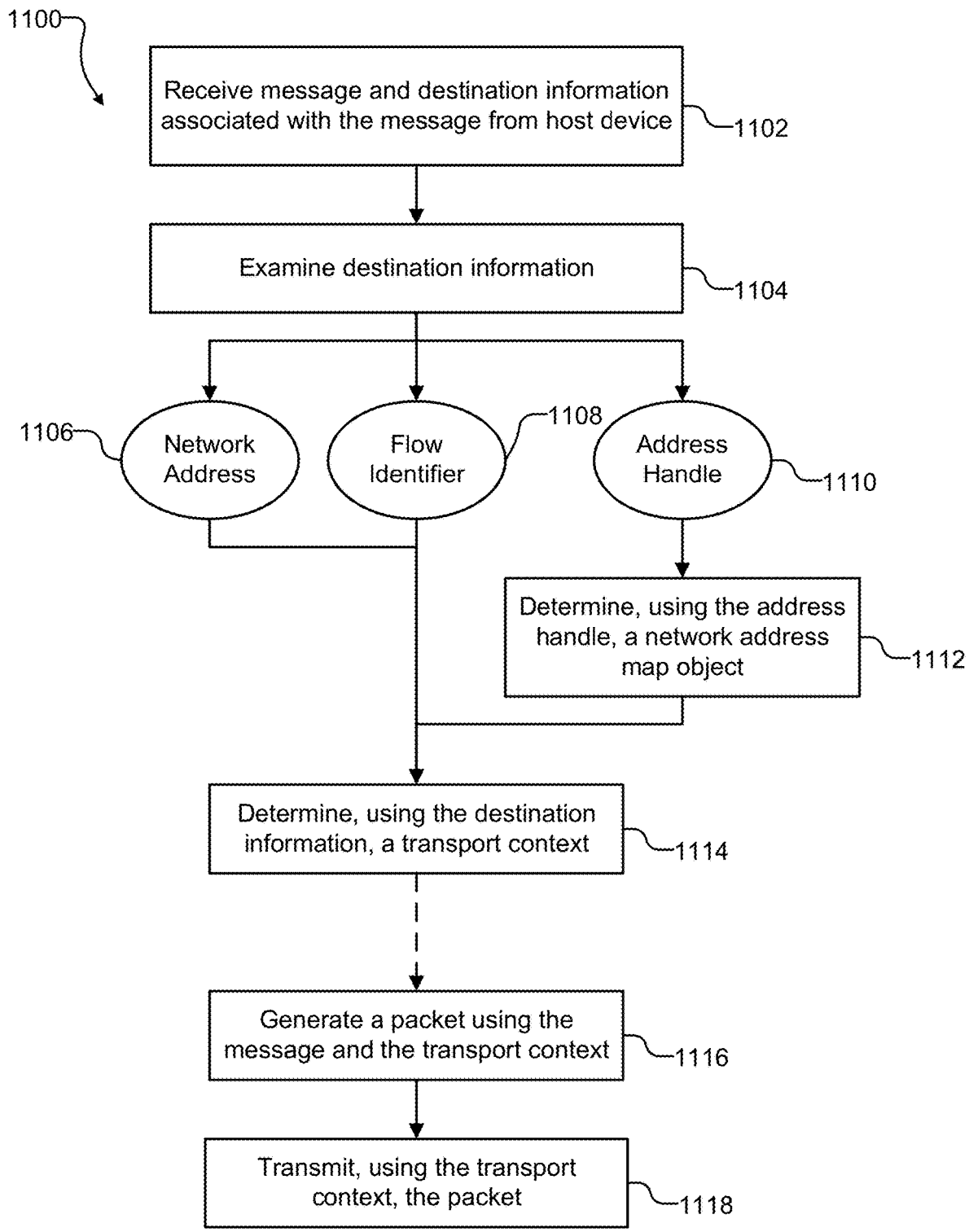
FIG. 11 illustrates an example of a process by which a transport context may be determined for a user application that is going to transmit messages across a network.

FIG. 11 illustrates an example of a process 1100 by which a transport context may be determined for a user application that is going to transmit messages across a network. The example process 1100 may be executed by a network adapter device configured to implement a kernel bypass framework. The network adapter device may be in communication with a host device, and the host device may be running user applications that intend to send messages over the network.

At step 1102, the network adapter device may receive a message and destination information associated with the message. The message and destination information may be received from a host device. The message may, in most cases, have been generated by a user application executing on the host device. The destination information generally describes where in the network the message is to be sent. In most cases, the destination information is provided by the sending user application.

At step 1104, the network adapter device may examine the destination information. The destination information may describe the intended recipient of the message in different ways. For the example, the destination information may be a network address 1106, such as the IP address or MAC address of a system on the network, and/or the IP address of a virtual machine running on a system on the network. Alternatively or additionally, the destination information may be a flow identifier 1108 for a packet flow. A flow identifier 1108 may be a numeric value, and/or may be a combination of a source address and destination address for the flow. Alternatively or additionally, the destination information may be an address handle 1110. An address handle 1110 may be a software variable or pointer that references a transport context and/or information that may be needed to generate packets. For example, an address handle 1110 may be a reference to a network address map object. The address map object may store a reference to the appropriate transport context, and may also store information for transmitting packets, such as pre-generated packet headers. At step 1112, the network adapter device may determine, using the address handle 1110, a network address map object.

At step 1114, the network adapter device may determine, using the destination information, a transport context. In most implementations, the determine transport context is associated with a specific destination on the network, where the destination is a system on the network, and/or a virtual machine running on a system on the network, and/or a user application, (possibly running in a virtual machine) running on a system on the network. The transport context may manage transmission of the message over the network, including assuring that the message arrives at its intended destination. In some implementations, the transport context is implemented using the Relaxed Reliable Datagram transport service.

Several optional steps are also illustrated for the example process 1100. At a first optional step 1116, the network adapter device may generate a packet using the message and the determined transport context. Generating a packet may include generating a packet header and placing the message body into a packet payload. In some implementations, a pre-generated header may be associated with the determined transport context. The pre-generated packet header may include information for routing the packet over the network, such as source and destination addresses and/or ports. Because the transport context is generally associated with a specific destination, the routing information may be known in advance, and a packet header may be generated and stored by the network adapter device in advance.

At a second optional step 1118, the network adapter device may transmit, using the determined transport context, the packet generated at step 1116.

Figure 12:
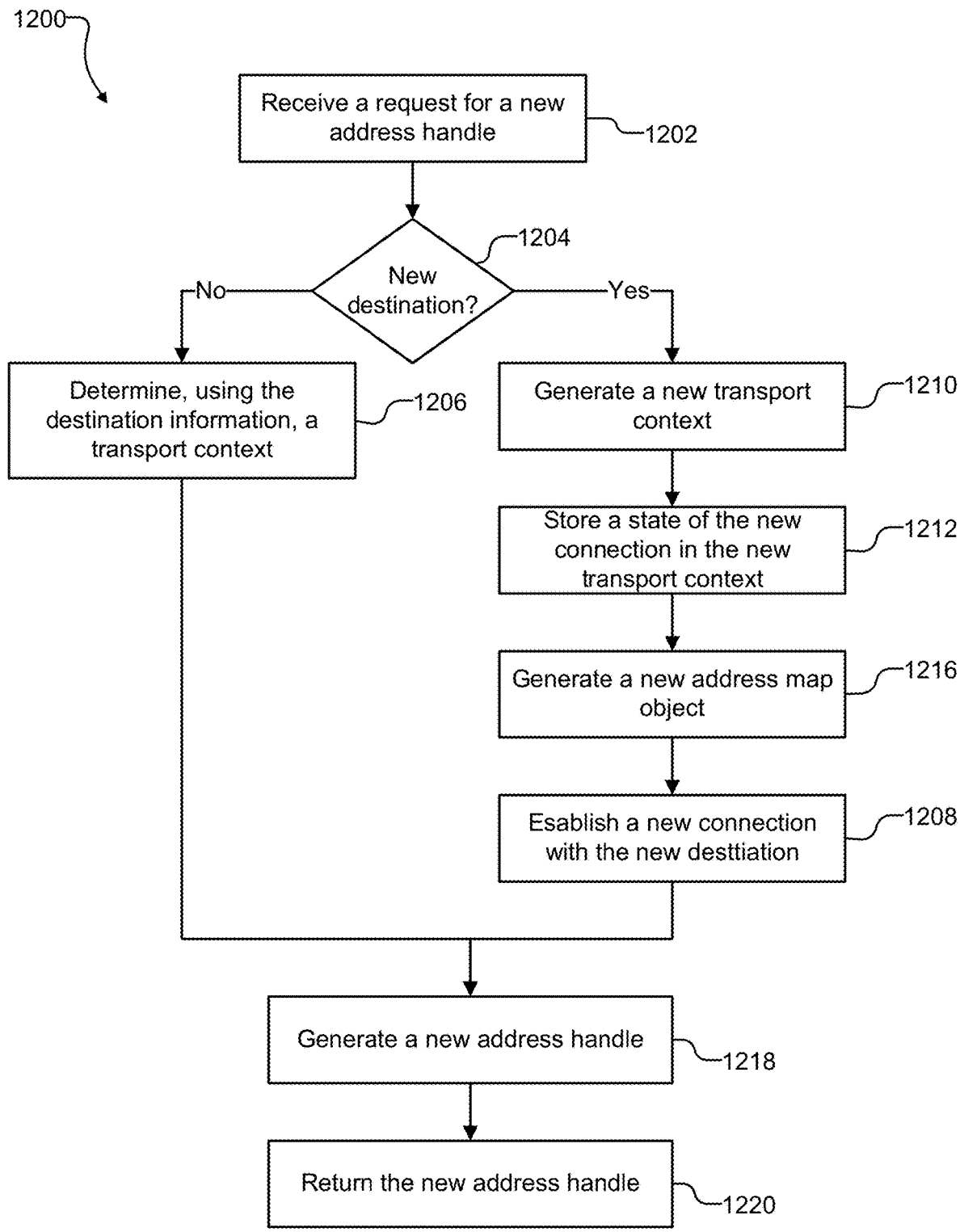
FIG. 12 illustrates an example of a process for obtaining an address handle.

FIG. 12 illustrates an example of a process 1200 for obtaining an address handle. The example process 1200 may be executed by a network adapter device. The network adapter device may be in communication with a host device, and the host device may be executing user applications that intend to transmit messages over a network.

At step 1202, the network adapter device may receive a request for a new address handle. The request may be generated by a user application, and may include information describing a destination on the network. In some implementations, the network adapter device may have access to an address map, which may for example, be stored in memory on the network adapter device. The address map may store address information for systems on the network that user applications running on the host device intend to communicate with. The network adapter device may, at step 1204, use the address map to determine whether the request received at step 1202 is for a new destination. The request is for a new destination when address information provided with the request is unknown to the network adapter device. For example, the network adapter device may be unable to find the destination information in an address map that stores known destinations.

When the request for the new address handle is not for a new destination, then, at step 1206, the network adapter device may determine, using the destination information, a transport context. The determined transport context may have been configured by an earlier request for an address handle for the destination associated with the transport context. The network adapter device may, for example, determine the transport context by indexing an address map using the destination information, and extracting a reference to the correct transport context (or a data structure describing the transport context) from the address map.

When the request for the new address handle is for a new destination, then the network adapter device may, at step 1210, may generate a new transport context for the destination described by the destination information. At step 1212, the network adapter device may store state information for the new connection in the new transport context. This step may include associating the transport context with the connection established at step 1208. The transport context may thereafter manage the connection, including, for example, setting up and taking down paths across the network, transmitting packets, and/or maintaining status information for outstanding packets.

At step 1216, the network adapter device may generate a new address map object. Generating a new address map object may include generating and storing a pre-configured packet header that includes source and destination information for routing packets to the destination on the network. The new address map object may also be associated with the new transport context generated at step 1210, or with the transport context determined at step 1206.

At step 1208, the network adapter device may establish a new connection with the system on the network that is associated with the destination information. Establishing the new connection may include validation steps, such as checking that the requesting user application is permitted to communicate with the destination system. Establishing a connection may also include an exchange of messages between the network adapter device and the destination system. In some implementations, the network adapter device may establish the new connection after steps 1218 and 1220, described below. In some implementations, the network adapter device may establish the connection after steps 1218 and 1220, while executing other operations. In some implementations, the network adapter device may establish the connection when a message is first transmitted to the destination system associated with the address handle returned at step 1220.

At step 1218, the network adapter may generate a new address handle. The address handle may refer to the new address map object, for example, the address handle may be a software pointer to an address in the memory of the network adapter device.

At step 1220, the new address handle may be returned to the requesting user application. The requesting user application may store the new address handle for future use.

Figure 13:
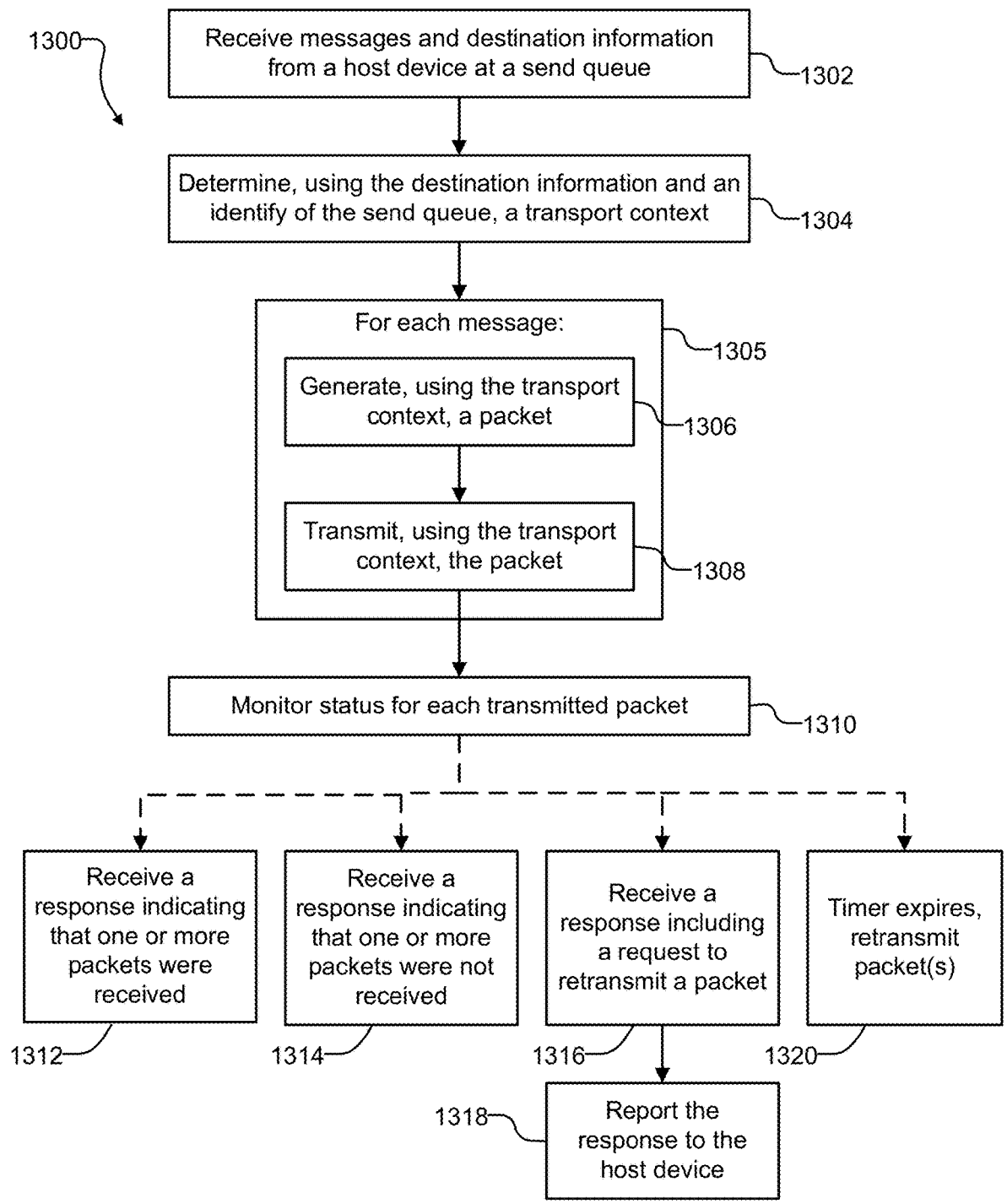
FIG. 13 illustrates an example of a process for transmitting packets over a network, and monitoring the status for each packet to ensure that each packet is delivered.

FIG. 13 illustrates an example of a process 1300 for transmitting packets over a network, and monitoring status for each packet to ensure that each packet is delivered. The example process 1300 may be executed by a network adapter device configured to implement a kernel bypass framework. In some implementations, the network adapter device may be using the Relaxed Reliable Datagram transport service to send the packets and monitor their status.

At step 1302, the network adapter device may receive messages and destination information. The messages and destination information may be received from a host device, and may be received at a send queue from a plurality of send queues. The destination information may describe a destination on the network that is to receive the message. The network adapter device may receive the message at a send queue of a queue pair. The queue pair may be associated with a user application executing on the host device.

At step 1304, the network adapter device may determine, using the destination information and an identity of the send queue, a transport context. In most implementations, the transport context may be associated with a specific destination, where the destination is, in this example, identified by the destination information and/or the identity of the send queue. The identity of the send queue may be an alphanumeric value used by the network adapter device to identify the send queue from among multiple queue pairs.

At step 1305, the network adapter device may execute several steps for each message. First, at step 1306, the network adapter device may generate, using the determined transport context, a packet. The transport context may provide information necessary for routing packets over the network to the intended destination, such as port number, network addresses, and/or pre-generated packet headers. The network adapter device may generate one packet, and place the message into the payload of the packet. Alternatively or additionally, the network adapter device may generate two or more packets, where each packet includes a portion of the message in the packets' payload. In some implementations, the transport context may also assign a packet sequence number to each packet, where the packet sequence number indicates the order in which the packets are sent.

At step 1308, the network adapter device may transmit, using the transport context, each packet over the network. The transport context may manage transmission of each packet. At step 1310, the network adapter device may further monitor status for each transmitted packet. The transport context may also manage monitoring packet status. The status of each packet indicates whether the packet has been received at the destination system. In some implementations, the transport context may expect response messages from the destination on the network, where the response messages indicate that one or more packets have been received.

At least three types of response messages may be received. First, at step 1312, the network adapter device may receive a response message that indicates that one or more packets were received at the destination. In some implementations, this response indicates that one or more packets were received in order, where their order is provided by their packet sequence numbers, and where no packets were missing from the sequence. For example, the response may say "3" indicating that the packets numbered 1, 2, and 3 were received.

Second, at step 1314, the network adapter device may receive a response indicating that one or more packets were not received. In some implementations, this response message may provide the packet sequence numbers of packets that have arrived, and indicate packets that have not arrive by a gap in the sequence numbers. For example, the packet sequence numbers "1, 3" in the response may indicate that the packet with the sequence number "2" has not yet arrived. Alternatively, in some implementations, the response may list the packet sequence numbers of packets that were not received. For example, the packet sequence numbers "2-4" in the response may indicate that the packets 2, 3, and 4 have not yet arrived.

Third, at step 1316, the network adapter device may receive a response including a request to retransmit a packet. In some implementations, this response indicates that a packet was received at the destination, but that for one reason or another, the packet was not accepted. At step 1318, the network adapter device may deliver this response to the host device. The host device may be able to determine why the packet needs to be retransmitted, and/or may generate a new message in order to retransmit the packet.

The network adapter device may also be configured for the situation where no response messages are received, or no response messages are received for a long time. For example, the network adapter device may initiate a timer when a packet is transmitted at step 1310. At step 1320, the network adapter device may determine that the timer has expired. When the timer has expired, the network adapter device may resend one or more packets that were sent previously. The network adapter device may also take other actions, such as change the paths being used to send packets to the destination on the network.

Figure 14:
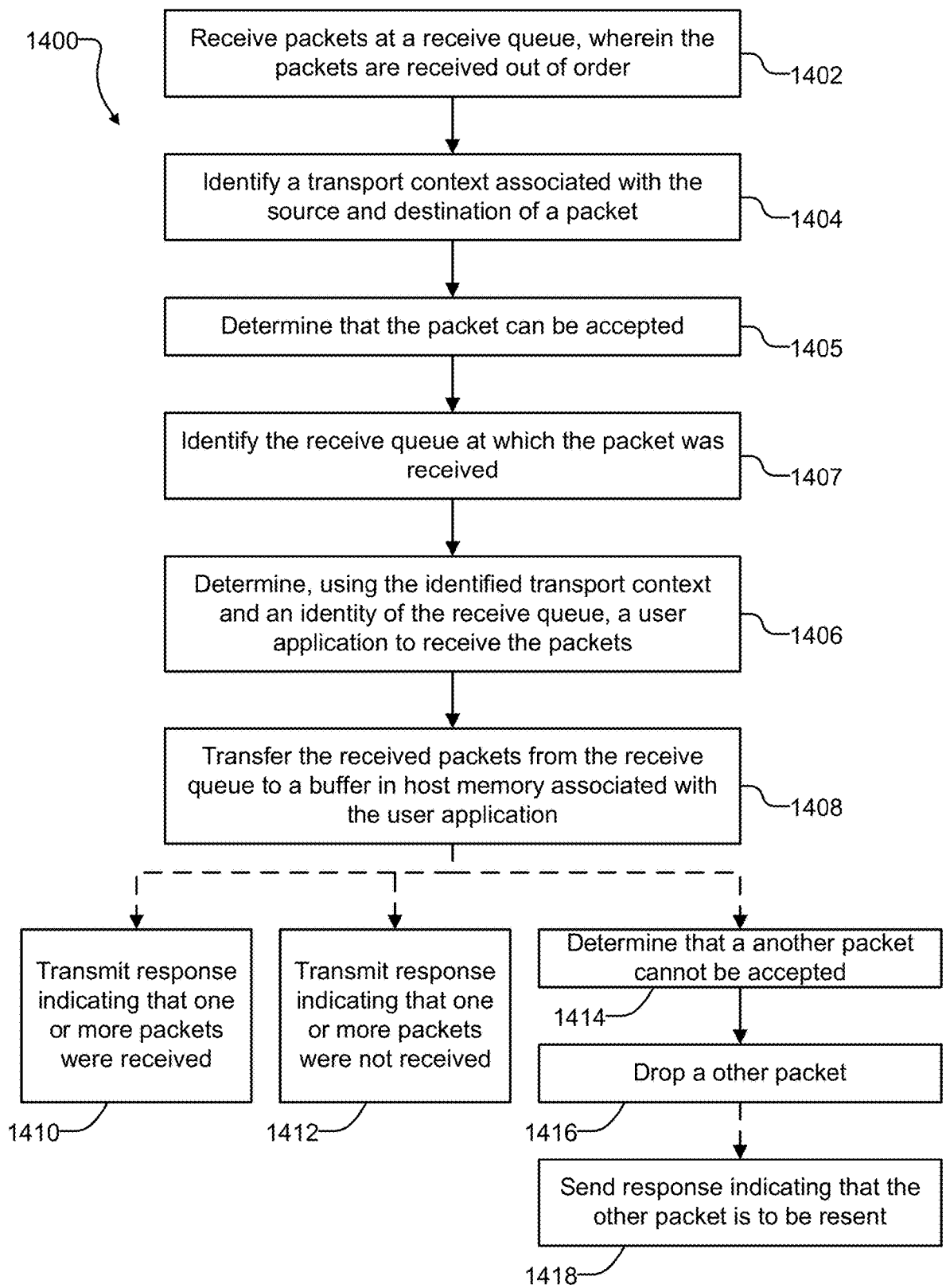
FIG. 14 illustrates an example of a process for receiving packets over a network, and generating responses for each packet to indicate that the packet was received.

FIG. 14 illustrates an example of a process 1400 for receiving packets over a network, and generating responses for each packet to indicate that the packet was received. The example process 1400 may be executed by a network adapter device configured to implement a kernel bypass framework. In some implementations, the network adapter device may be using a Relaxed Reliable Datagram transport service to receive packets and generate responses.

At step 1402, the network adapter device may receive packets at a receive queue, where the packets are received out of order. The packets may be received over a network. The receive queue may be part of a queue pair. The packets' order may be determined by a packet sequence number assigned to each packet. The packets may be out of order when either the packet sequence numbers are not in their numeric order (e.g., lowest to highest), or because packet sequence numbers are missing from the sequence (e.g., the packets have sequence numbers "1, 3").

Upon receiving each packet, the network adapter device may, at step 1404, identify a transport context associated with the packets. The network adapter device may identify the transport context from a source address provided in each packet. The identified transport context may be managing the connection with the source system that is sending the packets. The transport context may also be monitoring status for the packets coming from the particular source system.

At step 1405, the network adapter device may determine whether the packet can be accepted. The network adapter device may determine that it cannot accept the packet when, for example, there is no available memory at the host device to place the packet, meaning that no buffers are available for receiving the packets. This may occur when the receiving user application has not allocated enough memory to receive packets, and/or is not freeing memory quickly enough. In some cases, the sending user application needs to be informed, and, in some cases, the sending user application may reduce the rate at which it is transmitting packets. Alternatively or additionally, the network adapter device may determine that the packet is a duplicate. Alternatively or additionally, the network adapter device may determine that the packet is invalid. The packet may be invalid, for example, if it does not have a valid address, is incorrectly addressed, is corrupted, and/or has been marked before receipt as invalid. In this example, the network adapter device determines, at step 1405, that the packet can be accepted.

At step 1407, the network adapter device can identify the receive queue at which the packet was received. At step 1406, the network adapter device may determine, using the identified transport context and an identity of the receive queue, a user application to receive the packets. The transport context may examine the packets to determine their destination. For example, the packets may have a destination address, and this destination address may, at least in part, identify the user application that is to receive the packets. The receive queue's identity may also, in part, identify the user application that is to receive the packets. The identity of the receive queue may be an alphanumeric value used by the network adapter to identify the receive queue from among multiple queue pairs.

At step 1408, the network adapter device may transfer the received packets from the receive queue to a buffer in host memory that is associated with the receiving user application. The network adapter device may have registration keys for memory allocated to the receiving user application. The network adapter device may use the registration keys to write packets directly into the memory allocated to the receiving user application. The receiving user application may have configured buffers in this memory in advance for the purpose of receiving packets from the network.

In some implementations, the network adapter device may transmit one of at least three response types upon processing one or more packets. The transport context may be monitoring the status of packets in the flow, and may provide the appropriate response.

First, at step 1410, the network adapter device may transmit a response indicating that one or more packets were received. In some implementations, this response indicates that one or more packets were received in order, where the order is provided by packet sequence numbers assigned to each packet, and where no packets were missing from the sequence. For example, the response may say "3," which indicates that the packets numbers 1, 2, and 3 were received.

Second, at step 1412, the network adapter device may transmit a response indicating that one or more packets were not received. In some implementations, this response message may provide the packet sequence numbers of packets that have arrived, and indicate packets that have not arrived by a gap in the sequence numbers. For example, the packet sequence numbers "1, 3" in the response may indicate that the packet numbered "2" did not arrive. Alternatively, in some implementations, the response may list the packet sequence numbers of packets that were not received. For example, the packet sequence numbers "2-4" in the response may indicate that the packets 2, 3, and 4 have not yet arrived.

Third, at step 1414, the network adapter device may determine that another packet cannot be accepted, for one or more of the reasons provided above. Upon determining that this packet cannot be accepted, the network adapter device may, at step 1416 drop the packet. The network adapter may optionally then, at step 1418, send a response indicating over the network that indicates that the packet is to be resent. This response may indicate to the source system that the packet arrived, but that the packet could not be accepted and so may need to be resent.

IV. Network Adapter Device

Figure 15:
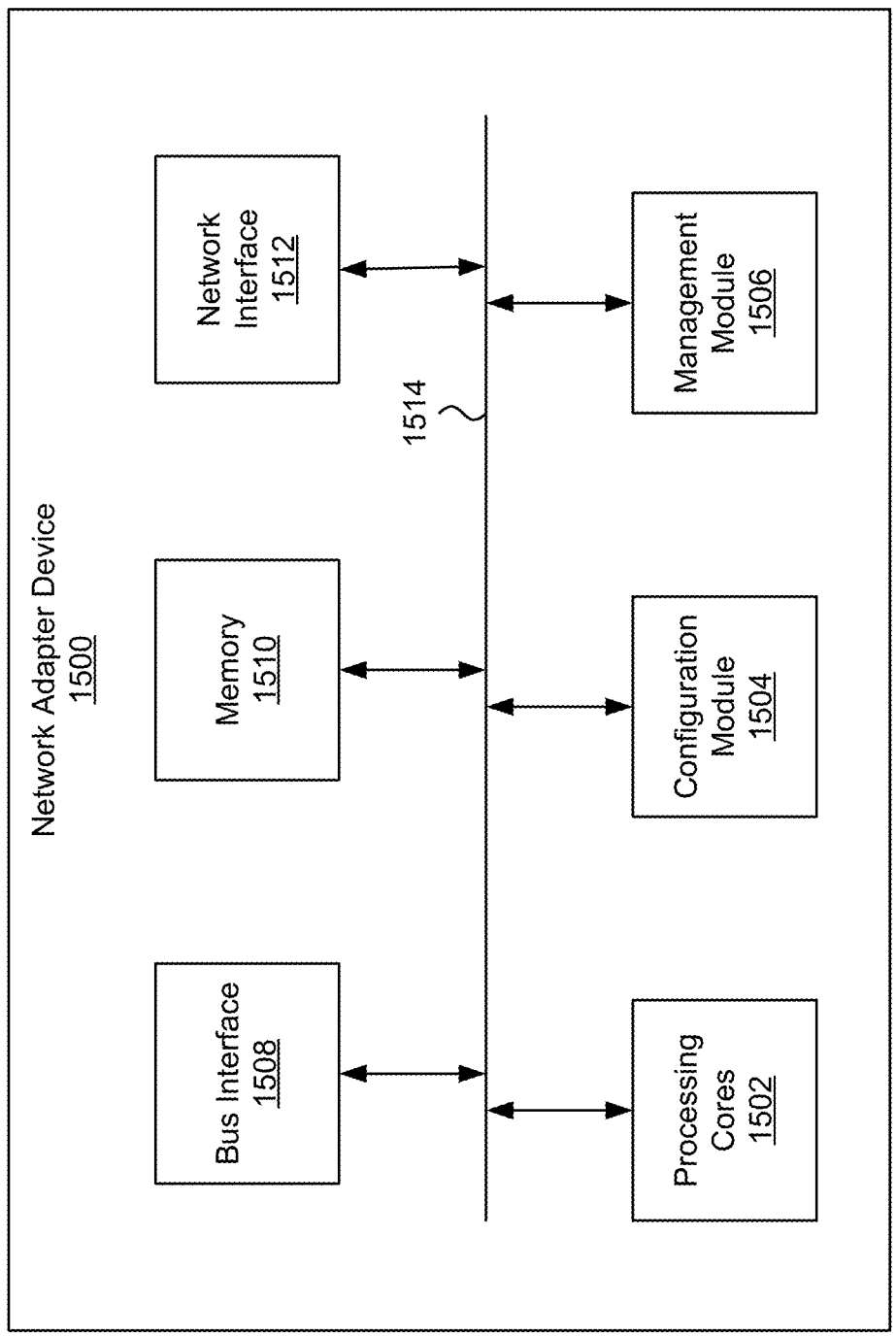
FIG. 15 illustrates an example of a network adapter device that may be used to implement the systems and methods described herein.

FIG. 15 illustrates an example of a network adapter device 1500 that may be used to implement the systems and methods described above. In this example, the network adapter device 1500 may include processing cores 1502, a configuration module 1504, a management module 1506, a bus interface module 1508, memory 1510, and a network interface module 1512. These modules may be hardware modules, software modules, or a combination of hardware and software. The network adapter device 1500 may include additional modules, not illustrated here. In some implementations, the network adapter device 1500 may include fewer modules. One or more of the modules may be in communication with each other over a communication channel 1514. The communication channel 1514 may include one or more buses, meshes, matrices, fabrics, a combination of these communication channels, or some other suitable communication channel. In some implementations, the operations of the network adapter device 1500 may be implemented in a single integrated circuit, or in a group of integrated circuits. Examples of integrated circuits include ASICs and FPGAs.

In some implementations, the processing cores 1502 may include one or more processors configured to execute instructions. Examples of processors that may be included in the processing cores 1502 include processors developed by ARM, MIPS, AMD, Intel, Qualcomm, and the like. In some implementations, the processors of the processing cores 1502 may share certain resources, such as for example busses, level 1 (L1) caches, and/or level 2 (L2) caches. The instructions executed by the processing cores 1502 may be stored on a computer-readable storage medium, for example, in the form of a computer program. The computer-readable storage medium may be non-transitory. In some cases, the computer readable medium may be part of the memory 1510. In some implementations, operations of the processing cores 1502 (sometimes but not always include some or all of instructions executed by the processing cores 1502) may be implemented in one or more integrated circuits. Examples of integrated circuits include ASICs and FPGAs.

The memory 1510 may include either volatile or non-volatile, or both volatile and non-volatile types of memory. The memory 1510 may, for example, include random access memory (RAM), read only memory (ROM), Electrically Erasable Programmable Read-Only Memory (EEPROM), flash memory, and/or some other suitable storage media. In some cases, some or all of the memory 1510 may be internal to the network adapter device 1500, while in other cases some or all of the memory may be external to the network adapter device 1500.

In some implementations, the configuration module 1504 may include one or more configuration registers. Configuration registers may control the operations of the network adapter device 1500. In some implementations, one or more bits in the configuration register can represent certain capabilities of the network adapter device 1500. Configuration registers may be programmed by instructions executing in the processing cores 1502, and/or by an external entity, such as a host device, an operating system executing on a host device, and/or a remote server. The configuration module 1504 may further include hardware and/or software that control the operations of the network adapter device 1500.

In some implementations, the management module 1506 may be configured to manage different components of the network adapter device 1500. In some cases, the management module 1506 may configure one or more bits in one or more configuration registers at power up, to enable or disable certain capabilities of the network adapter device 1500.

The bus interface module 1508 may enable communication with external entities, such as a host device and/or other components in a computing system, over an external communication medium. The bus interface 1508 module may include a physical interface for connecting to a cable, socket, port, or other connection to the external communication medium. The bus interface module 1508 may further include hardware and/or software to manage incoming and outgoing transactions. The bus interface 1508 module may implement a local bus protocol, such as NVMe, AHCI, SCSI, SAS, SATA, PATA, and the like. The bus interface 1508 module may include at least the physical layer for any of these bus protocols, including a connector, power management, error handling, etc. In some implementations, the network adapter device 1500 may include multiple bus interface modules for communicating with multiple external entities. These multiple bus interface modules may implement the same local bus protocol, different local bus protocols, or a combination of the same and different bus protocols.

The network interface module 1512 may include hardware and/or software for communicating with a network. This network interface module 1512 may, for example, include physical connectors for wired connection to a network, and/or antennas for wireless communication to a network. The network interface module 1512 may further include hardware and/or software configured to implement a network protocol stack. The network interface module 1512 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the network adapter device 1500 may include multiple network interface modules, each configured to communicate with a different network. For example, in these implementations, the network adapter device 1500 may include a network interface module for communicating with a wired Ethernet network, a wireless 802.11 network, a cellular network, an Infiniband network, etc.

In some implementations, the network adapter device 1500 is a PCI-type device. In these implementations, the network adapter device 1500 includes a PCI interface for communicating with a host device. The term "PCI" may be used to describe any protocol in the PCI family of bus protocols, including the original PCI standard, PCI-X, AGP, and PCIe. The PCI protocols are standard bus protocols for connecting local peripheral devices to host devices. A standardized bus protocol is a data transfer protocol for which a specification has been defined and adopted by various manufacturers. Manufacturers ensure that compliant devices are compatible with computing systems implementing the bus protocol, and vice versa.

A PCI device may include one or more functions. A "function" describes operations that may be provided by the network adapter device 1500. Examples of functions include mass storage controllers, network controllers, display controllers, memory controllers, serial bus controllers, wireless controllers, and encryption and decryption controllers, among others. In some cases, a PCI device may include more than one function. For example, a PCI device may provide a mass storage controller and a network adapter. As another example, a PCI device may provide two storage controllers, to control two different storage resources. In some implementations, a PCI device may have up to eight functions.

In some implementations, the network adapter device 1500 may include single-root I/O virtualization (SR-IOV). SR-IOV is an extended capability that may be included in a PCI device. SR-IOV allows a physical resource (e.g., a single network interface controller) to appear as multiple resources (e.g., sixty-four network interface controllers). Thus, a PCI device providing a certain functionality (e.g., a network interface controller) may appear to a device making use of the PCI device to be multiple devices providing the same functionality. The functions of a SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that lack configuration resources, and are generally controlled by the configuration of their underlying physical functions. Each of the physical functions and/or virtual functions may be assigned to a respective thread of execution (such as for example, a virtual machine) running on a host device.

V. Computing Systems

Figure 16:
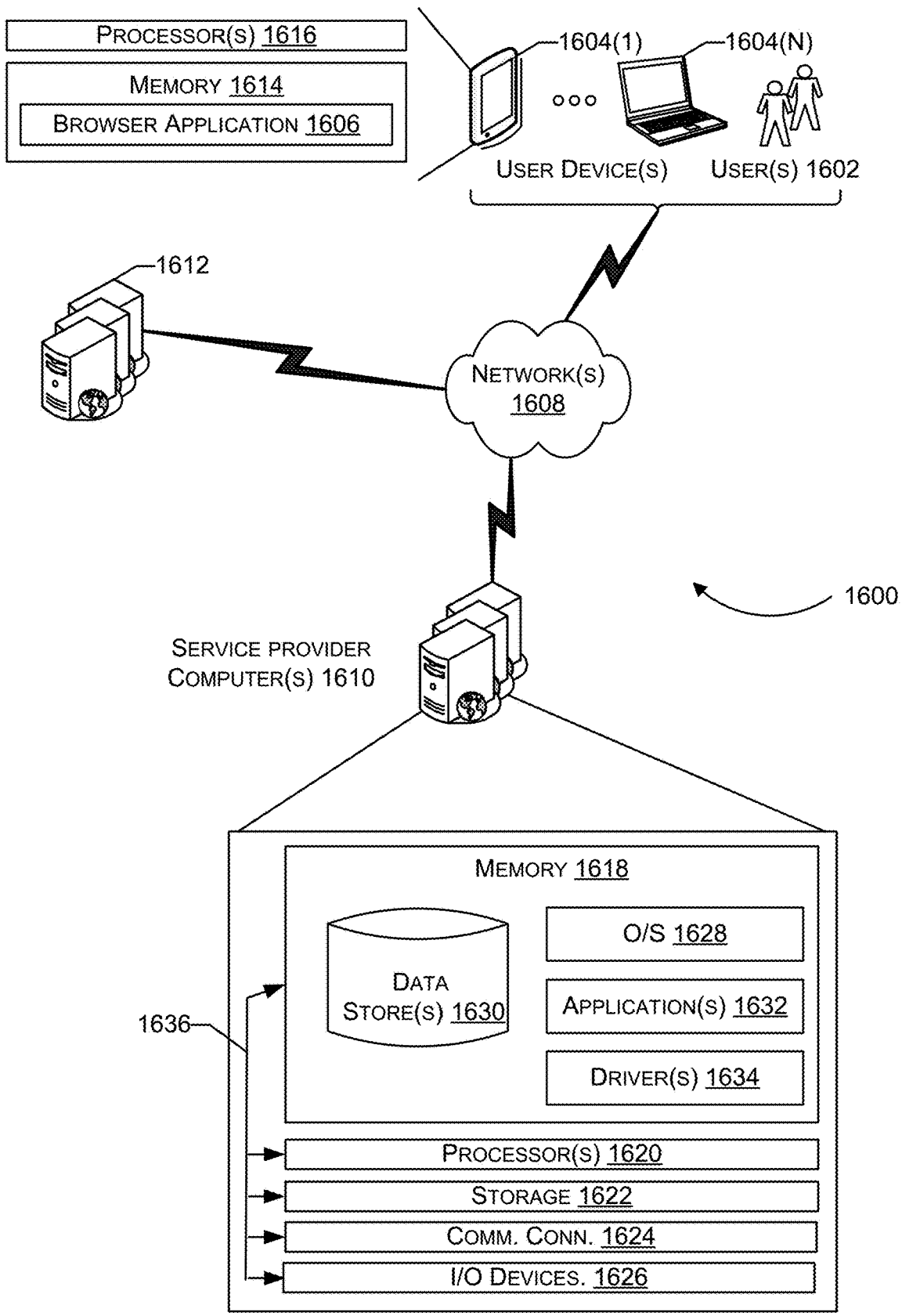
FIG. 16 illustrates an example architecture for features and systems described herein that includes one or more service provider computers and/or a user device connected via one or more networks, according to some embodiments.

FIG. 16 illustrates an example architecture 1600 for features and systems described herein. The example architecture 1600 includes one or more service provider computers 1610 and/or user devices 1604 connected via one or more networks 1608. The systems and methods discussed above may use one or more components of the computing devices described in FIG. 16 or may represent one or more computing devices described in FIG. 16.

In the illustrated architecture 1600, one or more users 1602 may use user computing devices 1604(1)-(N) to access an application 1606 (e.g., a web browser or mobile device application), via one or more networks 1608. In some aspects, the application 1606 may be hosted, managed, and/or provided by a computing resources service or service provider. One or more service provider computers 1610 may provide a native application that is configured to run on the user devices 1604, which user(s) 1602 may interact with. The service provider computer(s) 1610 may, in some examples, provide computing resources such as, but not limited to, client entities, low latency data storage, durable data storage, data access, management, virtualization, cloud-based software solutions, electronic content performance management, and so on. The service provider computer(s) 1610 may also be operable to provide web hosting, databasing, computer application development and/or implementation platforms, combinations of the foregoing or the like to the user(s) 1602. The service provider computer(s) 1610, in some examples, may communicate with one or more third party computers 1612.

In some examples, network(s) 1608 may include any one or a combination of many different types of networks, such as cable networks, the Internet, wireless networks, cellular networks and other private and/or public networks. While the illustrated example represents the user(s) 1602 accessing an application 1606 over the network(s) 1608, the described techniques may equally apply in instances where the user(s) 1602 interact with the service provider computer(s) 1610 via user device(s) 1604 over a landline phone, via a kiosk or in some other manner. The described techniques may also apply in other client/server arrangements (e.g., set-top boxes, etc.), as well as in non-client/server arrangements (e.g., locally stored applications, etc.).

As described above, the application 1606 may allow the user(s) 1602 to interact with the service provider computer(s) 1610 to, for example, access web content (e.g., web pages, music, video, etc.). The service provider computer(s) 1610, which may be arranged in a cluster of servers or as a server farm, may host the application 1606 and/or cloud-based software services. Other server architectures may also be used to host the application 1606. The application 1606 may be capable of handling requests from many users 1602 and serving, in response, various item web pages, for example. The application 1606 can provide any type of website that supports user interaction, including social networking sites, online retailers, informational sites, blog sites, search engine sites, news and entertainment sites, and so forth. As discussed above, the described techniques can similarly be implemented outside of the application 1606, such as with other applications running on the user device(s) 1604.

The user device(s) 1604 may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) 1604 may be in communication with the service provider computer(s) 1610 via the network(s) 1608, or via other network connections. Additionally, the user device(s) 1604 may be part of the distributed system managed by, controlled by, or otherwise part of the service provider computer(s) 1610 (e.g., a console device integrated with the service provider computers 1610).

In one example configuration, a user device(s) 1604 may include at least one memory 1614 and one or more processing units (or processor(s) 1616). The processor(s) 1616 may be implemented in hardware, computer-executable instructions, firmware, or combinations thereof. Computer-executable instruction or firmware implementations of the processor(s) 1616 may include computer-executable or machine-executable instructions written in any suitable programming language to perform the various functions described. The user device(s) 1604 may also include geo-location devices (e.g., a global positioning system (GPS) device or the like) for providing and/or recording geographic location information associated with the user device(s) 1604.

The user device memory 1614 may store program instructions that are loadable and executable on the user device processor(s) 1616, as well as data generated during the execution of these programs. Depending on the configuration and type of the user device(s) 1604, the user device memory 1614 may be volatile (such as random access memory (RAM)) and/or non-volatile (such as read-only memory (ROM), flash memory, etc.). The user device(s) 1604 may also include additional removable storage and/or non-removable storage including, but not limited to, magnetic storage, optical disks, solid state disks, flash memory, and/or tape storage. The storage devices and their associated computer-readable media may provide non-volatile storage of computer-readable instructions, data structures, program modules, and other data for the computing devices. In some implementations, the memory 1614 may include multiple different types of memory, such as static random access memory (SRAM), dynamic random access memory (DRAM), or ROM.

Turning to the contents of the user device memory 1614 in more detail, the memory 1614 may include an operating system and one or more application programs or services for implementing the features disclosed herein. The one or more application programs or services may include at least a user provided input element or electronic service web page, such as a browser application 1606 or dedicated applications (e.g., smart phone applications, tablet applications, etc.). The browser application 1606 may be configured to receive, store and/or display a website or other interface for interacting with the service provider computer(s) 1610. Additionally, the memory 1614 may store access credentials and/or other user information such as for example, user IDs, passwords and/or other user information. In some examples, the user information may include information for authenticating an account access request. Such information includes, for example, a device ID, a cookie, an IP address, a location, or the like. In addition, the user information may include a user-provided response to a security question or a geographic location obtained by the user device 1604.

In some aspects, the service provider computer(s) 1610 may include computing devices such as for example a mobile phone, a smart phone, a personal digital assistant (PDA), a laptop computer, a desktop computer, a netbook computer, a server computer, a thin-client device, a tablet computer, a gaming console, etc. Additionally or alternatively, in some embodiments, the service provider computer(s) 1610 may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. In some examples, the service provider computer(s) 1610 may be in communication with the user device(s) 1604 and/or other service providers via the network(s) 1608, or via other network connections. The service provider computer(s) 1610 may include one or more servers, perhaps arranged in a cluster, as a server farm, or as individual servers not associated with one another. These servers may be configured as part of an integrated, distributed computing environment.

In one example configuration, the service provider computer(s) 1610 may include at least one memory 1618 and one or more processing units (or processor(s) 1620). The processor(s) 1620 may be implemented in hardware, computer-executable instructions, firmware, or combinations thereof. Computer-executable instruction or firmware implementations of the processor(s) 1620 may include computer-executable or machine-executable instructions written in any suitable programming language to perform the various functions described.

In some instances, the hardware processor(s) 1620 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or execution threads). In such a core (e.g., those with multiple logical processors), several stages of the execution pipeline and also lower level caches may also be shared.

The memory 1618 may store program instructions that are loadable and executable on the processor(s) 1620, as well as data generated during the execution of these programs. Depending on the configuration and type of the service provider computer(s) 1610, the memory 1618 may be volatile (such as RAM) and/or non-volatile (such as ROM, flash memory, etc.). The memory 1618 may include an operating system 1628, one or more data stores 1630, one or more application programs 1632, one or more drivers 1634, and/or services for implementing the features disclosed herein.

The operating system 1628 may support a service provider computer's 1610 basic functions, such as scheduling tasks, executing applications, and/or controller peripheral devices. In some implementations, a service provider computer 1610 may host one or more virtual machines. In these implementations, each virtual machine may be configured to execute its own operating system. Examples of operating systems include Unix, Linux, Windows, Mac OS, iOS, Android, and the like. The operating system 1628 may also be a proprietary operating system.

The data stores 1630 may include permanent or transitory data used and/or operated on by the operating system 1628, application programs 1632, or drivers 1634. Examples of such data include web pages, video data, audio data, images, user data, and so on. The information in the data stores 1630 may, in some implementations, be provided over the network(s) 1608 to user devices 1604. In some cases, the data stores 1630 may additionally or alternatively include stored application programs and/or drivers. Alternatively or additionally, the data stores 1630 may store standard and/or proprietary software libraries, and/or standard and/or proprietary application user interface (API) libraries. Information stored in the data stores 1630 may be machine-readable object code, source code, interpreted code, or intermediate code.

The application programs 1632 include programs may include programs accessible to user devices 1604 over the network(s) 1608. Examples of such programs include word processing programs, accounting programs, media players, image editing programs, games, and so on. The application programs 1632 may alternatively or additionally include programs executing in a clustering or distributed environment, that is, applications executing cooperatively between multiple server provider computers 1610.

The drivers 1634 include programs that may provide communication between components in a server provider computer 1610. For example, some drivers 1634 may provide communication between the operating system 1628 and additional storage 1622, communication connections 1624, and/or I/O device 1626. Alternatively or additional, some drivers 1634 may provide communication between application programs 1632 and the operating system 1628, and/or application programs 1632 and peripheral devices accessible to the service provider computer 1610. In many cases, the drivers 1634 may include drivers that provide well-understood functionality (e.g., printer drivers, display drivers, hard disk drivers). In other cases, the drivers 1634 may proprietary or specialized functionality.

The service provider computer(s) 1610 or servers may also include additional storage 1622, which may include removable storage and/or non-removable storage. The additional storage 1622 may include magnetic storage, optical disks, solid state disks, flash memory, and/or tape storage. The additional storage 1622 may be housed in the same chassis as the service provider computer(s) 1610 or may be in an external enclosure. The memory 1618 and/or additional storage 1622 and their associated computer-readable media may provide non-volatile storage of computer-readable instructions, data structures, program modules, and other data for the computing devices. In some implementations, the memory 1618 may include multiple different types of memory, such as SRAM, DRAM, or ROM.

The memory 1618, the additional storage 1622, both removable and non-removable, are examples of computer-readable storage media. For example, computer-readable storage media may include volatile or non-volatile, removable or non-removable media implemented in a method or technology for storage of information, the information including for example computer-readable instructions, data structures, program modules, or other data. The memory 1618 and the additional storage 1622 are examples of computer storage media. Additional types of computer storage media that may be present in the service provider computer(s) 1610 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the service provider computer(s) 1610. Computer-readable media also includes combinations of any of the above media types.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The service provider computer(s) 1610 may also contain communications connection(s) 1624 that allow the service provider computer(s) 1610 to communicate with a stored database, another computing device or server, user terminals and/or other devices on the network(s) 1608. The service provider computer(s) 1610 may also include I/O device(s) 1626, such as a keyboard, a mouse, a pen, a voice input device, a touch input device, a display, speakers, a printer, and the like. The communication connection(s) 1624 and I/O device(s) 1626, along with the storage 1622, may be described as peripheral devices.

The service provider computer(s) 1610 may also include one or more communication channels 1636. A communication channel 1636 may provide a medium over which the various components of the service provider computer 1610 can communicate. The communication channel or channels 1636 may take the form of a bus, a ring, a switching fabric, or a network.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 16, and/or functions described herein can be provided by one or more modules that exist as separate modules and/or module functions described herein can be spread over multiple modules.

Figure 17:
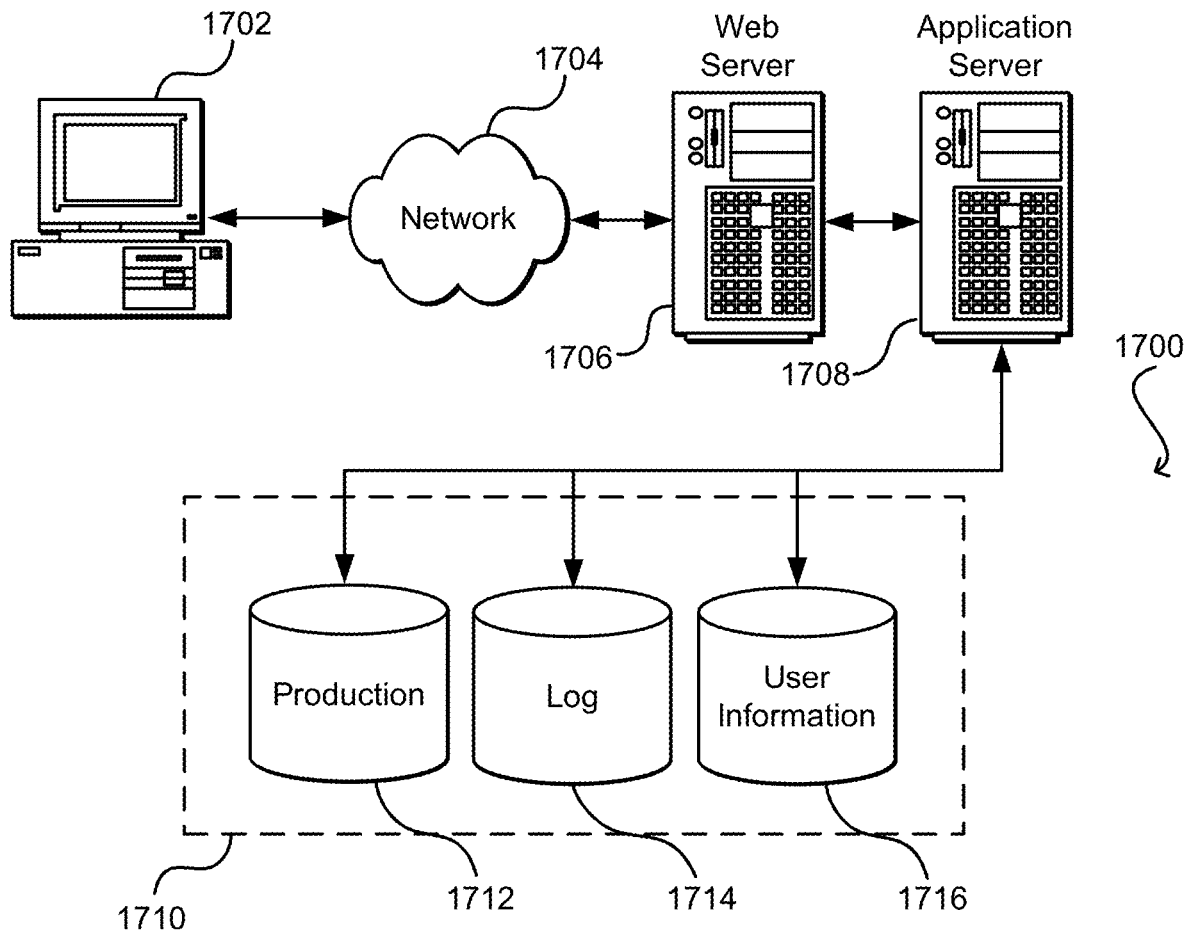
FIG. 17 illustrates aspects of an example environment of a computing system for implementing aspects in accordance with some embodiments.

FIG. 17 illustrates aspects of an example environment 1700 for implementing aspects in accordance with various embodiments. As will be appreciated, although a Web-based environment is used for purposes of explanation, different environments may be used, as appropriate, to implement various embodiments. The environment includes an electronic client device 1702, which can include an appropriate device operable to send and receive requests, messages, or information over an appropriate network 1704 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1706 for receiving requests and serving content in response thereto, although for other networks an alternative device serving a similar purpose could be used as would be apparent to one of ordinary skill in the art.

The illustrative environment includes at least one application server 1708 and a data store 1710. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1702 and the application server 1708, can be handled by the Web server @@06. It should be understood that the Web 1706 and application servers 1708 are not required and are merely example components, as structured code discussed herein can be executed on any appropriate device or host machine as discussed elsewhere herein.

The data store 1710 can include several separate data tables, databases or other data storage mechanisms and media for storing data relating to a particular aspect. For example, the data store 1710 illustrated includes mechanisms for storing production data 1712 and user information 1716, which can be used to serve content for the production side. The data store also is shown to include a mechanism for storing log data 1714, which can be used for reporting, analysis, or other such purposes. It should be understood that there can be many other aspects that may need to be stored in the data store 1710, such as for page image information and to access right information, which can be stored in any of the above listed mechanisms as appropriate or in additional mechanisms in the data store 1710. The data store 1710 is operable, through logic associated therewith, to receive instructions from the application server 1708 and obtain, update or otherwise process data in response thereto. In one example, a user might submit a search request for a certain type of item. In this case, the data store 1710 might access the user information 1716 to verify the identity of the user and can access the catalog detail information to obtain information about items of that type. The information then can be returned to the user, such as in a results listing on a Web page that the user is able to view via a browser on the user device 1702. Information for a particular item of interest can be viewed in a dedicated page or window of the browser.

Each server 1706, 1708 typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment 1700 in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 17. Thus, the depiction of the system in FIG. 17 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A computer-implemented method for operating a transport layer in a computing device on a network, comprising:

receiving a message for outputting onto the network, wherein the message is associated with a transmitting application executing on the computing device;

receiving a transport context associated with the message, wherein the transport context associates the transmitting application with a receiving application on a second computing device on the network;

generating a plurality of packets including data from the message;

adding the plurality of packets to a packet flow associated with the transport context, wherein each packet in the packet flow is assigned a sequence number;

outputting the plurality of packets for transmission onto the network without establishing a connection with the second computing device; and monitoring, using the transport context, a status for each packet from the plurality of packets, wherein monitoring includes determining, using sequence numbers from the plurality of packets, whether each packet from the plurality of packets was received at the second computing device.

2. The computer-implemented method of claim 1, further comprising:

receiving a response message associated with the second computing device, the response message including a particular sequence number of a last packet received at the second computing device.

3. The computer-implemented method of claim 2, further comprising:

determining, from the response message, that a particular packet from the plurality of packets was not received at the second computing device; and resending the particular packet.

4. The computer-implemented method of claim 2, further comprising:

stopping monitoring of a particular packet indicated by the response message as received.

5. The computer-implemented method of claim 1, further comprising:

receiving a response message associated with the second computing device, the response message indicating that a particular packet was received and not accepted; and outputting the response message for receipt by the transmitting application.

6. The computer-implemented method of claim 1, further comprising:

storing the sequence numbers in the transport context for use in monitoring the status for each packet.

7. The computer-implemented method of claim 1, further comprising:

assigning packets from the packet flow to different paths over the network.

8. The computer-implemented method of claim 1, wherein the transport context does not store a connection status.

9. A computer-implemented method for operating a transport layer in a computing device on a network, comprising:

receiving a plurality of packets associated with a first computing device on the network, each packet from the plurality of packets including a sequence number, wherein the plurality of packets are received without an established connection with the first computing device;

determining that the plurality of packets are associated with a packet flow, wherein packets in the packet flow are sent by a transmitting application executing on the first computing device for receipt by a receiving application executing on the computing device;

obtaining a transport context associated with the packet flow, wherein the transport context associates the transmitting application with the receiving application;

determining, using sequence numbers from the plurality of packets, whether the plurality of packets were received in order;

outputting a response message for transmission onto the network, the response message indicating whether the plurality of packets were received in order, wherein the response message is output without establishing a connection with the first computing device; and outputting the plurality of packets for receipt by the receiving application, wherein the plurality of packets are output in an order in which the plurality of packets was received.

10. The computer-implemented method of claim 9, wherein the response message includes a highest sequence number from the sequence numbers.

11. The computer-implemented method of claim 9, further comprising:

determining that the plurality of packets were received out of order based on a particular sequence number not being present in the sequence numbers.

12. The computer-implemented method of claim 9, further comprising:

determining that the plurality of packets were received out of order based on a particular sequence number being numerically out of order within the sequence numbers.

13. The computer-implemented method of claim 9, further comprising:

receiving an additional packet associated with the transmitting application, the additional packet including an additional sequence number; and outputting the additional packet for receipt by the receiving application without putting the additional packet in order with respect to the plurality of packets.

14. The computer-implemented method of claim 9, further comprising:

determining that a particular packet from the plurality of packets cannot be accepted, wherein the response message indicates that the particular packet was not accepted.

15. The computer-implemented method of claim 9, wherein the transport context does not store a connection status.

16. A non-transitory computer-readable medium having stored thereon instructions that, when executed by one or more processors of a computing device on a network, cause the one or more processors to perform operations including:

receiving a message for outputting onto the network, wherein the message is associated with a transmitting application executing on the computing device;

receiving a transport context associated with the message, wherein the transport context associates the transmitting application with a receiving application on a second computing device on the network;

generating a plurality of packets including data from the message;

adding the plurality of packets to a packet flow associated with the transport context, wherein each packet in the packet flow is assigned a sequence number;

outputting the plurality of packets for transmission onto the network without establishing a connection with the second computing device; and monitoring, using the transport context, a status for each packet from the plurality of packets, wherein monitoring includes determining, using sequence numbers from the plurality of packets, whether each packet from the plurality of packets was received at the second computing device.

17. The non-transitory computer-readable medium of claim 16, wherein the instructions further cause the one or more processors to perform operations including:
   receiving a response message associated with the second computing device, the response message including a particular sequence number of a last packet received at the second computing device.

18. The non-transitory computer-readable medium of claim 16, wherein the instructions further cause the one or more processors to perform operations including:
   receiving a response message associated with the second computing device, the response message indicating that a particular packet was received and not accepted; and
   outputting the response message for receipt by the transmitting application.

19. The non-transitory computer-readable medium of claim 16, wherein the instructions further cause the one or more processors to perform operations including:
   storing the sequence numbers in the transport context for use in monitoring the status for each packet.

20. The non-transitory computer-readable medium of claim 16, wherein the instructions further cause the one or more processors to perform operations including:
   assigning packets from the packet flow to different paths over the network.

\* \* \* \* \*